US009918105B2

(12) United States Patent
Pang et al.

(10) Patent No.: US 9,918,105 B2
(45) Date of Patent: Mar. 13, 2018

(54) INTRA BC AND INTER UNIFICATION

(71) Applicant: QUALCOMM Incorporated, San Diego, CA (US)

(72) Inventors: Chao Pang, Marina del Ray, CA (US); Ye-Kui Wang, San Diego, CA (US); Krishnakanth Rapaka, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 14/876,699

(22) Filed: Oct. 6, 2015

(65) Prior Publication Data

US 2016/0100189 A1    Apr. 7, 2016

Related U.S. Application Data

(60) Provisional application No. 62/061,121, filed on Oct. 7, 2014, provisional application No. 62/087,705, filed
(Continued)

(51) Int. Cl.
*H04N 7/12* (2006.01)
*H04N 19/593* (2014.01)
(Continued)

(52) U.S. Cl.
CPC ......... *H04N 19/593* (2014.11); *H04N 19/176* (2014.11); *H04N 19/186* (2014.11);
(Continued)

(58) Field of Classification Search
CPC .. H04N 19/593; H04N 19/176; H04N 19/186; H04N 19/44; H04N 19/513; H04N 19/52; H04N 19/70
See application file for complete search history.

(56) References Cited

U.S. PATENT DOCUMENTS 9,172,956 B2 * 10/2015 Lim ................. H04N 19/51
9,313,519 B2 *  4/2016 Lou ................. H04N 19/46
(Continued)

FOREIGN PATENT DOCUMENTS

WO    2013059470 A1    4/2013
WO    2015052273 A1    4/2015
(Continued)

OTHER PUBLICATIONS

Wiegand et al., "WD1: Working Draft 1 of High-Efficiency Video Coding," JCTVC-C403, 3rd Meeting: Guangzhou, CN, Oct. 7-15, 2010 (Joint Collaborative Team on Video Coding of ISO/IEC JTC1/SC29/WG11 and ITU-T SG.16); Jan. 6, 2011, 137 pp.
(Continued)

*Primary Examiner* — Nhon Diep
(74) *Attorney, Agent, or Firm* — Shumaker & Sieffert, P.A.

(57) ABSTRACT

In general, the disclosure describes techniques related to block vector coding for Intra Block Copy and Inter modes. In one example, the disclosure is directed to a video coding device comprising a memory configured to store video data and one or more processors. The video coding device is configured to determine a reference picture used for coding the current video block and determine a picture order count (POC) value for the reference picture. In response to the POC value for the reference picture being equal to a POC value for a current picture that includes the current video block, the video coding device sets a value of a syntax element to indicate that a reference picture list includes the current picture. Otherwise, the video coding device sets the value of the syntax element to indicate that the reference picture list does not include the current picture.

27 Claims, 12 Drawing Sheets

Related U.S. Application Data on Dec. 4, 2014, provisional application No. 62/111,568, filed on Feb. 3, 2015.

(51) Int. Cl.
| | |
|---|---|
| *H04N 19/513* | (2014.01) |
| *H04N 19/70* | (2014.01) |
| *H04N 19/44* | (2014.01) |
| *H04N 19/186* | (2014.01) |
| *H04N 19/176* | (2014.01) |
| *H04N 19/52* | (2014.01) |

(52) U.S. Cl.
CPC ........... *H04N 19/44* (2014.11); *H04N 19/513* (2014.11); *H04N 19/52* (2014.11); *H04N 19/70* (2014.11)

(56) References Cited

U.S. PATENT DOCUMENTS

| | | | | |
|---|---|---|---|---|
| 2008/0198936 | A1* | 8/2008 | Srinivasan | H04N 19/70 375/240.26 |
| 2010/0177776 | A1 | 7/2010 | Crinon et al. | |
| 2012/0263235 | A1 | 10/2012 | Sugio et al. | |
| 2013/0188697 | A1 | 7/2013 | Ye et al. | |
| 2015/0098504 | A1 | 4/2015 | Pang et al. | |
| 2015/0195532 | A1* | 7/2015 | Nakagami | H04N 19/159 375/240.12 |
| 2015/0195559 | A1 | 7/2015 | Chen et al. | |
| 2015/0264386 | A1 | 9/2015 | Pang et al. | |
| 2015/0271487 | A1 | 9/2015 | Li et al. | |
| 2015/0271515 | A1 | 9/2015 | Pang et al. | |
| 2015/0373334 | A1 | 12/2015 | Rapaka et al. | |
| 2015/0373362 | A1 | 12/2015 | Pang et al. | |
| 2016/0057420 | A1 | 2/2016 | Pang et al. | |

FOREIGN PATENT DOCUMENTS

| | | |
|---|---|---|
| WO | 2015124110 | 8/2015 |
| WO | 2015143395 | 9/2015 |

OTHER PUBLICATIONS

Wiegand et al., "WD2: Working Draft 2 of High-Efficiency Video Coding," JCTVC-D503, 4th Meeting: Daegu, KR, Jan. 20-28, 2011 (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011 (Joint Collaborative Team on Video Coding of ISO/IEC JTC1/SC29/WG11 and ITU-T SG.16); JCTVC-F803_d2, Oct. 4, 2011, 226 pp.

Bross et al., "WD5: Working Draft 5 of High-Efficiency Video Coding," 7th Meeting: Geneva, CH, Nov. 21-30, 2011 (Joint Collaborative Team on Video Coding of ISO/IEC JTC1/SC29/WG11 and ITU-T SG.16); JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012 (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012 (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012 (Joint Collaborative Team on Video Coding of ISO/IEC JTC1/SC29/WG11 and ITU-T SG.16); JCTVC-J1003_d7, Jul. 28, 2012, 261 pp.

Bross et al., "High Efficiency Video Coding (HEVC) text specification draft 9," 11th Meeting: Shanghai, CN, Oct. 10-19, 2012 (Joint Collaborative Team on Video Coding of ISO/IEC JTC1/SC29/WG11 and ITU-T SG.16); JCTVC-K1003_v7, Nov. 2, 2012, 290 pp.

Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.223, Series H: Audiovisual and Multimedia Systems, Infrastructure of audiovisual services—Infrastructure of audiovisual services—Transmission multiplexing and synchronization, Multiplexing protocol for low bit rate multimedia communication, The International Telecommunication Union. Jul. 2001, 74 pp.

Boyce et al., "High level syntax hooks for future extensions," JCT-VC Meeting; MPEG Meeting; Feb. 1-10, 2012; San Jose, CA (Joint Collaborative Team on Video Coding of ISO/IEC JTC1/SC29/WG11 and ITU-T SG.16); URL: http://wftp3.itu.int/av-arch/jctvc-site/, No. JCTVC-H0388, Jan. 21, 2012; XP030111415, 8 pp.

Budagavi et al., "AHG8: Video coding using Intra motion compensation," JCT-VC Meeting; MPEG Meeting; Apr. 18-26, 2013; Incheon, KR (Joint Collaborative Team on Video Coding of ISO/IEC JTC1/SC29/WG11 and ITU-T SG.16); URL: http://wftp3.itu.int/av-arch/jctvc-site/, No. JCTVC-M0350, Apr. 9, 2013; XP030114307, 3 pp.

Flynn et al., "High Efficiency Video Coding (HEVC) Range Extensions text specification: Draft 6," JCT-VC Meeting; Jan. 9-17, 2014; San Jose, CA (Joint Collaborative Team on Video Coding of ISO/IEC JTC1/SC29/WG11 and ITU-T SG.16); URL: http://wftp3.itu.int/av-arch/jctvc-site/, No. JCTVC-P1005-v4, Apr. 3, 2014, 356 pp., XP030115878. [uploaded in parts].

Li et al., "Non-SCCE1: Unification of intra BC and inter modes," 18th Meeting; Jun. 30-Jul. 9, 2014; Sapporo, JP (Joint Collaborative Team on Video Coding of ISO/IEC JTC1/SC29/WG11 and ITU-T SG.16 ); URL: http://wftp3.itu.int/av-arch/jctvc-site/. No. JCTVC-R0100, Jun. 20, 2014, XP030116356, 27 pp.

Pettersson M. et al., "HLS: Dependent RAP Indication SEI message," JCT-VC meeting, Jun. 30-Jul. 9, 2014, Sapporo, JP (Joint Collaborative Team on Video Coding of ISO/IEC JTC1/SC29/WG11 and ITU-T SG.16 ), URL: http://wftp3.itu.int/av-arch/jctvc-site/, No. JCTVC-R0059, Jun. 19, 2014, XP030116302, 5 pp.

Rapaka et al., "On intra block copy merge vector handling," Oct. 15-21, 2015; Joint Collaborative Team on Video Coding (JCT-VC) of ITU-T SG 16 WP 3 and ISO/IEC JTC 1/SC 29/WG 11, 22nd Meeting: Geneva, CH, Oct. 15, 2015, Document No. JCTVC-V0049r1, 2 pp.

Sjoberg et al., "Absolute signaling of reference pictures," JCT-VC Meeting; MPEG Meeting; Jul. 14-22, 2011; Torino, IT (Joint Collaborative Team on Video Coding of ISO/IEC JTC1/SC29/WG11 and ITU-T SG.16 ); URL: http://wftp3.itu.int/av-arch/jctvc-site/, No. JCTVC-F493, Jul. 22, 2011, XP030009516, 10 pp.

Xu et al., "On unification of intra block copy and Inter-picture motion compensation," JCT-VC Meeting; Jan. 9-17, 2014; San Jose, CA (Joint Collaborative Team on Video Coding of ISO/IEC

(56) References Cited

OTHER PUBLICATIONS

JTC1/SC29/WG11 and ITU-T SG.16); URL: http://wftp3.itu.int/av-arch/jctvc-site/, No. JCTVC-Q0132-v5, Apr. 3, 2014, XP030116062, 14 pp.

Wang et al., "High Efficiency Video Coding (HEVC) Defect Report 2," JCT-VC Meeting; Oct. 23-Nov. 1, 2013, (Joint Collaborative Team on Video Coding of ISO/IEC JTC1/SC29/WG11 and ITU-T SG.16); No. JCTVC-O1003_v2, Nov. 24, 2013, 311 pp.

Flynn et al., "High Efficiency Video Coding (HEVC) Range Extensions text specification: Draft 7," JCT-VC Meeting; Mar. 27-Apr. 4, 2014; (Joint Collaborative Team on Video Coding of ISO/IEC JTC1/SC29/WG11 and ITU-T SG.16); No. JCTVC-Q1005_v4, Apr. 10, 2014, 376 pp.

Wang et al., "High Efficiency Video Coding (Hevc) Defect Report 4," JCT-VC Meeting; Mar. 27-Apr. 4, 2014; (Joint Collaborative Team on Video Coding of ISO/IEC JTC1/SC29/WG11 and ITU-T SG.16); No. JCTVC-Q1003(v.1), May 28, 2014, 314 pp.

Joshi et al., "High Efficiency Video Coding (HEVC) Screen Content Coding: Draft 1," JCT-VC Meeting; Jun. 30-Jul. 9, 2014; (Joint Collaborative Team on Video Coding of ISO/IEC JTC1/SC29/WG11 and ITU-T SG.16); No. JCTVC- R1005_v3, Sep. 27, 2014, 362 pp.

Invitation to Pay Additional Fees from International Application No. PCT/US2015/054537, dated Dec. 14, 2015, 12 pp.

International Search Report and Written Opinion from International Application No. PCT/US2015/054537, dated Feb. 26, 2016, 22 pp.

Response to Written Opinion dated Aug. 26, 2016, from International Application No. PCT/US2015/054537, filed on Aug. 4, 2016, 4 pp.

Second Written Opinion from International Application No. PCT/US2015/054537, dated Sep. 30, 2016, 10 pp.

Bross et al., "Editors' proposed corrections to HEVC version 1," Apr. 18-26, 2013; Joint Collaborative Team on Video Coding (JCT-VC) of ITU-T SG16 WP3 and ISO/IEC JTC1/SC29/WG11, 13th Meeting, Incheon, KR, Document: JCTVC-M0432_v3; Sep. 30, 2013, XP030057924, 310 pp.

ITU-T H.263, "Video coding for low bit rate communication," Series H: Audiovisual and Multimedia Systems, Infrastructure of audiovisual services—Coding of moving video, Jan. 2005, 226 pp.

Joshi et al., "High Efficiency Video Code (HEVC) Screen Content Coding: Draft 1," JCT-VC Meeting; Jun. 30-Jul. 9, 2014; Sapporo, JP (Joint Collaborative Team on Video Coding of ISO/IEC JTC1/SC29/WG11 and ITU-T SG.16 ); URL:http://wftp3.itu.int/av-arch/jctvc-site/ No. JCTVC-R1005=v3, Aug. 9, 2014; 362 pp.

Li et al., "Non-SCCE1: Unification of intra BC and inter modes," JCT-VC Meeting; Jun. 30-Jul. 9, 2014; Sapporo, JP (Joint Collaborative Team on Video Coding of ISO/IEC JTC1/SC29/WG11 and ITU-T SG.16 ); URL: http://wftp3.itu.int/av-arch/jctvc-site/; No. JCTVC -R0100-v2, Jun. 29, 2014, 28 pp.

Lin et al., "Improved Advanced Motion Vector Prediction," JCT-VC Meeting; MPEG Meeting; Jan. 20-28, 2011; Daegu, KR (Joint Collaborative Team on Video Coding of ISO/IEC JTC1/SC29/WG11 and ITU-T SG. 16); No. JCTVC-D125, Jan. 15, 2011, 8 pp.

Pang et al., "SCCE1: Test 3.1—Block vector prediction method for Intra block copy," JCT-VC Meeting; Jun. 30-Jul. 9, 2014; Sapporo, JP (Joint Collaborative Team on Video Coding of ISO/IEC JTC1/SC29/WG11 and ITU-T SG.16); URL: http://wftp3.itu.int/av-arch/jctvc-site/, No. JCTVC-R0185-v2, Jul. 2, 2014, 8 pp.

Pang et al., "Non-RCE3: Intra Motion Compensation with 2-D MVs," JCT-VC Meeting; Jul. 25-Aug. 2, 2013; Vienna, AT (Joint Collaborative Team on Video Coding of ISO/IEC JTC1/SC29/WG11 and ITU-TSG.16); URL: http://wftp3.itu.int/av-arch/jctvc-site/, No. JCTVC-N0256, Jul. 16, 2003; 12 pp.

Pang et al., "Non-RCE3: 2-D MV Supported Intra Motion Compensation," JCT-VC Meeting; Jul. 25-Aug. 2, 2013; Vienna, AT (Joint Collaborative Team on Video Coding of ISO/IEC JTC1/SC29/WG11 and ITU-TSG.16) ; URL: http://wftp3.itu.int/av-arch/jctvc-site/, No. JCTVC-N0256-v4, Aug. 2, 2013; 5 pp.

Pang et al., "Non-RCE3: Intra Motion Compensation with 2-D MVs", JCT-VC Meeting; Jul. 25-Aug. 2013; Vienna, AT (Joint Collaborative Team on Video Coding of ISO/IEC JTC1/SC29/WG11 and ITU-TSG.16); URL: http://wftp3.itu.int/av-arch/jctvc-site/, No. JCTVC-N0256-v3, Jul. 27, 2013; 12 pp.

Wang et al., "High Efficiency Video Coding (HEVC) Defect Report 4," Valencia, ES; Joint Collaborative Team on Video Coding (JCT-VC) of ITU-T SG 16 WP 3 and ISO/IEC JTC 1; document No. JCTVC-Q1003 (v.1); May 28, 2014, 311 pp.

Yu et al., "Requirements for an extension of HEVC for coding of screen content," ISO/IEC JTC 1/SC 29/WG 11 Requirements subgroup, San Jose, California, USA, document MPEG2013/N14174, Jan. 2014, 5 pp.

Zhou et al., "RCE1: Subtest 1—Motion Vector Resolution Control," JCT-VC Meeting; Mar. 27-Apr. 4, 2014; Valencia, ES (Joint Collaborative Team on Video Coding of ISO/IEC JTC1/SC29/WG11 and ITU-T SG.16 ); URL: http://wftp3.itu.int/av-arch/jctvc-site/, No. JCTVC-Q0155-v2, Mar. 26, 2014; 5 pp.

International Preliminary Report on Patentability form International Application No. PCT/US2015/054537, dated Jan. 19, 2017, 16 pp.

Sullivan G.J., et al., "Standardized Extensions of High Efficiency Video Coding (HEVC)," IEEE Journal of Selected Topics in Signal Processing, Dec. 2013, vol. 7, No. 6, pp. 1001-1016.

\* cited by examiner

4:2:0 sample format

4:2:2 sample format

4:4:4 sample format

16x16 CU with 4:2:0 Sample Formatting

○ Luma Sample
⊗ Chroma Samples

16x16 CU with 4:2:2 Sample Formatting

○ Luma Sample
⊗ Chroma Samples

| P | | | | Q | | | |
|---|---|---|---|---|---|---|---|
| $p_{3,0}$ | $p_{2,0}$ | $p_{1,0}$ | $p_{0,0}$ | $q_{0,0}$ | $q_{1,0}$ | $q_{2,0}$ | $q_{3,0}$ |
| $p_{3,1}$ | $p_{2,1}$ | $p_{1,1}$ | $p_{0,1}$ | $q_{0,1}$ | $q_{1,1}$ | $q_{2,1}$ | $q_{3,1}$ |
| $p_{3,2}$ | $p_{2,2}$ | $p_{1,2}$ | $p_{0,2}$ | $q_{0,2}$ | $q_{1,2}$ | $q_{2,2}$ | $q_{3,2}$ |
| $p_{3,3}$ | $p_{2,3}$ | $p_{1,3}$ | $p_{0,3}$ | $q_{0,3}$ | $q_{1,3}$ | $q_{2,3}$ | $q_{3,3}$ |

Four-pixel long vertical block boundary formed by the adjacent blocks P and Q

FIG. 7

INTRA BC AND INTER UNIFICATION

This disclosure is related to the following U.S. Provisional patent applications, the entire contents of each of which is incorporated herein by reference:

U.S. Provisional Patent Application 62/111,568, filed Feb. 3, 2015;

U.S. Provisional Patent Application 62/087,705, filed Dec. 4, 2014; and

U.S. Provisional Patent Application 62/061,121, filed Oct. 7, 2014.

TECHNICAL FIELD

This disclosure relates to video coding and, more particularly, prediction of video blocks based on other video blocks.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, the disclosure describes techniques related to block vector coding for Intra Block Copy and Inter modes. In various examples, the techniques of this disclosure may be used in conjunction with screen content coding.

In one example, the disclosure is directed to a method of encoding a video block comprising determining a reference picture used for coding the current video block; determining a picture order count (POC) value for the reference picture; in response to the POC value for the reference picture being equal to a POC value for a current picture that includes the current video block, setting a value of a syntax element to indicate that a reference picture list includes the current picture; and in response to the POC value for the reference picture being different than the POC value for the current picture, setting the value of the syntax element to indicate that the reference picture list does not include the current picture.

In another example, the disclosure is directed to a video encoding device comprising a memory configured to store video data; and one or more processors configured to: determine a reference picture used for coding the current video block; determine a picture order count (POC) value for the reference picture; in response to the POC value for the reference picture being equal to a POC value for a current picture that includes the current video block, set a value of a syntax element to indicate that a reference picture list includes the current picture; and in response to the POC value for the reference picture being different than the POC value for the current picture, set the value of the syntax element to indicate that the reference picture list does not include the current picture.

In another example, the disclosure is directed to an apparatus for video encoding, the apparatus comprising means for determining a reference picture used for coding the video block; means for determining a picture order count (POC) value for the reference picture; means for setting a value of a syntax element to indicate that a reference picture list includes the current picture in response to the POC value for the reference picture being equal to a POC value for a current picture that includes the current video block; and means for setting the value of the syntax element to indicate that the reference picture list does not include the current picture in response to the POC value for the reference picture being different than the POC value for the current picture.

In another example, the disclosure is directed to a computer-readable storage medium storing instructions that when executed by one or more processors cause the one or more processors to: determine a reference picture used for coding the current video block; determine a picture order count (POC) value for the reference picture; in response to the POC value for the reference picture being equal to a POC value for a current picture that includes the current video block, set a value of a syntax element to indicate that a reference picture list includes the current picture; and in response to the POC value for the reference picture being different than the POC value for the current picture, set the value of the syntax element to indicate that the reference picture list does not include the current picture.

In another example, the disclosure is directed to a method for decoding video data, the method comprising: receiving a syntax element that indicates whether a current picture that includes a current video block of the video data is eligible to be in a reference picture list; determining a value of the syntax element; in response to the syntax element indicating that the current video block of the video data is eligible to be in the reference picture list, adding the current picture to the reference picture list; and in response to the syntax element indicating that the current video block of the video data is not eligible to be in the reference picture list, restricting the current picture from being placed in the reference picture list.

In another example, the disclosure is directed to a video decoding device comprising: a memory configured to store video data; and one or more processors configured to: receive a syntax element that indicates whether a current picture that includes a current video block of the video data is eligible to be in a reference picture list; determine a value of the syntax element; in response to the syntax element indicating that the current video block of the video data is eligible to be in the reference picture list, add the current picture to the reference picture list; and in response to the syntax element indicating that the current video block of the video data is not eligible to be in the reference picture list, restrict the current picture from being placed in the reference picture list.

In another example, the disclosure is directed to an apparatus for video encoding, the apparatus comprising means for receiving a syntax element that indicates whether a current picture that includes a current video block of the video data is eligible to be in a reference picture list; means for determining a value of the syntax element; in response to the syntax element indicating that the current video block of the video data is eligible to be in the reference picture list, means for adding the current picture to the reference picture list; and in response to the syntax element indicating that the current video block of the video data is not eligible to be in the reference picture list, means for restricting the current picture from being placed in the reference picture list.

In another example, the disclosure is directed to a computer-readable storage medium storing instructions that when executed by one or more processors cause the one or more processors to: receive a syntax element that indicates whether a current picture that includes a current video block of the video data is eligible to be in a reference picture list; determine a value of the syntax element; in response to the syntax element indicating that the current video block of the video data is eligible to be in the reference picture list, add the current picture to the reference picture list; and in response to the syntax element indicating that the current video block of the video data is not eligible to be in the reference picture list, restrict the current picture from being placed in the reference picture list.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 is an illustration of a four-pixel long vertical block boundary formed by the adjacent blocks P and Q.

DETAILED DESCRIPTION

Figure 1:
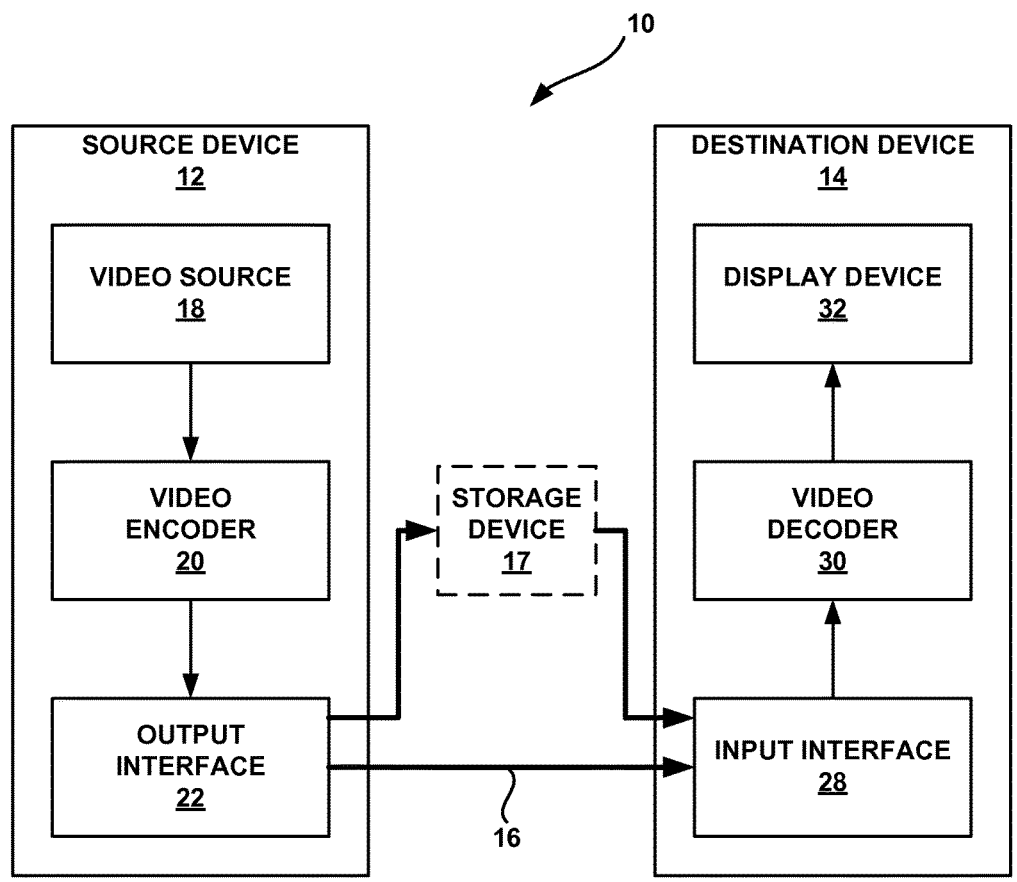
FIG. 1 is a block diagram illustrating an example video encoding and decoding system that may utilize the techniques described in this disclosure.

Various video coding standards, including the recently developed High Efficiency Video Coding (HEVC) standard include predictive coding modes for video blocks, where a block currently being coded is predicted based on an already coded block of video data. In an intra prediction mode, the current block is predicted based on one or more previously coded, neighboring blocks in the same picture as the current block, while in an inter prediction mode the current block is predicted based on an already coded block in a different picture. In inter prediction mode, the process of determining a block of a previously coded frame to use as a predictive block is sometimes referred to as motion estimation, which is generally performed by a video encoder, and the process of identifying and retrieving a predictive block is sometimes referred to as motion compensation, which is performed by both video encoders and video decoders.

A video encoder typically determines how to code a sequence of video data by coding the video using multiple coding scenarios and identifying the coding scenario that produces a desirable rate-distortion tradeoff. When testing intra prediction coding scenarios for a particular video block, a video encoder typically tests the neighboring row of pixels (i.e., the row of pixels immediately above the block being coded) and tests the neighboring column of pixels (i.e., the column of pixels immediately to the left of the block being coded). In contrast, when testing inter prediction scenarios, the video encoder typically identifies candidate predictive blocks in a much larger search area, where the search area corresponds to video blocks in a previously coded frame of video data.

It has been discovered, however, that for certain types of video images, such as video images that include text, symbols, or repetitive patterns, coding gains can be achieved relative to intra prediction and inter prediction by using an intra motion compensation (IMC) mode, which is sometimes also referred to as intra block copy (IBC) mode. In this disclosure, the terms IMC mode and IBC mode are interchangeable. For instance, the term IMC mode was originally used by developers, but later modified to IBC mode. In an IMC mode, a video encoder searches for a predictive block in the same frame or picture as the block being coded, as in an intra prediction mode, but the video encoder searches a wider search area and not just the neighboring rows and columns, as in an inter prediction mode.

In IMC mode, the video encoder may determine an offset vector, also referred to sometimes as a motion vector or block vector, for identifying the predictive block within the same frame or picture as the block being predicted. The offset vector includes, for example, an x-component and a y-component, where the x-component identifies the horizontal displacement between a video block being predicted and the predictive block, and where the y-component identifies a vertical displacement between the video block being predicted and the predictive block. The video encoder signals, in the encoded bitstream, the determined offset vector so that a video decoder, when decoding the encoded bitstream, can identify the predictive block selected by the video encoder.

This disclosure introduces techniques to efficiently unify Intra Block Copy and Inter coding. The proposed techniques are mainly directed to, but not limited, screen content coding, including the support of possibly high bit depth (e.g. more than 8 bit) and different chroma sampling format such as 4:4:4, 4:2:2, 4:2:0, 4:0:0, etc.

FIG. 1 is a block diagram illustrating an example video encoding and decoding system that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 17. Similarly, encoded data may be accessed from storage device 17 by input interface. Storage device 17 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 17 may correspond to a file server or another intermediate storage device that may hold the encoded video generated by source device 12. Destination device 14 may access stored video data from storage device 17 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 17 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 17 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 17, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC), and may conform to the HEVC Test Model (HM). A working draft of the HEVC standard, referred to as "HEVC Working Draft 10" or "HEVC WD10," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013. The techniques described in this disclosure may also operate according to extensions of the HEVC standard that are currently in development. Alternatively or additionally, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/15_Geneva/wg11/JCTVC-O1003-v2.zip. The Range Extensions to HEVC, namely HEVC RExt, is also being developed by the JCT-VC. A recent Working Draft (WD) of Range extensions, referred to as RExt WD7 hereinafter, is available from http://phenix.int-evry.fr/jct/doc_end_user/documents/17_Valencia/wg11/JCTVC-Q1005-v4.zip.

In this document the HEVC specification text as in JCTVC-Q1003 is often referred to as HEVC version 1. The range extension specification may become the version 2 of the HEVC. However, in a large extent, as far as the proposed techniques are concerned, e.g., motion vector prediction, the HEVC version 1 and the range extension specification are technically similar. Therefore whenever we refer to the changes based on HEVC version 1, the same changes may apply to the range extension specification, and whenever we reuse the HEVC version 1 module, we are actually also reusing the HEVC range extension module (with the same sub-clauses).

Recently, investigation of new coding tools for screen-content material such as text and graphics with motion was requested, and technologies that improve the coding efficiency for screen content have been proposed. Because there is evidence that significant improvements in coding efficiency can be obtained by exploiting the characteristics of screen content with novel dedicated coding tools, a Call for Proposals (CfP) is being issued with the target of possibly developing future extensions of the High Efficiency Video Coding (HEVC) standard including specific tools for screen content coding (SCC). Companies and organizations are invited to submit proposals in response to this Call. The use cases and requirements of this CfP are described in MPEG document N14174. During the 17th JCT-VC meeting, SCC test model (SCM) is established. A recent Working Draft (WD) of SCC is available from http://phenix.int-evry.fr/jct/doc_end_user/documents/18_Sapporo/wg11/JCTVC-R1005-v3.zip.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC developed the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU is defined as basic coding unit in HEVC. In HEVC, a frame is first divided into a number of square units called a CTU (Coding Tree Unit). Let CTU size be 2N×2N. Each CTU can be divided into 4 N×N CUs, and each CU can be further divided into 4 (N/2)×(N/2) units. The block splitting can continue in the same way until it reaches the predefined maximum splitting level or the allowed smallest CU size. The size of the CTU, the levels of further splitting CTU into CU and the smallest size of CU are defined in the encoding configurations, and will be sent to video decoder 30 or may be known to both video encoder 20 and video decoder 30.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Thus, according to the HEVC, a CU may include one or more prediction units (PUs) and/or one or more transform units (TUs). This disclosure also uses the term "block", "partition," or "portion" to refer to any of a CU, PU, or TU. In general, "portion" may refer to any sub-set of a video frame. Further, this disclosure typically uses the term "video block" to refer to a coding node of a CU. In some specific cases, this disclosure may also use the term "video block" to refer to a treeblock, i.e., LCU, or a CU, which includes a coding node and PUs and TUs. Thus, a video block may correspond to a coding node within a CU and video blocks may have fixed or varying sizes, and may differ in size according to a specified coding standard.

A video sampling format, which may also be referred to as a chroma format, may define the number of chroma samples included in a CU with respect to the number of luma samples included in a CU. Depending on the video sampling format for the chroma components, the size, in terms of number of samples, of the U and V components may be the same as or different from the size of the Y component. In the HEVC standard, a value called chroma_format_idc is defined to indicate different sampling formats of the chroma components, relative to the luma component. In HEVC, chroma_format_idc is signaled in the SPS. Table 1 illustrates the relationship between values of chroma_format_idc and associated chroma formats.

TABLE 1 different chroma formats defined in HEVC

| chroma_format_idc | chroma format | SubWidthC | SubHeightC |
|---|---|---|---|
| 0 | monochrome | — | — |
| 1 | 4:2:0 | 2 | 2 |
| 2 | 4:2:2 | 2 | 1 |
| 3 | 4:4:4 | 1 | 1 |

In Table 1, the variables SubWidthC and SubHeightC can be used to indicate the horizontal and vertical sampling rate ratio between the number of samples for the luma component and the number of samples for each chroma component. In the chroma formats described in Table 1, the two chroma components have the same sampling rate. Thus, in 4:2:0 sampling, each of the two chroma arrays has half the height and half the width of the luma array, while in 4:2:2 sampling, each of the two chroma arrays has the same height and half the width of the luma array. In 4:4:4 sampling, each of the two chroma arrays, may have the same height and width as the luma array, or in some instances, the three color planes may all be separately processed as monochrome sampled pictures.

In the example of Table 1, for the 4:2:0 format, the sampling rate for the luma component is twice that of the chroma components for both the horizontal and vertical directions. As a result, for a coding unit formatted according to the 4:2:0 format, the width and height of an array of samples for the luma component are twice that of each array of samples for the chroma components. Similarly, for a coding unit formatted according to the 4:2:2 format, the width of an array of samples for the luma component is twice that of the width of an array of samples for each chroma component, but the height of the array of samples for the luma component is equal to the height of an array of samples for each chroma component. For a coding unit formatted according to the 4:4:4 format, an array of samples for the luma component has the same width and height as an array of samples for each chroma component. It should be noted that in addition to the YUV color space, video data can be defined according to an RGB space color. In this manner, the chroma formats described herein may apply to either the YUV or RGB color space. RGB chroma formats are typically sampled such that the number of red samples, the number of green samples and the number of blue samples are equal. Thus, the term "4:4:4 chroma format" as used herein may refer to either a YUV color space or an RGB color space wherein the number of samples is equal for all color components.

In accordance with the techniques of this disclosure, video encoder 20 may determine a reference picture used for coding a current block in a current picture. For instance, the reference picture may include a reference block with motion prediction information that is used for coding the current video block. Video encoder 20 may further determine a picture order count (POC) value for the reference picture. In response to the POC value for the reference picture being equal to a POC value for a current picture that includes the current video block, video encoder 20 may set a value of a syntax element to indicate that a reference picture list includes the current picture. In response to the POC value for the reference picture being different than the POC value for the current picture, video encoder 20 may set a value of a syntax element to indicate that a reference picture list does not include the current picture.

In further techniques of this disclosure, video decoder 30 may receive a syntax element that indicates whether a current picture that includes a current video block of the video data is eligible to be in a reference picture list. Video decoder 30 may further determine a value of the syntax element. In response to the syntax element indicating that the current video block of the video data is eligible to be in the reference picture list, video decoder 30 may add the current picture to a reference picture list. In response to the syntax element indicating that the current video block of the video data is not eligible to be in the reference picture list, video decoder 30 may restrict the current picture from being placed in the reference picture list.

Figure 2A:
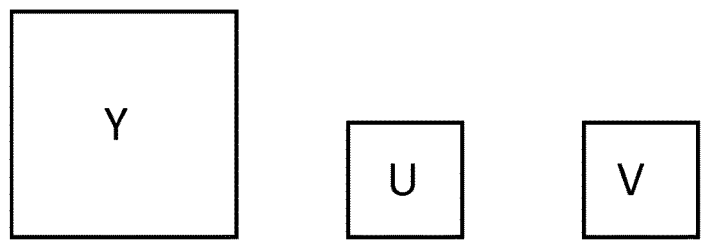
FIGS. 2A-2C are conceptual diagrams illustrating different sample formats for video data.
Figure 2B:
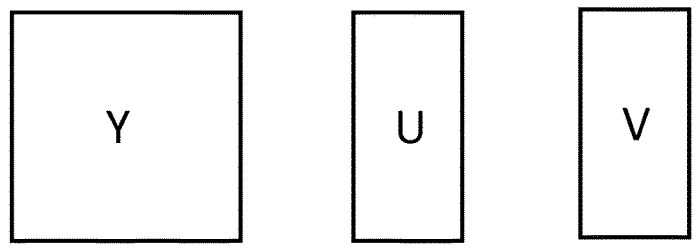
Figure 2C:
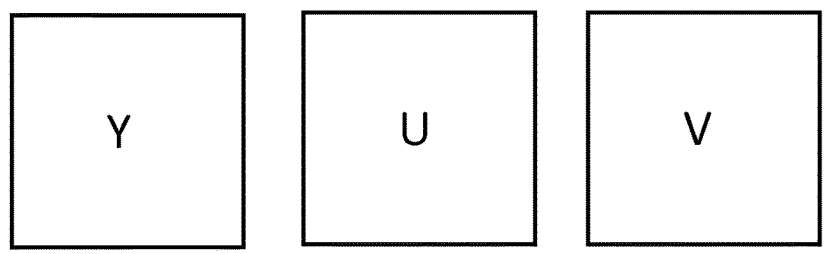

FIGS. 2A-2C are conceptual diagrams illustrating different sample formats for video data. FIG. 2A is a conceptual diagram illustrating the 4:2:0 sample format. As illustrated in FIG. 2A, for the 4:2:0 sample format, the chroma components are one quarter of the size of the luma component. Thus, for a CU formatted according to the 4:2:0 sample format, there are four luma samples for every sample of a chroma component. FIG. 2B is a conceptual diagram illustrating the 4:2:2 sample format. As illustrated in FIG. 2B, for the 4:2:2 sample format, the chroma components are one half of the size of the luma component. Thus, for a CU formatted according to the 4:2:2 sample format, there are two luma samples for every sample of a chroma component. FIG. 2C is a conceptual diagram illustrating the 4:4:4 sample format. As illustrated in FIG. 2C, for the 4:4:4 sample format, the chroma components are the same size of the luma component. Thus, for a CU formatted according to the 4:4:4 sample format, there is one luma sample for every sample of a chroma component.

Figure 3:
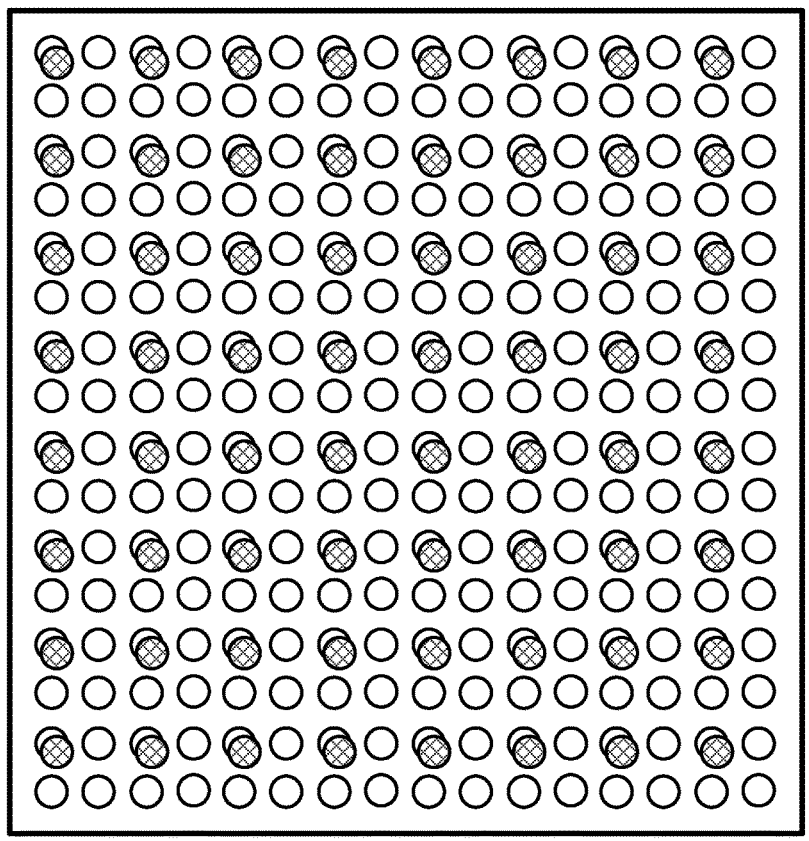
FIG. 3 is a conceptual diagram illustrating a 16×16 coding unit formatted according to a 4:2:0 sample format.

FIG. 3 is a conceptual diagram illustrating an example of a 16×16 coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, as described above, a CU may be partitioned into smaller CUs. For example, the CU illustrated in FIG. 3 may be partitioned into four 8×8 CUs, where each 8×8 CU includes 8×8 samples for the luma component and 4×4 samples for each chroma component.

Figure 4:
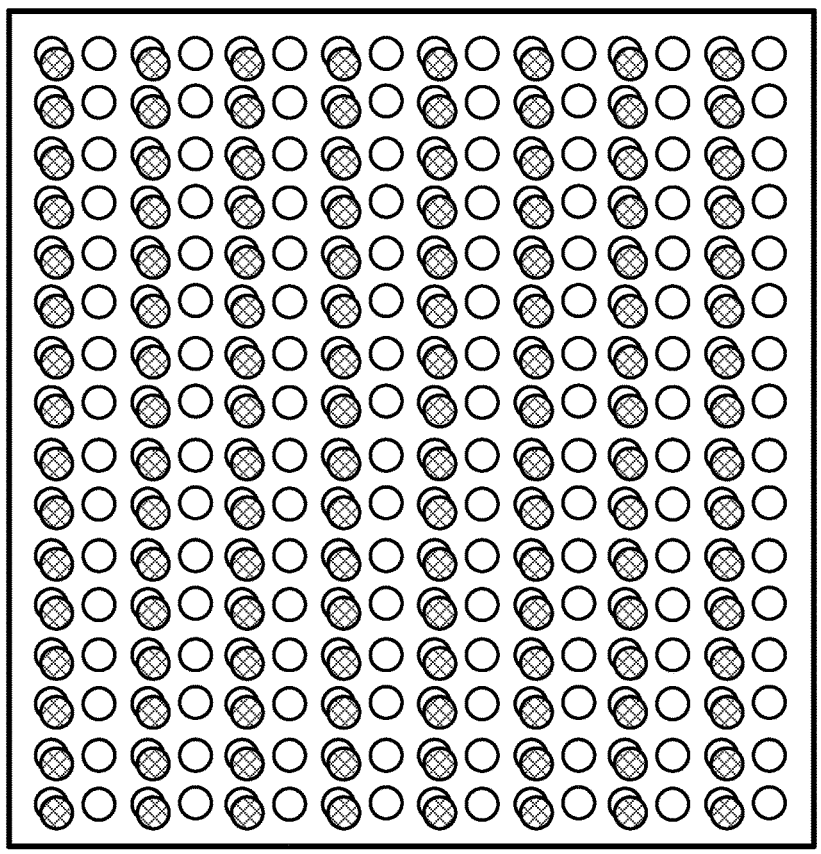
FIG. 4 is a conceptual diagram illustrating a 16×16 coding unit formatted according to a 4:2:2 sample format.

FIG. 4 is a conceptual diagram illustrating an example of a 16×16 coding unit formatted according to a 4:2:2 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:2 sample format includes 16×16 samples of luma components and 8×16 samples for each chroma component. Further, as described above, a CU may be partitioned into smaller CUs. For example, the CU illustrated in FIG. 4 may be partitioned into four 8×8 CUs, where each CU includes 8×8 samples for the luma component and 4×8 samples for each chroma component.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

According to one example technique of this disclosure, video decoder 30 may decode a current block of video data using an IMC mode. Video decoder 30 may determine, for the current block of video data, a length of a codeword used to signal a component of an offset vector and based on the length of the codeword, code the offset vector. The component of the offset vector being coded may be either an x-component or a y-component, and the length of the codeword used to signal one component may be different than a length of a second codeword used to signal the other of the x-component and the y-component.

Video decoder 30 may, for example, determine the length of the codeword used to signal the component of the offset vector by determining the length of the codeword based on a size of a search region used to perform IMC for the current block of video data. The size of the search region may, for example, be determined based on one or more of a distance between a pixel of the current block and a top boundary of the search region, a distance between a pixel of a current block and a left boundary of the search region, a distance between a pixel of a current block and a right boundary of the search region.

Additionally or alternatively, video decoder 30 may determine the length of the codeword used to signal the component of the offset vector based on one or more of a size of a coding tree unit comprising the current block, a location of the current block in a coding tree unit (CTU), or a location of the current block in a frame of video data, based on a size of the current block.

According to another example technique of this disclosure, video decoder 30 may decode a current block of video data using an IMC mode. Video decoder 30 may determine for the current block of video data an offset vector (e.g., an offset vector for a luma component of the current block for which video encoder 20 signaled information that video decoder 30 uses to determine the offset vector), and in response to the offset vector pointing to a sub-pixel position (e.g., in response to the offset vector pointing to a sub-pixel position within the chroma sample), modify the offset vector to generate a modified offset vector that is used for locating a reference block for the chroma component of the current block. The modified offset vector may, for example, point to an integer pixel position or point to a pixel position that is a lower precision position than the sub-pixel position.

According to another example technique of this disclosure, video decoder 30 may determine for a current block of video data a maximum CTU size. Video decoder 30 may determine for the current block of video data a maximum CU size for an IMC mode. The maximum CU size for the IMC mode may be less than the maximum CTU size. Video decoder 30 may code the current block of video data based on the maximum CU size for the IMC mode. Coding the current block of video data based on the maximum CU size for the IMC mode may, for example, include one or more of not coding the current block of video data in the IMC mode in response to a size for the current block of video data being greater than the maximum CU size for the IMC mode or coding the current block of video data in the IMC mode in response to a size for the current block of video data being less than or equal to the maximum CU size for the IMC mode. The maximum CU size for the IMC mode may, for example, be signaled in an encoded video bitstream or determined based on statistics of already coded video data.

According to another example technique of this disclosure, video decoder 30 may code a current block of video data using an IMC mode. Based on one or more of a size of the current block, a position of the current block, and a size of a CTU comprising the current block, video decoder 30 may determine for the current block of video data a coding method for coding an offset vector and code the offset vector based on the determined coding method. The coding method for coding the offset vector may, for example, include one of or a combination of fixed length coding, variable length coding, arithmetic coding, and context-based coding. The position of the current block may, for example, be the position within the CTU or the position within a frame of video data.

Figure 5:
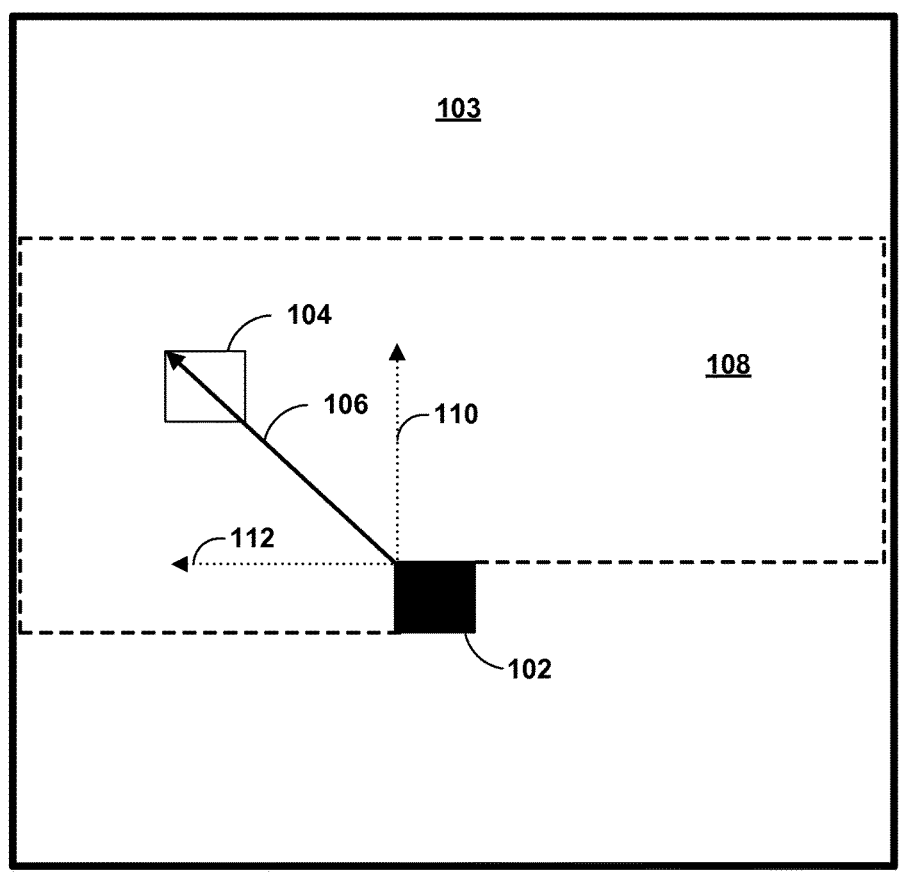
FIG. 5 shows a conceptual illustration of the intra motion compensation (IMC) mode.

FIG. 5 shows a conceptual illustration of the IMC mode. As noted above, IMC mode is the same as IBC mode. Video encoder 20 and video decoder 30 may, for example be configured to encode and decode blocks of video data using an IMC mode. Many applications, such as remote desktop, remote gaming, wireless displays, automotive infotainment, cloud computing, etc., are becoming routine in people's daily lives, and the coding efficiency when coding such content may be improved by the use of an IMC mode. System 10 of FIG. 1 may represent devices configured to execute any of these applications. Video contents in these applications are often combinations of natural content, text, artificial graphics, etc. In text and artificial graphics regions of video frames, repeated patterns (such as characters, icons, symbols, etc.) often exist. As introduced above, IMC is a dedicated technique which enables removing this kind of redundancy and potentially improving the intra-frame coding efficiency as reported in JCT-VC M0350. As illustrated in FIG. 5, for the coding units (CUs) which use IMC, the prediction signals are obtained from the already reconstructed region in the same frame. In the end, the offset vector, which indicates the position of the prediction signal displaced from the current CU, together with the residue signal are encoded.

For instance, FIG. 5 illustrates an example technique for predicting a current block 102 of video data within a current picture 103 according to a mode for intra prediction of blocks of video data from predictive blocks of video data within the same picture according to this disclosure, e.g., according to an Intra MC mode in accordance with the techniques of this disclosure. FIG. 5 illustrates a predictive block of video data 104 within current picture 103. A video coder, e.g., video encoder 20 and/or video decoder 30, may use predictive video block 104 to predict current video block 102 according to an Intra MC mode in accordance with the techniques of this disclosure.

FIG. 5 shows a current block that is being coded in an IMC mode. The current block may, for example, be a current CU. A predictive block for the current CU may be obtained from search region 108. Search region 108 includes already coded blocks from the same frame as the current CU. Assuming, for example, the frame is being coded in a raster scan order (i.e. left-to-right and top-to-bottom), the already coded blocks of the frame correspond to blocks that are to the left of and above the current CU, as shown in FIG. 5. In some examples, search region 108 may include all of the already coded blocks in the frame, while in other examples, the search region may include fewer than all of the already coded blocks. The offset vector in FIG. 5, sometimes referred to as a motion vector or prediction vector, identifies the differences between a top-left pixel of the current CU and a top-left pixel of the predictive block (labeled prediction signal in FIG. 5). Thus, by signaling the offset vector in the encoded video bitstream, a video decoder can identify the predictive block for the current CU, when the current CU is coded in an IMC mode.

FIG. 5 is a diagram illustrating an example of an intra block copying process. Video encoder 20 may perform an intra BC process to predict a current block. As noted above, intra BC may be a dedicated process that removes redundancy within a picture. For instance, for coding units (CUs) which use intra BC, video encoder 20 or video decoder 30 may obtain the current block from an already reconstructed region in the same picture. In some instances, video encoder 20 or video decoder 30 may encode or decode, respectively, the offset or displacement vector (also referred to as a motion vector), which indicates the position of the block in the picture used to generate the current block as displaced from the current CU, together with the current signal.

For instance, FIG. 5 illustrates an example of intra BC, which has been included in RExt (i.e., Range Extensions to HEVC, including WD5 of developing standard). In FIG. 5, the current CU is predicted from an already decoded block of the current picture/slice. In other words, the video encoder 20 or video decoder 30 may use the current picture is used as a reference picture for predicting the current CU of the current picture.

In general, many applications, such as remote desktop, remote gaming, wireless displays, automotive infotainment, cloud computing, and the like, are becoming routine. Video contents in these applications are usually combinations of natural content, text, artificial graphics, etc. In text and artificial graphics region, repeated patterns (such as characters, icons, symbols, etc.) often exist. Intra BC is a dedicated technique which enables removing this kind of redundancy and improving the intra-frame coding efficiency. As illustrated in FIG. 5, for the coding units (CUs) which use intra BC, the prediction signals are obtained from the already reconstructed region in the same picture/slice. In the end, the offset or displacement vector (also called a motion vector), which indicates the position of the prediction signal displaced from the current CU, together with the residue signal are encoded.

In some examples, video encoder 20 may signal the syntax element curr_pic_as_ref_enabled_flag to indicate to video decoder 30 whether or not a picture referring to the PPS may be present in a reference picture list of the picture itself. As one example, video encoder 20 may signal curr_pic_as_ref_enabled_flag as equal to 1 to indicate that a picture referring to the PPS may be present in a reference picture list of the picture itself. As another example, video encoder 20 may signal curr_pic_as_ref_enabled_flag as equal to 0 to indicate that a picture referring to the PPS is not present in a reference picture list of the picture itself. As yet another example, video encoder 20 may not signal curr_pic_as_ref_enabled_flag. In some example, when the syntax element curr_pic_as_ref_enabled_flag is not present, video decoder 30 may infer the value of curr_pic_as_ref_enabled_flag to be equal to 0. In some examples, video encoder 20 may set a variable NumAddRefPic equal to (curr_pic_as_ref_enabled_flag?1:0). In other examples, this syntax element may be added, additionally or alternatively, to other data structures, e.g., a sequence parameter set (SPS), a video parameter set (VPS), a slice header, or the like.

In current HEVC Range Extension standard, the MV for IntraBC is encoded using the motion vector difference (MVD) coding method in HEVC v1. However, due to the different characteristics of IntraBC MV field from conventional inter MV field, this coding method is not efficient. Motivated by this, in this disclosure, several MV coding methods are proposed. These example techniques may be implemented separately or in combination. For example, video encoder 20 and video decoder 30 may implement each technique separately, or may implement one or more techniques in combination. For example, this disclosure proposes several techniques to more efficiently code MVs.

The techniques are described with reference to a horizontal component of the MV (i.e., MV_x), although they may be equally applicable for the vertical component of the MV (i.e., MV_y). The techniques may be used on both the component of a one-dimensional motion vector and one or both of the components of a two-dimensional motion vector (i.e., horizontal component and vertical component). Additionally, the techniques refer to the binarization string for MV_x as including b0, b1, . . . , bn, where bi is the ith bin in the string. These techniques may be implemented by an entropy encoding unit of encoder 20, or by an entropy decoding unit of decoder 30. In other examples, these techniques may be implemented by a prediction processing unit of encoder 20, or by a prediction processing unit of decoder 30. In some examples, these techniques may be implemented by any combination of units of video encoder 20 and video decoder 30. For instance, in examples where video encoder 20 and video decoder 30 are implemented as an integrated circuit (IC) or a micro-controller, the techniques may be implemented by one or more units of the IC or micro-controller.

In a first example of the disclosure, the first bin b0 may indicate that the value of MV_x is non-zero. For example, b0 may equal 1 where abs(MV_x)>0 and b0 may equal zero where abs(MV_x)=0 (i.e., abs(MV_x)>0 (b0=1) or not (b0=0). The first bin b0 may be encoded or decoded (as applicable) using CABAC with a context. In some examples, the b0 for MV_x and MV_y may have separate contexts. In some examples, the b0 for MV_x and MV_y may share the same contexts. In some examples, the i-th bin in my coding of IntraMC may share the same contexts with the i-th bin in my coding of Inter MC. In some examples, the i-th bins in my coding of IntraMC and my coding of Inter MC may not share contexts.

Following bins b1b2 . . . may represent the value of abs(MV_x)−1. In some examples, the following bins b1b2 . . . may be encoded or decoded (as applicable) using Exponential Golomb codes with parameter 3 in Bypass mode. In some examples, other orders of Exponential Golomb codes may be used, e.g., 1, 2, 4, 5, and other codes may be used, e.g. Rice Golomb codes. Note that the order of Exponential Golomb codes or Rice Golomb codes may depend on a size of the CU. In some examples, b1 may represent whether abs(MV_x)=1 (i.e., b1=1) or not (i.e., b1=0). In some examples, b1 may be encoded or decoded (as applicable) with Bypass mode or with CABAC context. In such examples, b2b3 . . . may represent the value of abs(MV_x)−2 and may be encoded or decoded (as applicable) using Exponential Golomb codes with parameter 3 in Bypass mode.

In some examples, the last bin indicates the sign of MV_x. The last bin may be encoded or decoded (as applicable) in Bypass mode without any context. In some examples, the sign bin may be encoded or decoded (as applicable) using CABAC with one or multiple contexts. In some examples, the sign bins for MV_x and MV_y may have separate contexts. In some examples, the sign bins for MV_x and MV_y may share the same contexts.

In a second example of the disclosure, the first bin b0 may indicate whether the following b1b2 . . . represents the value of MV_x less an offset (i.e., MV_x−offset_x). For instance, b0 may equal one (i.e., b0=1) where the following b1b2 . . . represent the value of MV_x less the offset and b0 may equal zero (i.e., b0=0) where b1b2 . . . does not represent the value of MV_x less the offset. In some examples, such as where b1b2 . . . does not represent the value of MV_x less the offset, b1b2 . . . may represent the value of MV_x. In other words, the first bin b0 may indicate whether the following b1b2 . . . represents the value of (MV_x−offset_x) (b0=1) or not (MV_x) (b0=0). In some examples, the offset (i.e., offset_x) may correspond to a predefined value or may be a function of a property of the CU (e.g., the CU width). For instance the offset (offset_x) may be equal to a width of the CU multiplied by negative one (i.e., offset_x is −CUWidth). In some examples, MV_x and MV_y may have different offsets and each component has a separate b0. In some examples, MV_x and MV_y may share b0, and the offsets for MV_x and MV_y may be the same or different. In some examples, b0 may be encoded or decoded (as applicable) in Bypass mode without any context. In some examples, b0 may be encoded or decoded (as applicable) using CABAC with one or multiple contexts. In some examples, the b0 for MV_x and MV_y may have separate context. In some examples, the b0 for MV_x and MV_y may share the same contexts.

In some examples, such as where b0=1, b1b2 . . . may represent MV_x−offset_x. In some examples, such as where b0=0, b1b2 . . . may represent MV_x. In some examples, the coding method described above in the first example of the disclosure may be used to code b1b2 . . . . In other words, after b0, the (MV_x−offset_x) (b0=1) or (MV_x) (b0=0) may be represented with the following string b1b2 . . . , and the method described above in the first example may be used as the coding method. In some examples, other coding methods may be used to encode or decode (as applicable) b1b2 . . . . For instance, the MVD coding method in HEVC v1 may be used to code b1b2 . . . .

In a third example of the disclosure, the first bin b0 may indicate whether or not the following b1b2 . . . represents an absolute value of MV_x less an offset (i.e., (abs(MV_x)−offset_x)). For instance, b0 may equal one (i.e., b0=1) where the following b1b2 . . . represent the absolute value of MV_x less the offset and b0 may equal zero (i.e., b0=0) where the following b1b2 . . . do not represent the absolute value of MV_x less the offset. In some examples, such as where b1b2 . . . do not represent the absolute value of MV_x less the offset, b1b2 . . . may represent the absolute value of MV_x. In other words, the first bin b0 may indicate whether the following b1b2 . . . represents the value of (abs(MV_x)−offset_x) (b0=1) or not (abs(MV_x)) (b0=0). In some examples, the offset (i.e., offset_x) may correspond to a predefined value or may be a function of a property of the CU (e.g., a function of CU width). For instance the offset may be equal to a width of the CU multiplied by negative one (i.e., offset_x=−CUWidth). In some examples, MV_x and MV_y may have different offsets and each component has a separate b0. In some examples, MV_x and MV_y may share b0, and the offsets for MV_x and MV_y may be the same or different. In some examples, b0 may be encoded or decoded (as applicable) in Bypass mode without any context. In some examples, b0 may be encoded or decoded (as applicable) using CABAC with one or multiple contexts. In some examples, the b0 for MV_x and MV_y may have separate context. In some examples, the b0 for MV_x and MV_y may share the same contexts.

In some examples, the following bins b1b2 . . . may represent the value of (abs(MV_x)−offset_x), such as where b0=1, or may represent the value of (abs(MV_x)), such as where b0=0. In some examples, b1b2 may be encoded or decoded (as applicable) using Exponential Golomb codes with parameter 3 in Bypass mode. In some examples, other orders of Exponential Golomb codes may be used, e.g., 1, 2, 4, 5, and other codes may be used, e.g. Rice Golomb codes. In some examples, the order of Exponential Golomb codes or Rice Golomb codes may depend on the CU size.

It may be possible that b1 represents if the value of (abs(MV_x)−offset_x) (b0=1) or (abs(MV_x)) (b0=0)=1 or not (b1=0). In other words, if b0=1, then b1b2 . . . may represent the value of (abs(MV_x)−offset_x), and, in this case (i.e., where b0=1), if (abs(MV_x)−offset_x) equals 1, then b1=1, and if (abs(MV_x)−offset_x) does not equal 1, then b1=0. If b0=0, then b1b2 . . . may represent the value of (abs(MV_x)), and, in this case (i.e., where b0=0), if (abs(MV_x)) equals 1, then b1=1, and if (abs(MV_x)) does not equal 1, then b1=0.

In some examples, b1 may be encoded or decoded (as applicable) with Bypass mode or with CABAC context. In some examples, b2b3 . . . may represent the value of abs(MV_X)−2 and are may be encoded or decoded (as applicable) using Exponential Golomb codes with parameter 3 in Bypass mode. In some examples, the last bin may indicate the sign of MV_x, and it may be encoded or decoded (as applicable) in Bypass mode without any context. In some examples, the sign bin may be encoded or decoded (as applicable) using CABAC with one or multiple contexts. In some examples, the sign bins for MV_x and MV_y may have separate contexts. In some examples, the sign bins for MV_x and MV_y may share the same contexts.

Aspects of motion information, POC, CU structure, and motion prediction in HEVC will now be described. For each block, a set of motion information can be available. A set of motion information contains motion information for forward and backward prediction directions. Here forward and backward prediction directions are two prediction directions of a bi-directional prediction mode and the terms "forward" and "backward" do not necessarily have a geometry meaning, instead they correspond to reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, the motion information must contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

Picture order count (POC) is widely used in video coding standards to identify a display order of a picture. Although there are cases two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of a reference picture set, as in HEVC, and motion vector scaling.

In HEVC, the largest coding unit in a slice is called a coding tree block (CTB). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into two prediction units (PUs) or become just one PU when further partition does not apply. When two PUs are present in one CU, they can be half size rectangles or two rectangle size with ¼ or ¾ size of the CU.

When the CU is inter coded, one set of motion information is present for each PU. In addition, each PU is coded with a unique inter-prediction mode to derive the set of motion information. In HEVC, the smallest PU sizes are 8×4 and 4×8.

In HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined. As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Video encoder 20 selects predictive video block 104 for predicting current video block 102 from a set of previously reconstructed blocks of video data. Video encoder 20 reconstructs blocks of video data by inverse quantizing and inverse transforming the video data that is also included in the encoded video bitstream, and summing the resulting residual blocks with the predictive blocks used to predict the reconstructed blocks of video data. In the example of FIG. 5, intended region 108 within picture 103, which may also be referred to as an "intended area" or "raster area," includes the set of previously reconstructed video blocks. Video encoder 20 may define intended region 108 within picture 103 in variety of ways, as described in greater detail below. Video encoder 20 may select predictive video block 104 to predict current video block 102 from among the video blocks in intended region 108 based on an analysis of the relative efficiency and accuracy of predicting and coding current video block 102 based on various video blocks within intended region 108.

Video encoder 20 determines two-dimensional vector 106 representing the location or displacement of predictive video block 104 relative to current video block 102. Two-dimensional vector 106, which is an example of an offset vector, includes horizontal displacement component 112 and vertical displacement component 110, which respectively represent the horizontal and vertical displacement of predictive video block 104 relative to current video block 102. Video encoder 20 may include one or more syntax elements that identify or define two-dimensional vector 106, e.g., that define horizontal displacement component 112 and vertical displacement component 110, in the encoded video bitstream. Video decoder 30 may decode the one or more syntax elements to determine two-dimensional vector 106, and use the determined vector to identify predictive video block 104 for current video block 102.

In some examples, the resolution of two-dimensional vector 106 can be integer pixel, e.g., be constrained to have integer pixel resolution. In such examples, the resolution of horizontal displacement component 112 and vertical displacement component 110 will be integer pixel. In such examples, video encoder 20 and video decoder 30 need not interpolate pixel values of predictive video block 104 to determine the predictor for current video block 102.

In other examples, the resolution of one or both of horizontal displacement component 112 and vertical displacement component 110 can be sub-pixel. For example, one of components 112 and 110 may have integer pixel resolution, while the other has sub-pixel resolution. In some examples, the resolution of both of horizontal displacement component 112 and vertical displacement component 110 can be sub-pixel, but horizontal displacement component 112 and vertical displacement component 110 may have different resolutions.

In some examples, a video coder, e.g., video encoder 20 and/or video decoder 30, adapts the resolution of horizontal displacement component 112 and vertical displacement component 110 based on a specific level, e.g., block-level, slice-level, or picture-level adaptation. For example, video encoder 20 may signal a flag at the slice level, e.g., in a slice header, that indicates whether the resolution of horizontal displacement component 112 and vertical displacement component 110 is integer pixel resolution or is not integer pixel resolution. If the flag indicates that the resolution of horizontal displacement component 112 and vertical displacement component 110 is not integer pixel resolution, video decoder 30 may infer that the resolution is sub-pixel resolution. In some examples, one or more syntax elements, which are not necessarily a flag, may be transmitted for each slice or other unit of video data to indicate the collective or individual resolutions of horizontal displacement components 112 and/or vertical displacement components 110.

In still other examples, instead of a flag or a syntax element, video encoder 20 may set based on, and video decoder 30 may infer the resolution of horizontal displacement component 112 and/or vertical displacement component 110 from resolution context information. Resolution context information may include, as examples, the color space (e.g., YUV, RGB, or the like), the specific color format (e.g., 4:4:4, 4:2:2, 4:2:0, or the like), the frame size, the frame rate, or the quantization parameter (QP) for the picture or sequence of pictures that include current video block 102. In at least some examples, a video coder may determine the resolution of horizontal displacement component 112 and/or vertical displacement component 110 based on information related to previously coded frames or pictures. In this manner, the resolution of horizontal displacement component 112 and the resolution for vertical displacement component 110 may be pre-defined, signaled, may be inferred from other, side information (e.g., resolution context information), or may be based on already coded frames.

Current video block 102 may be a CU, or a PU of a CU. In some examples, a video coder, e.g., video encoder 20 and/or video decoder 30, may split a CU that is predicted according to IMC into a number of PUs. In such examples, the video coder may determine a respective (e.g., different) two-dimensional vector 106 for each of the PUs of the CU. For example, a video coder may split a 2N×2N CU into two 2N×N PUs, two N×2N PUs, or four N×N PUs. As other examples, a video coder may split a 2N×2N CU into ((N/2)×N+(3N/2)×N) PUs, ((3N/2)×N+(N/2)×N) PUs, (N×(N/2)+N×(3N/2)) PUs, (N×(3N/2)+N×(N/2)) PUs, four (N/2)×2N PUs, or four 2N×(N/2) PUs. In some examples, video coder may predict a 2N×2N CU using a 2N×2N PU.

Current video block 102 includes a luma video block (e.g., luma component) and a chroma video block (e.g., chroma component) corresponding to the luma video block. In some examples, video encoder 20 may only encode one or more syntax elements defining two-dimensional vectors 106 for luma video blocks into the encoded video bitstream. In such examples, video decoder 30 may derive two-dimensional vectors 106 for each of one or more chroma blocks corresponding to a luma block based on the two-dimensional vector signaled for the luma block. In the techniques described in this disclosure, in the derivation of the two-dimensional vectors for the one or more chroma blocks, video decoder 30 may modify the two-dimensional vector for the luma block if the two-dimensional vector for the luma block points to a sub-pixel position within the chroma sample.

Depending on the color format, e.g., color sampling format or chroma sampling format, a video coder may downsample corresponding chroma video blocks relative to the luma video block. Color format 4:4:4 does not include downsampling, meaning that the chroma blocks include the same number of samples in the horizontal and vertical directions as the luma block. Color format 4:2:2 is downsampled in the horizontal direction, meaning that there are half as many samples in the horizontal direction in the chroma blocks relative to the luma block. Color format 4:2:0 is downsampled in the horizontal and vertical directions, meaning that there are half as many samples in the horizontal and vertical directions in the chroma blocks relative to the luma block.

In examples in which video coders determine vectors 106 for chroma video blocks based on vectors 106 for corresponding luma blocks, the video coders may need to modify the luma vector. For example, if a luma vector 106 has integer resolution with horizontal displacement component 112 and/or vertical displacement component 110 being an odd number of pixels, and the color format is 4:2:2 or 4:2:0, the converted luma vector may not point an integer pixel location in the corresponding chroma block. In such examples, video coders may scale the luma vector for use as a chroma vector to predict a corresponding chroma block.

Figure 6:
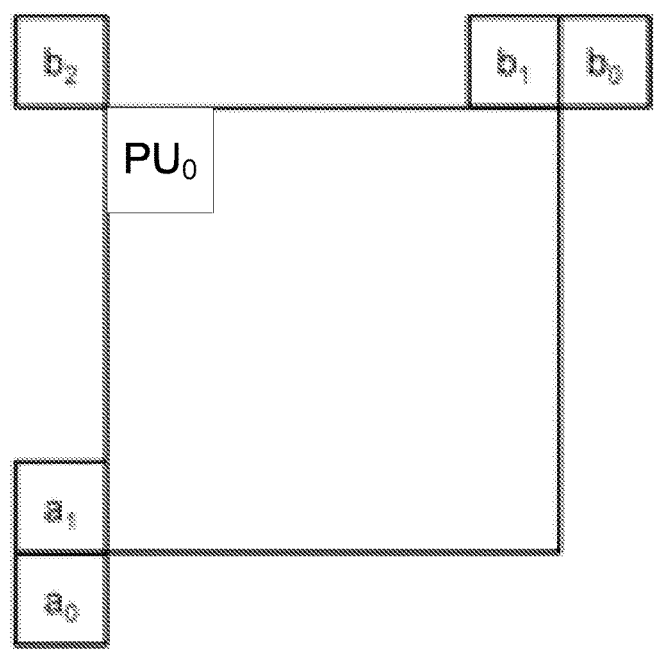
FIG. 6 shows examples of spatial neighboring motion vector candidates for merge and AMVP modes.

FIG. 6 shows an example of neighboring blocks that may be used to derive spatial MV candidates for a specific PU ($PU_0$) coded in a merge mode or AMVP mode. The techniques used for generating the candidates from the blocks may differ for merge and AMVP modes. In merge mode, for example, the availability of each of the five spatial MV candidates shown in FIG. 6 may be checked according to a certain order. HEVC, for example, uses the order: $a_1$, $b_1$, $b_0$, $a_0$, $b_2$.

In AMVP mode, the neighboring blocks are divided into two groups: left group consisting of the block $a_0$ and $a_1$, and above group consisting of the blocks $b_0$, $b_1$, and $b_2$ as shown in FIG. 6. For the left group, the availability is checked according to the order: $\{a_0, a_1\}$. For the above group, the availability is checked according to the order: $\{b_0, b_1, b_2\}$. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Motion vector for chroma coding and parallel processing of merge/level in HEVC will now be discussed. The motion vector is derived for the luma component of a current PU/CU, before it is used for chroma motion compensation, the motion vector is scaled, based on the chroma sampling format.

In HEVC, a LCU may be divided into parallel motion estimation regions (MERs) and allow only those neighboring PUs which belong to different MERs from the current PU to be included in the merge/skip MVP list construction process. The size of the MER is signalled in picture parameter set as log 2_parallel_merge_level_minus2. When MER size is larger than N×N, wherein 2N×2N is the smallest CU size, MER takes effect in a way that a spatial neighboring block, if it is inside the same MER as the current PU, it is considered as unavailable.

The Intra Block Copy (BC) has been included in current SCC. An example of Intra BC is shown in FIG. 5 above, wherein the current CU/PU is predicted from an already decoded block of the current picture/slice. Note that prediction signal is reconstructed but without in-loop filtering, including de-blocking and Sample Adaptive Offset (SAO).

In block compensation, for the luma component or the chroma components that are coded with Intra BC, the block compensation is done with integer block compensation. As such, no interpolation is needed. The block vector is predicted and signalled at the integer level.

In current SCC, the block vector predictor is set to (−w, 0) at the beginning of each CTB, where w is the width of the CU. Such a block vector predictor is updated to be the one of the latest coded CU/PU if that is coded with Intra BC mode. If a CU/PU is not coded with Intra BC, the block vector predictor remains unchanged. After block vector prediction, the block vector difference is encoded using the MV difference (MVD) coding method is HEVC.

The current Intra BC is enabled at both CU and PU level. For PU level intra BC, 2N×N and N×2N PU partition is supported for all the CU sizes. In addition, when the CU is the smallest CU, N×N PU partition is supported.

In accordance with techniques of the current disclosure, a video coding device may treat Intra BC blocks as Inter blocks. In JCTVC-R0100, the unification of Intra BC mode and Inter mode is proposed. As such, the current picture may be used as a reference picture and added into the reference list. Once the current picture is added to the reference list, the Intra BC block is treated as if the block was coded in Inter mode. The current picture is marked as long-term before the current picture is decoded, and marked to short-term after the decoding of current picture. When Intra BC is enabled, the syntax parsing process and decoding process of a P-slice is followed for an I-slice.

Existing IBC techniques may have some shortcomings. For example, when Intra BC is treated as Inter, the conventional slice type signaling will cause extra condition checking in the decoding process. Also, some problems may exist for the interaction between a temporal motion vector predictor (TMVP), constrained intra prediction, Intra BC MV precision, and so on.

According to the techniques of this disclosure, to enable a better unification of Intra BC modes and Inter modes where Intra BC mode may be treated as Inter mode and the current picture is added to the reference list 0 (or the reference list 1, or both), the following techniques are proposed. Although the prediction modes can be the same (MODE_INTER), a video coding device may differentiate the Intra BC blocks the conventional Inter blocks by checking whether the reference picture identified by the reference index associated the block is the current picture (i.e. whether the reference picture has the same POC value as the current picture). If the reference picture and the current picture have the same POC value, then the current block may be considered an Intra BC block. Otherwise, the current block may be considered a conventional Inter block.

In unifying Intra BC mode and Inter mode, a video coding device may implement numerous other changes. For instance, an IRAP picture (i.e., a VCL NAL unit has nal_unit_type in the range of BLA_W_LP to RSV_I-RAP_VCL23) may not contain I-slices. Instead, an IRAP picture may include P-slices or B-slices. In such examples, the motion vector of the P-slice references a block within the current picture. In further examples, the bi-predictive motion vectors of the B-slice both reference video blocks within the current picture. In the case of the IRAP picture containing a B-slice, a video coding device may further signal weights to be applied to the different motion vectors of the B-slice. For instance, one motion vector may have a weight of 25% and a second motion vector may have a weight of 75%.

Further, an IRAP picture may contain syntax elements that specify a non-empty RPS. For instance, the RPS may include a syntax element representing a delta-POC value, or a range of POC values that the reference picture may fall in. The RPS may contain other syntax elements, such as flags that define various properties of the RPS and what pictures may be included in the RPS, in accordance with HEVC standards.

A reference picture may include already decoded non-filtered (SAO/deblocking) samples of the current picture. This reference picture may be included in the reference picture set. When prediction is applied from this reference picture (current picture), it may be considered as Inter mode for rest of the decoding process. In one example, a flag is transmitted in a slice header, an SPS, a PPS, a VPS, or elsewhere, indicating whether the current picture is used as a reference picture for inter prediction.

In one example, when a particular picture referring to the SPS may be included in a reference picture list of the particular picture itself is equal to 1, there may be no I-slice in CVSs referring to the SPS. In another example, when a syntax element that indicates whether a particular picture referring to the PPS may be included in a reference picture list of the particular picture itself is equal to 1 (i.e., indicates that the particular picture is included in the reference picture list), there may be no I-slice in the picture referring to the PPS. The example could be extended to VPS or slice header granularity level.

In one example, when current picture is used as reference picture, the variable NumPicTotalCurr (i.e., the number of pictures that may be used as reference for prediction of the current picture) is modified as follows:

```
NumPicTotalCurr = 0
for( i = 0; i < NumNegativePics[ CurrRpsIdx ]; i++ )
    if( UsedByCurrPicS0[ CurrRpsIdx ][ i ] )
        NumPicTotalCurr++
for( i = 0; i < NumPositivePics[ CurrRpsIdx ]; i++ )   (7-54)
    if( UsedByCurrPicS1[ CurrRpsIdx ][ i ] )
        NumPicTotalCurr++
for( i = 0; i < num_long_term_sps + num_long_term_pics; i++ )
    if( UsedByCurrPicLt[ i ] )
        NumPicTotalCurr++
if( curr_pic_as_ref_enabled_flag )
    NumPicTotalCurr++
```

The variable NumPicTotalCurr may depend on whether a particular picture may be included in a reference picture list of the particular picture itself.

The syntax element curr_pic_as_ref_enabled_flag may be defined such that curr_pic_as_ref_enabled_flag is set to equal 1 to specify that a particular picture referring to the SPS may be included in a reference picture list of the particular picture itself. Conversely, curr_pic_as_ref_enabled_flag is set equal to 0 to specify that a particular picture referring to the SPS is never included in any reference picture list of the particular picture itself. When the syntax element itself is not present, the value of curr_pic_as_ref_enabled_flag is inferred to be equal to 0. Additionally, if the current picture is a BLA or CRA picture, the value of NumPicTotalCurr shall be equal to curr_pic_as_ref_enabled_flag. Otherwise, when the current picture contains a P-slice or a B-slice, the value of NumPicTotalCurr shall not be equal to curr_pic_as_ref_enabled_flag. Further, the syntax element NumPicTotalCurr may be less than or equal to 8+curr_pic_as_ref_enabled_flag.

In some examples, when the current picture is used as a reference picture, the derivation process for the construction of the reference picture lists is modified such that the variable NumRpsCurrTempList0 is set equal to Max (num_ref_idx_l0_active_minus1+1, NumPicTotalCurr). Further, the list RefPicListTemp0 is constructed as follows:

```
rIdx = 0
while( rIdx < NumRpsCurrTempList0 ) {
  for( i = 0; i < NumPocStCurrBefore && rIdx < NumRpsCurrTempList0;
rIdx++, i++ )
    RefPicListTemp0[ rIdx ] = RefPicSetStCurrBefore[ i ]
  if( curr_pic_as_ref_enabled_flag )
    RefPicListTemp0[ rIdx++ ] = currPic
  for( i = 0; i < NumPocStCurrAfter && rIdx < NumRpsCurrTempList0;
rIdx++, i++ )   (8-8)
    RefPicListTemp0[ rIdx ] = RefPicSetStCurrAfter[ i ]
  for( i = 0; i < NumPocLtCurr && rIdx < NumRpsCurrTempList0;
rIdx++, i++ )
    RefPicListTemp0[ rIdx ] = RefPicSetLtCurr[ i ]
}
```

The list RefPicList0 is constructed as follows:
for(rIdx=0; rIdx<=num_ref_idx_l0_active_minus1; rIdx++) (8-9)
RefPicList0[rIdx]=ref_pic_list_modification_flag_l0?
RefPicListTemp0[list_entry_l0[rIdx]]: RefPicListTemp0[rIdx]

When the slice is a B slice, the variable NumRpsCurrTempList1 is set equal to Max(num_ref_idx_l1_active_minus1+1, NumPicTotalCurr) and the list RefPicListTemp1 is constructed as follows:

```
rIdx = 0
while( rIdx < NumRpsCurrTempList1 ) {
    for( i = 0; i < NumPocStCurrAfter && rIdx <
NumRpsCurrTempList1; rIdx++, i++ )
        RefPicListTemp1[ rIdx ] = RefPicSetStCurrAfter[ i ]
    if( curr_pic_as_ref_enabled_flag )
        RefPicListTemp1[ rIdx++ ] = currPic
    for( i = 0; i < NumPocStCurrBefore && rIdx <
NumRpsCurrTempList1; rIdx++, i++ )    (8-10)
        RefPicListTemp1[ rIdx ] = RefPicSetStCurrBefore[ i ]
    for( i = 0; i < NumPocLtCurr && rIdx < NumRpsCurrTempList1;
rIdx++, i++ )
        RefPicListTemp1[ rIdx ] = RefPicSetLtCurr[ i ]
}
```

As described above, the MV corresponding to Intra BC may be coded and used with integer-pel precision, or the sub-pixel precision, such as ¼ pel precision in HEVC. Generally, the Intra BC MV precision may be a precision which is different from the MV precision in the Inter mode. In some examples below, the described technique is provided for integer-pel Intra BC MV precision; however it should be understood that other precision rather than integer-pel can be applied and should be considered within the scope of this disclosure.

In one example, a flag may be transmitted for a block in a slice header, an SPS, a PPS, a VPS, or elsewhere. The flag may indicate whether the current Intra BC block, group of Intra BC blocks or all the Intra BC blocks within the scope may have MV maintained with integer-pel precision or sub-pel precision, such as ¼, ⅛ pel, and similar precision, for example as defined in HEVC. For example, the scope can be a block, group of blocks, slice, picture, or entire sequence.

In one example, an MV associated with the Intra BC block can have integer-pel precision, i.e. the MV may be coded and associated with the block in integer-pel precision. In such examples, AMVP derivation, Merge candidate derivation, or MVD coding of related processes can be used transparently without any change with any one of the following methods. First, the usage of conventional long-term reference pictures during the MV predictor derivation process for Intra BC block may be disallowed to avoid issues related to MV scaling, which in particular may lead to inefficient MV candidate, assuming that Intra BC is enabled by adding the current picture to reference picture list and that reference picture is marked as long-term. Conversely, the conventional long-term reference pictures may still be allowed during the MV predictor derivation process for Intra BC block, assuming Intra BC is enabled by adding the current picture to reference list and marking this reference picture as long-term reference picture. However, according to the HEVC design, the value of MVs corresponding to long-term reference pictures may be directly used without MV scaling in the MV candidate derivation process no matter the precision is integer-pel precision or not.

Alternatively or additionally, when Intra BC MV has integer-pel precision, the MVs of the spatial neighbor blocks or the collocated block that can be used in MV candidate derivation process (AMVP and Merge modes) may point to conventional long-term reference pictures. In such a case, those MV predictor candidates may be converted to integer-pel precision prior to be used in the candidate derivation process. Also, this precision conversion process can be performed before or after the pruning process in the MV predictor candidate derivation process for Intra BC block.

The conversion, for example, can be done by rounding process, such as right shift or rounded right shift. Alternatively, the MV predictor candidate derivation process might be kept unchanged as in regular Inter mode, but the MVs in the final candidate list are converted to the Intra BC accuracy (integer pel). Similarly, before the Intra BC MVs are used as the candidates for the predictor derivation processes for conventional Inter, they are converted to the MV precision of conventional Inter, for example by left shift.

In another example, assuming that Intra BC is enabled by adding the current picture to reference picture list and that reference picture is marked as long-term, during the MV predictor derivation process for Intra BC block, it is possible that the spatial neighbor blocks or the collocated blocks are considered as unavailable if their reference pictures are regular long-term picture (not the current picture). Similarly, during the MV predictor derivation process for Inter block with the reference picture being the regular long-term reference picture (not the current picture), it is possible that the spatial neighbor blocks or the collocated blocks are considered as unavailable if they are Intra BC blocks. Alternatively, the Intra BC blocks and the Inter blocks with the reference picture being the regular long-term reference picture are considered as available for each other during the MV predictor derivation process.

In another example, when an Intra BC MV used for Intra BC mode is coded and associated with the block in the same precision as the conventional Inter mode precision, such as ¼ pel precision in HEVC, AMVP, Merge, or MVD coding related processes can be used transparently without any change. Alternatively, an MV can be coded with integer-pel precision but stored with the Intra BC block MV may have the same precision as the conventional Inter mode. Thus, the MVD can be coded in integer-pel precision too. In this case, at the decoder side, the stored MV in the same precision as the conventional Inter can be derived as

MV=(MVP>>2+MVD)<<2, where MVP is the corresponding MV predictor in the Inter mode precision and MVD can be with integer-pel accuracy. Other conversion mechanism or rounding is applicable. For Intra BC merge, the MVD is zero and MVP is the MV from the corresponding merge candidate.

If an Intra BC MV is stored with integer-pel precision, the Intra BC MV can be converted to the Inter mode MV precision. For example, the Intra BC MV may undergo a left shift, then the whole deblocking module of the conventional Inter mode can be used without any change. The deblocking filter strength can be derived according to the MV value, since the Intra BC and Inter mode may have different MV precision it might be desirable to make the MV precisions equal for better picture quality, for example Intra BC.

If an Intra BC MV is stored with integer-pel precision, the Intra BC MV can be converted to the MV precision of conventional Inter mode, for example by left shift, then the luma motion compensation module for conventional Inter mode can be used without any change. For a chroma component, a video coder can use the chroma motion compensation module for conventional Inter mode without any change, or the video coder can use other chroma motion compensation method when the chroma sampling is not 4:4:4 and partition mode is not 2N×2N.

In the following cases, TMVP used for MV predictor derivation and merge may be disallowed. The TMVP can be disallowed by different ways. For example, a TMVP enable flag may be disabled, or a merge index or MVP index associated with the TMVP candidate may not be signaled in the bitstream and used for prediction. In another example, when Intra BC is enabled by adding the current picture to the reference list, TMVP for MV predictor derivation and merge is disallowed if the reference list only contains the current picture. Additionally, a TMVP enabling flag might not be transmitted, which is inferred to be 0. In another example, when both Intra BC and constrained intra prediction are enabled, assuming the prediction for Intra or Intra BC block can only be from Intra block or the Intra BC block, the TMVP is disallowed for MV predictor derivation and merge processes.

The partition modes allowed for Intra BC might be different from or the same as conventional Inter. In one example, the partition modes allowed for Intra BC and the partition mode signaling are exactly the same as conventional Inter, except that the N×N partition mode is allowed when the CU size is 8×8, which means the Intra BC block size can be 4×4. It is possible that whether to allow 4×4 Intra BC block depends on the block vector precision for Intra BC. For example, the 4×4 Intra BC block is allowed only when the MV precision for Intra BC is integer-pel. When 4×4 Intra BC block is allowed, it may be restricted such that all the 4×4 blocks should be Intra BC blocks if there is any 4×4 Intra BC block in the same CU. Alternatively, when a 4×4 Intra BC block is allowed, for each CU, it may include both 4×4 Intra BC block and 4×4 conventional Inter block.

In this case, it may be restricted that the MV precision for both 4×4 Intra BC block and 4×4 Inter block is integer-pel. In another example, the partition modes allowed for Intra BC and the partition mode signaling are exactly the same as conventional Inter. For example, there may be no 4×4 Intra BC block. Thus, the parsing and decoding module for the partition mode can be used without any change.

The MV predictor derivation for Intra BC may be different from or the same as conventional Inter. In one example, the MV predictor derivation is the same as conventional Inter. In another example, the MV predictor derivation utilizes AMVP for the conventional Inter mode, and other methods are utilized for Intra BC mode. Further, the MVD coding for Intra BC might be different from or the same as conventional Inter.

Stored Intra BC MV may have the same accuracy as for conventional Inter prediction, and MV conversion to the Intra BC accuracy, for example integer-pel, may be done only for certain color components. For example, a luma component may use the stored MV accuracy (high MV precision) and a chroma component may convert MV to the integer-pel accuracy (lower MV precision), for example during chroma motion compensation stage.

When a particular picture is included in a reference picture list of the particular picture itself is equal to 1, and when the refIdx of the current prediction unit points to the picture itself, then it may be a requirement for the bitstream conformance that all the prediction units within the CU should have same refIdx. That is, when at least one prediction unit references from the current picture in a CU all the prediction units shall only reference from the current picture. When a particular picture is included in a reference picture list of the particular picture itself is equal to 1, and when the refIdx of the current prediction unit points to the picture itself, then may be a requirement for the bitstream conformance that none of the prediction samples (from the current picture) shall cross the picture boundary. In other words, each prediction sample from the current picture may be within the picture boundary of the current picture.

It may be constrained such that the current picture cannot be used as the collocated picture in TMVP for the current picture itself. Alternatively, it is also possible that the current picture is used as collocated picture in TMVP. In this case the TMVP is set to be unavailable, or TMVP is treated available and the MV used for TMVP might be set with predefined default MVs, such as but limited to, (−2w, 0), (2w, 0), (−w, 0), (w, 0), (0, −h), (0, −2h), (0, h), (0, 2h), (−8, 0), (0, 8), (0,0), where w and h are the width and height of current CU, PU or CTB.

When adaptive MV resolution is used for the conventional Inter (e.g. JCTVC-0085) at different levels, e.g., MV component, PU/CU/CTU/slice/PPS/SPS/VPS, MV can be coded using Integer-pel precision or fractional-pel precision. As one example, when MV of the conventional Inter mode is coded with integer-pel precision but stored with quarter-pel precision. Thus, the MVD can be coded in integer-pel precision too. In this case, at the decoder side, the stored MV with quarter-pel precision can be derived as

MV=(MVP>>2+MVD)<<2, where MVP is the corresponding MV predictor in the Inter mode precision and MVD can be with integer-pel accuracy. Other conversion mechanism or rounding is applicable. For Intra BC merge, the MVD is zero and MVP is the MV from the corresponding merge candidate.

As another example, when MV of the conventional Inter mode is coded with integer-pel precision, the MV can be stored with integer-pel precision, and the MVD can be coded in integer-pel precision too. The derivation for MVP candidate in AMVP or merge candidate in merge can be the same as in HEVC by directly using the MV values of AMVP candidates or merge candidates without considering whether these MV values are stored in integer-pel precision or fractional-pel precision. In another example, the quarter-pel precision MVP candidate in AMVP or merge candidate in merge is converted to integer-pel precision first before being used.

A BLA picture does not refer to any other picture for its coding, and may be the first picture in the bitstream in decoding order or appear later in the bitstream. Each BLA picture begins a new CVS, and has the same effect on the decoding process as an IDR picture. However, a BLA picture contains syntax elements that specify a non-empty RPS. When a BLA picture for which each VCL NAL unit has nal_unit_type equal to BLA_W_LP, it may have associated RASL pictures, which are not output by the decoder and may not be decodable, as they may contain references to pictures that are not present in the bitstream. When a BLA picture for which each VCL NAL unit has nal_unit_type equal to BLA_W_LP, it may also have associated RADL pictures, which are specified to be decoded. When a BLA picture for which each VCL NAL unit has nal_unit_type equal to BLA_W_RADL, it does not have associated RASL pictures but may have associated RADL pictures. When a BLA picture for which each VCL NAL unit has nal_unit_type equal to BLA_N_LP, it does not have any associated leading pictures.

CRA picture does not refer to any other picture for its coding, and may be the first picture in the bitstream in decoding order, or may appear later in the bitstream. A CRA picture may have associated RADL or RASL pictures. Same as BLA pictures, a CRA picture may contain syntax elements that specify a non-empty RPS. When a CRA picture has NoRaslOutputFlag equal to 1, the associated RASL pictures are not output by the decoder, because they may not be decodable, as they may contain references to pictures that are not present in the bitstream.

An IDR picture does not refer to any other picture for its coding, and may be the first picture in the bitstream in decoding order or appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

Inter prediction may be a prediction derived in a manner that is dependent on data elements (e.g. sample values or motion vectors) of one or more reference pictures. Intra prediction as a prediction derived from only data elements (e.g. sample values) of the same decoded slice without referring to a reference picture.

An IRAP picture does not refer to any other picture for its coding, and may be a BLA picture, a CRA picture, or an IDR picture. The first picture in the bitstream in decoding order must be an IRAP picture. Provided the necessary parameter sets are available when they need to be activated, the IRAP picture and all subsequent non-RASL pictures in decoding order can be correctly decoded without performing the decoding process of any pictures that precede the IRAP picture in decoding order. There may be pictures in a bitstream that does not refer to any other picture for their coding that are not IRAP pictures. A reference picture contains samples that may be used for inter prediction in the decoding process of the current picture or subsequent pictures in decoding order.

A reference picture set may be a set of reference pictures associated with a picture, consisting of all reference pictures that are prior to the associated picture in decoding order, that may be used for inter prediction of the associated picture or any picture following the associated picture in decoding order.

Inputs to the coding process may include the luma location (xCb, yCb) of the top-left sample of the current luma coding block relative to the top-left luma sample of the current picture, a variable nCbS specifying the size of the current luma coding block, the luma location (xPb, yPb) of the top-left sample of the current luma prediction block relative to the top-left luma sample of the current picture, two variables nPbW and nPbH specifying the width and the height of the current luma prediction block, a variable partIdx specifying the partition index of the current prediction unit within the current coding unit, and the luma location (xNbY, yNbY) covered by a neighbouring prediction block relative to the top-left luma sample of the current picture.

Outputs of the coding process is the availability of the neighbouring prediction block covering the location (xNbY, yNbY), denoted as availableN, which is derived as follows: The variable sameCb specifying whether the current luma prediction block and the neighbouring luma prediction block cover the same luma coding block. If all of the following conditions are true, sameCb is set equal to TRUE: xCb is less than or equal than xNbY, yCb is less than or equal than yNbY, (xCb+nCbS) is greater than xNbY, and (yCb+nCbS) is greater than yNbY. Otherwise, sameCb is set equal to FALSE.

The neighbouring prediction block availability availableN is derived as follows: If sameCb is equal to FALSE, the derivation process for z-scan order block availability as specified in subclause 6.4.1 is invoked with (xCurr, yCurr) set equal to (xPb, yPb) and the luma location (xNbY, yNbY) as inputs, and the output is assigned to availableN. Otherwise, if all of the following conditions are true, availableN is set equal to FALSE: (nPbW<<1) is equal to nCbS, (nPbH<<1) is equal to nCbS, partIdx is equal to 1, (yCb+nPbH) is less than or equal to yNbY, and (xCb+nPbW) is greater than xNbY. Otherwise, availableN is set equal to TRUE. When availableN is equal to TRUE, CuPredMode [xPb][yPb] is equal to MODE_INTER and CuPredMode [xNbY][yNbY] is equal to MODE_INTRA, availableN is set equal to FALSE.

Syntax for various syntax elements described herein include the following tables. Relevant portions of the HEVC standard updated by these tables will be provided in the header of each table.

Section 7.3.2.2.3

| sps_scc_extensions( ) { | Descriptor |
| --- | --- |
| curr_pic_as_ref_enabled_flag | u(1) |
| palette_mode_enabled_flag | u(1) |
| residual_adaptive_colour_transform_enabled_flag | u(1) |
| } | |

Section 7.3.8.5

| coding_unit( x0, y0, log2CbSize ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     if( palette_mode_enabled_flag && ChromaArrayType = = 3 ) | |
|       palette_mode_flag[ x0 ][ y0 ] | ae(v) |
|     if( palette_mode_flag[ x0 ][ y0 ] ) | |
|       palette_coding( x0, y0, nCbS ) | |
|     else { | |
|       if( CuPredMode[ x0 ][ y0 ] != MODE_INTRA \|\| | |
|         log2CbSize = = MinCbLog2SizeY ) | |
|         part_mode | ae(v) |
|       if( CuPredMode[ x0 ][ y0 ] = = MODE_INTRA ) { | |
|         if( PartMode = = PART_2Nx2N && pcm_enabled_flag && | |
|           log2CbSize >= Log2MinIpcmCbSizeY && | |
|           log2CbSize <= Log2MaxIpcmCbSizeY ) | |
|         pcm_flag[ x0 ][ y0 ] | ae(v) |
|         if( pcm_flag[ x0 ][ y0 ] ) { | |
|           while( !byte_aligned( ) ) | |
|             pcm_alignment_zero_bit | f(1) |
|           pcm_sample( x0, y0, log2CbSize ) | |
|         } else { | |
|           pbOffset = ( PartMode = = PART_NxN ) ? ( nCbS / 2 ) : nCbS | |
|           for( j = 0; j < nCbS; j = j + pbOffset ) | |
|             for( i = 0; i < nCbS; i = i + pbOffset ) | |
|               prev_intra_luma_pred_flag[ x0 + i ][ y0 + j ] | ae(v) |
|           for( j = 0; j < nCbS; j = j + pbOffset ) | |
|             for( i = 0; i < nCbS; i = i + pbOffset ) | |
|               if( prev_intra_luma_pred_flag[ x0 + i ][ y0 + j ] ) | |
|                 mpm_idx[ x0 + i ][ y0 + j ] | ae(v) |
|               else | |
|                 rem_intra_luma_pred_mode[ x0 + i ][ y0 + j ] | ae(v) |
|           if( ChromaArrayType = = 3 ) | |
|             for( j = 0; j < nCbS; j = j + pbOffset ) | |
|               for( i = 0; i < nCbS; i = i + pbOffset ) | |
|                 intra_chroma_pred_mode[ x0 + i ][ y0 + j ] | ae(v) |
|           else if( ChromaArrayType != 0 ) | |
|             intra_chroma_pred_mode[ x0 ][ y0 ] | ae(v) |
|         } | |
|       } else { | |
|         if( PartMode = = PART_2Nx2N ) | |
|           prediction_unit( x0, y0, nCbS, nCbS ) | |
|         else if( PartMode = = PART_2NxN ) { | |
|           prediction_unit( x0, y0, nCbS, nCbS / 2 ) | |
|           prediction_unit( x0, y0 + ( nCbS / 2 ), nCbS, nCbS / 2 ) | |
|         } else if( PartMode = = PART_Nx2N ) { | |
|           prediction_unit( x0, y0, nCbS / 2, nCbS ) | |
|           prediction_unit( x0 + ( nCbS / 2 ), y0, nCbS / 2, nCbS ) | |
|         } else if( PartMode = = PART_2NxnU ) { | |
|           prediction_unit( x0, y0, nCbS, nCbS / 4 ) | |
|           prediction_unit( x0, y0 + ( nCbS / 4 ), nCbS, nCbS * 3 / 4 ) | |
|         } else if( PartMode = = PART_2NxnD ) { | |
|           prediction_unit( x0, y0, nCbS, nCbS * 3 / 4 ) | |
|           prediction_unit( x0, y0 + ( nCbS * 3 / 4 ), nCbS, nCbS / 4 ) | |
|         } else if( PartMode = = PART_nLx2N ) { | |
|           prediction_unit( x0, y0, nCbS / 4, nCbS ) | |
|           prediction_unit( x0 + ( nCbS / 4 ), y0, nCbS * 3 / 4, nCbS ) | |
|         } else if( PartMode = = PART_nRx2N ) { | |
|           prediction_unit( x0, y0, nCbS * 3 / 4, nCbS ) | |
|           prediction_unit( x0 + ( nCbS * 3 / 4 ), y0, nCbS / 4, nCbS ) | |
|         } else { /* PART_NxN */ | |
|           prediction_unit( x0, y0, nCbS / 2, nCbS / 2 ) | |
|           prediction_unit( x0 + ( nCbS / 2 ), y0, nCbS / 2, nCbS / 2 ) | |
|           prediction_unit( x0, y0 + ( nCbS / 2 ), nCbS / 2, nCbS / 2 ) | |
|           prediction_unit( x0 + ( nCbS / 2 ), y0 + ( nCbS / 2 ), nCbS / 2, nCbS / 2 ) | |
|         } | |
|       } | |
|       if( !pcm_flag[ x0 ][ y0 ] ) { | |
|         if( CuPredMode[ x0 ][ y0 ] != MODE_INTRA && | |
|           !( PartMode = = PART_2Nx2N && merge_flag[ x0 ][ y0 ] ) ) | |

-continued

| coding_unit( x0, y0, log2CbSize ) { | Descriptor |
|---|---|
|       rqt_root_cbf | ae(v) |
|     if( rqt_root_cbf ) { | |
|       if( residual_adaptive_colour_transform_enabled_flag && | |
|         ( CuPredMode[ x0 ][ y0 ] = = MODE_INTER \|\| | |
|         intra_chroma_pred_mode[ x0 ][ y0 ] = = 4 ) ) | |
|         cu_residual_act_flag | |
|       MaxTrafoDepth = ( CuPredMode[ x0 ][ y0 ] = = MODE_INTRA ? | |
|         ( max_transform_hierarchy_depth_intra + IntraSplitFlag ) : | |
|         max_transform_hierarchy_depth_inter ) | |
|       transform_tree( x0, y0, x0, y0, log2CbSize, 0, 0 ) | |
|     } | |
|   } | |
| } | |

Section 7.3.8.9

| transform_tree( x0, y0, xBase, yBase, log2TrafoSize, trafoDepth, blkIdx ) { | Descriptor |
|---|---|
|   if( log2TrafoSize <= MaxTbLog2SizeY && | |
|     log2TrafoSize > MinTbLog2SizeY && | |
|     trafoDepth < MaxTrafoDepth && !( IntraSplitFlag && ( trafoDepth = = 0 ) ) ) | |
|     split_transform_flag[ x0 ][ y0 ][ trafoDepth ] | ae(v) |
|   if( ( log2TrafoSize > 2 && ChromaArrayType != 0 ) \|\| ChromaArrayType = = 3 ) { | |
|     if( trafoDepth = = 0 \|\| cbf_cb[ xBase ][ yBase ][ trafoDepth − 1 ] ) { | |
|       cbf_cb [ x0 ][ y0 ][ trafoDepth ] | ae(v) |
|       if( ChromaArrayType = = 2 && | |
|         ( !split_transform_flag[ x0 ][ y0 ][ trafoDepth ] \|\| log2TrafoSize = = 3 ) ) | |
|         cbf_cb[ x0 ][ y0 + ( 1 << ( log2TrafoSize − 1 ) ) ][ trafoDepth ] | ae(v) |
|     } | |
|     if( trafoDepth = = 0 \|\| cbf_cr[ xBase ][ yBase ][ trafoDepth − 1 ] ) { | |
|       cbf_cr[ x0 ][ y0 ][ trafoDepth ] | ae(v) |
|       if( ChromaArrayType = = 2 && | |
|         ( !split_transform_flag[ x0 ][ y0 ][ trafoDepth ] \|\| log2TrafoSize = = 3 ) ) | |
|         cbf_cr[ x0 ][ y0 + ( 1 << ( log2TrafoSize − 1 ) ) ][ trafoDepth ] | ae(v) |
|     } | |
|   } | |
|   if( split_transform_flag[ x0 ][ y0 ][ trafoDepth ] ) { | |
|     x1 = x0 + ( 1 << ( log2TrafoSize − 1 ) ) | |
|     y1 = y0 + ( 1 << ( log2TrafoSize − 1 ) ) | |
|     transform_tree( x0, y0, x0, y0, log2TrafoSize − 1, trafoDepth + 1, 0 ) | |
|     transform_tree( x1, y0, x0, y0, log2TrafoSize − 1, trafoDepth + 1, 1 ) | |
|     transform_tree( x0, y1, x0, y0, log2TrafoSize − 1, trafoDepth + 1, 2 ) | |
|     transform_tree( x1, y1, x0, y0, log2TrafoSize − 1, trafoDepth + 1, 3 ) | |
|   } else { | |
|     if( CuPredMode[ x0 ][ y0 ] = = MODE_INTRA | |
|       \|\| trafoDepth != 0 \|\| cbf_cb[ x0 ][ y0 ][ trafoDepth ] \|\| | |
|       cbf_cr[ x0 ][ y0 ][ trafoDepth ] \|\| ( ChromaArrayType = = 2 && | |
|       ( cbf_cb[ x0 ][ y0 + ( 1 << ( log2TrafoSize − 1 ) ) ][ trafoDepth ] \|\| | |
|       cbf_cr[ x0 ][ y0 + ( 1 << ( log2TrafoSize − 1 ) ) ][ trafoDepth ] ) ) ) | |
|       cbf_luma[ x0 ][ y0 ][ trafoDepth ] | ae(v) |
|     transform_unit( x0, y0, xBase, yBase, log2TrafoSize, trafoDepth, blkIdx ) | |
|   } | |
| } | |

Section 7.3.8.12

| transform_unit( x0, y0, xBase, yBase, log2TrafoSize, trafoDepth, blkIdx ) { | Descriptor |
|---|---|
|   log2TrafoSizeC = Max( 2, log2TrafoSize − ( ChromaArrayType = = 3 ? 0 : 1 ) ) | |
|   cbfDepthC = trafoDepth − ( ChromaArrayType != 3 && log2TrafoSize = = 2 ? 1 : 0 ) | |
|   xC = ( ChromaArrayType != 3 && log2TrafoSize = = 2 ) ? xBase : x0 | |
|   yC = ( ChromaArrayType != 3 && log2TrafoSize = = 2 ) ? yBase : y0 | |
|   cbfLuma = cbf_luma[ x0 ][ y0 ][ trafoDepth ] | |
|   cbfChroma = | |
|     cbf_cb[ xC ][ yC ][ cbfDepthC ] \|\| | |
|     cbf_cr[ xC ][ yC ][ cbfDepthC ] \|\| | |
|     ( ChromaArrayType = = 2 && | |

-continued

| transform_unit( x0, y0, xBase, yBase, log2TrafoSize, trafoDepth, blkIdx ) { | Descriptor |
|---|---|
|       ( cbf_cb[ xC ][ yC + ( 1 << log2TrafoSizeC ) ][ cbfDepthC ] \|\| | |
|       cbf_cr[ xC ][ yC + ( 1 << log2TrafoSizeC ) ][ cbfDepthC ] ) ) | |
|   if( cbfLuma \|\| cbfChroma ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|     if( cu_chroma_qp_offset_enabled_flag && cbfChroma && | |
|       !cu_transquant_bypass_flag && !IsCuChromaQpOffsetCoded ) { | |
|       cu_chroma_qp_offset_flag | ae(v) |
|       if( cu_chroma_qp_offset_flag && chroma_qp_offset_list_len_minus1 > 0 ) | |
|         cu_chroma_qp_offset_idx | ae(v) |
|     } | |
|     if( cbfLuma ) | |
|       residual_coding( x0, y0, log2TrafoSize, 0 ) | |
|     if( log2TrafoSize > 2 \|\| ChromaArrayType = = 3 ) { | |
|       if( cross_component_prediction_enabled_flag && cbfLuma && | |
|         ( CuPredMode[ x0 ][ y0 ] = = MODE_INTER | |
|         intra_chroma_pred_mode[ x0 ][ y0 ] = = 4 ) ) | |
|         cross_comp_pred( x0, y0, 0 ) | |
|       for( tIdx = 0; tIdx < ( ChromaArrayType = = 2 ? 2 : 1 ); tIdx++ ) | |
|         if( cbf_cb[ x0 ][ y0 + ( tIdx << log2TrafoSizeC ) ][ trafoDepth ] ) | |
|           residual_coding( x0, y0 + ( tIdx << log2TrafoSizeC ), log2TrafoSizeC, 1 ) | |
|       if( cross_component_prediction_enabled_flag && cbfLuma && | |
|         ( CuPredMode[ x0 ][ y0 ] = = MODE_INTER | |
|         intra_chroma_pred_mode[ x0 ][ y0 ] = = 4 ) ) | |
|         cross_comp_pred( x0, y0, 1 ) | |
|       for( tIdx = 0; tIdx < ( ChromaArrayType = = 2 ? 2 : 1 ); tIdx++ ) | |
|         if( cbf_cr[ x0 ][ y0 + ( tIdx << log2TrafoSizeC ) ][ trafoDepth ] ) | |
|           residual_coding( x0, y0 + ( tIdx << log2TrafoSizeC ), log2TrafoSizeC, 2 ) | |
|     } else if( blkIdx = = 3 ) { | |
|       for( tIdx = 0; tIdx < ( ChromaArrayType = = 2 ? 2 : 1 ); tIdx++ ) | |
|         if( cbf_cb[ xBase ][ yBase + ( tIdx << log2TrafoSizeC ) ][ trafoDepth − 1 ] ) | |
|           residual_coding( xBase, yBase + ( tIdx << log2TrafoSizeC ), log2TrafoSize, 1 ) | |
|       for( tIdx = 0; tIdx < ( ChromaArrayType = = 2 ? 2 : 1 ); tIdx++ ) | |
|         if( cbf_cr[ xBase ][ yBase + ( tIdx << log2TrafoSizeC ) ][ trafoDepth − 1 ] ) | |
|           residual_coding( xBase, yBase + ( tIdx << log2TrafoSizeC ), log2TrafoSize, 2 ) | |
|     } | |
|   } | |
| } | |

40

Section 7.3.8.13

| residual_coding( x0, y0, log2TrafoSize, cIdx) { | Descriptor |
|---|---|
|   if( transform_skip_enabled_flag && !cu_transquant_bypass_flag && | |
|     ( log2TrafoSize <= Log2MaxTransformSkipSize ) ) | |
|     transform_skip_flag[ x0 ][ y0 ][ cIdx ] | ae(v) |
|   if( CuPredMode[ x0 ][ y0 ] == MODE_INTER && | |
|     explicit_rdpcm_enabled_flag && ( transform_skip_flag[ x0 ][ y0 ][ cIdx ] \|\| | |
|     cu_transquant_bypass_flag ) ) { | |
|     explicit_rdpcm_flag[ x0 ][ y0 ][ cIdx ] | ae(v) |
|     if( explicit_rdpcm_flag[ x0 ][ y0 ][ cIdx ] ) | |
|       explicit_rdpcm_dir_flag[ x0 ][ y0 ][ cIdx ] | ae(v) |
|   } | |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   lastScanPos = 16 | |
|   lastSubBlock = ( 1 << ( log2TrafoSize − 2 ) ) * ( 1 << ( log2TrafoSize − 2 ) ) − 1 | |
|   escapeDataPresent = 0 | |
|   do { | |
|     if( lastScanPos == 0) { | |
|       lastScanPos = 16 | |
|       lastSubBlock−− | |
|     } | |
|     lastScanPos−− | |

| residual_coding( x0, y0, log2TrafoSize, cIdx) { | Descriptor |
|---|---|
|     xS = ScanOrder[ log2TrafoSize − 2 ][ scanIdx ][ lastSubBlock ][ 0 ] | |
|     yS = ScanOrder[ log2TrafoSize − 2 ][ scanIdx ][ lastSubBlock ][ 1 ] | |
|     xC = ( xS << 2 ) + ScanOrder[ 2 ][ scanIdx ][ lastScanPos ][ 0 ] | |
|     yC = ( yS << 2 ) + ScanOrder[ 2 ][ scanIdx ][ lastScanPos ][ 1 ] | |
|   } while( ( xC != LastSignificantCoeffX ) || ( yC != LastSignificantCoeffY ) ) | |
|   for( i = lastSubBlock; i >= 0; i−−) { | |
|     xS =ScanOrder[ log2TrafoSize − 2 ][ scanIdx ][ i ][ 0 ] | |
|     yS =ScanOrder[ log2TrafoSize − 2 ][ scanIdx ][ i ][ 1 ] | |
|     inferSbDcSigCoeffFlag = 0 | |
|     if( ( i < lastSubBlock ) && ( i > 0 ) ) { | |
|       coded_sub_block_flag[ xS ][ yS ] | ae(v) |
|       inferSbDcSigCoeffFlag = 1 | |
|     } | |
|     for( n = ( i == lastSubBlock ) ? lastScanPos − 1 : 15; n >= 0; n−−) { | |
|       xC = ( xS << 2 ) + ScanOrder[ 2 ][ scanIdx ][ n ][ 0 ] | |
|       yC = ( yS << 2 ) + ScanOrder[ 2 ][ scanIdx ][ n ][ 1 ] | |
|       if( coded_sub_block_flag[ xS ][ yS ] && ( n > 0 || !inferSbDcSigCoeffFlag ) ) { | |
|         sig_coeff_flag[ xC ][ yC ] | ae(v) |
|         if( sig_coeff_flag[ xC ][ yC ] ) | |
|           inferSbDcSigCoeffFlag = 0 | |
|       } | |
|     } | |
|     firstSigScanPos = 16 | |
|     lastSigScanPos = −1 | |
|     numGreater1Flag = 0 | |
|     lastGreater1ScanPos = −1 | |
|     for( n = 15; n >= 0; n−−) { | |
|       xC = ( xS << 2 ) + ScanOrder[ 2 ][ scanIdx ][ n ][ 0 ] | |
|       yC = ( yS << 2 ) + ScanOrder[ 2 ][ scanIdx ][ n ][ 1 ] | |
|       if( sig_coeff_flag[ xC ][ yC ] ) { | |
|         if( numGreater1Flag < 8) { | |
|           coeff_abs_level_greater1_flag[ n ] | ae(v) |
|           numGreater1Flag++ | |
|           if( coeff_abs_level_greater1_flag[ n ] && lastGreater1ScanPos == −1 ) | |
|             lastGreater1ScanPos = n | |
|           else if( coeff_abs_level_greater1_flag[ n ] ) | |
|             escapeDataPresent = 1 | |
|         } else | |
|           escapeDataPresent = 1 | |
|         if( lastSigScanPos == −1 ) | |
|           lastSigScanPos = n | |
|         firstSigScanPos = n | |
|       } | |
|     } | |
|     if( cu_transquant_bypass_flag || | |
|       ( CuPredMode[ x0 ][ y0 ] == MODE_INTRA && | |
|         implicit_rdpcm_enabled_flag && transform_skip_flag[ x0 ][ y0 ][ cIdx ] && | |
|         ( predModeIntra == 10 || predModeIntra == 26 ) ) || | |
|       explicit_rdpcm_flag[ x0 ][ y0 ][ cIdx ] ) | |
|       signHidden = 0 | |
|     else | |
|       signHidden = ( lastSigScanPos − firstSigScanPos > 3 ) | |
|     if( lastGreater1ScanPos != −1 ) { | |
|       coeff_abs_level_greater2_flag[ lastGreater1ScanPos ] | ae(v) |
|       if( coeff_abs_level_greater2_flag[ lastGreater1ScanPos ] ) | |
|         escapeDataPresent = 1 | |
|     } | |
|     for( n = 15; n >= 0; n−−) { | |
|       xC = ( xS << 2 ) + ScanOrder[ 2 ][ scanIdx ][ n ][ 0 ] | |
|       yC = ( yS << 2 ) + ScanOrder[ 2 ][ scanIdx ][ n ][ 1 ] | |
|       if( sig_coeff_flag[ xC ][ yC ] && | |
|         ( !sign_data_hiding_enabled_flag || !signHidden || ( n != firstSigScanPos ) ) ) | |
|         coeff_sign_flag[ n ] | ae(v) |
|     } | |
|     numSigCoeff = 0 | |
|     sumAbsLevel = 0 | |
|     for( n = 15; n >= 0; n−−) { | |
|       xC =( xS << 2 ) + ScanOrder[ 2 ][ scanIdx ][ n ][ 0 ] | |
|       yC =( yS << 2 ) + ScanOrder[ 2 ][ scanIdx ][ n ][ 1 ] | |
|       if( sig_coeff_flag[ xC ][ yC ] ) { | |
|         baseLevel = 1 + coeff_abs_level_greater1_flag[ n ] + | |
|             coeff_abs_level_greater2_flag[ n ] | |
|         if( baseLevel == ( ( numSigCoeff < 8) ? | |
|               ( (n == lastGreater1ScanPos) ? 3 : 2 ) : 1 ) ) | |
|           coeff_abs_level_remaining[ n ] | ae(v) |
|         TransCoeffLevel[ x0 ][ y0 ][ cIdx ][ xC ][ yC ] = | |
|           ( coeff_abs_level_remaining[ n ] + baseLevel ) * ( 1 − 2 * coeff_sign_flag[ n ] ) | |

```
residual_coding( x0, y0, log2TrafoSize, cIdx ) {                                    Descriptor
        if( sign_data_hiding_enabled_flag && signHidden ) {
          sumAbsLevel += ( coeff_abs_level_remaining[ n ] + baseLevel )
          if( ( n == firstSigScanPos ) && ( ( sumAbsLevel % 2 ) == 1 ) )
            TransCoeffLevel[ x0 ][ y0 ][ cIdx ][ xC ][ yC ] =
               −TransCoeffLevel[ x0 ][ y0 ][ cIdx ][ xC ][ yC ]
        }
        numSigCoeff++
      }
    }
  }
}
```

In order to implement the techniques described herein, a variety of syntax elements may be utilized by the video coder. The syntax element transform_skip_rotation_enabled_flag being equal to 1 specifies that a rotation is applied to the residual data block for intra 4×4 blocks coded using a transform skip operation. transform_skip_rotation_enabled_flag being equal to 0 specifies that this rotation is not applied. When not present, the value of transform_skip_rotation_enabled_flag is inferred to be equal to 0.

The syntax element transform_skip_context_enabled_flag being equal to 1 specifies that a particular context is used for the parsing of the sig_coeff_flag for transform blocks with a skipped transform. The syntax element transform_skip_context_enabled_flag being equal to 0 specifies that the presence or absence of transform skipping or a transform bypass for transform blocks is not used in the context selection for this flag. When not present, the value of transform_skip_context_enabled_flag is inferred to be equal to 0.

The syntax element implicit_rdpcm_enabled_flag being equal to 1 specifies that the residual modification process for blocks using a transform bypass may be used for intra blocks in the CVS. The syntax element implicit_rdpcm_enabled_flag being equal to 0 specifies that the residual modification process is not used for intra blocks in the CVS. When not present, the value of implicit_rdpcm_enabled_flag is inferred to be equal to 0.

The syntax element explicit_rdpcm_enabled_flag being equal to 1 specifies that the residual modification process for blocks using a transform bypass may be used for inter blocks in the CVS. The syntax element explicit_rdpcm_enabled_flag being equal to 0 specifies that the residual modification process is not used for inter blocks in the CVS. When not present, the value of explicit_rdpcm_enabled_flag is inferred to be equal to 0.

The syntax element extended_precision_processing_flag being equal to 1 specifies that an extended dynamic range is used for coefficient parsing and inverse transform processing. The syntax element extended_precision_processing_flag being equal to 0 specifies that the extended dynamic range is not used. When not present, the value of extended_precision_processing_flag is inferred to be equal to 0.

The variables CoeffMinY, CoeffMinC, CoeffMaxY and CoeffMaxC are derived as follows:
  CoeffMinY=−(1<<(extended_precision_processing_flag?Max(15, BitDepthY+6):15)) (7-27)
  CoeffMinC=−(1<<(extended_precision_processing_flag?Max(15, BitDepthC+6):15))(7-28)
  CoeffMaxY=(1<<(extended_precision_processing_flag?Max(15, BitDepthY+6):15))−1(7-29)
  CoeffMaxC=(1<<(extended_precision_processing_flag?Max(15, BitDepthC+6):15))−1(7-30)

The syntax element intra_smoothing_disabled_flag being equal to 1 specifies that the filtering process of neighbouring samples is unconditionally disabled for intra prediction. The syntax element intra_smoothing_disabled_flag being equal to 0 specifies that the filtering process of neighbouring samples is not disabled. When not present, the value of intra_smoothing_disabled_flag is inferred to be equal to 0.

The syntax element high_precision_offsets_enabled_flag being equal to 1 specifies that weighted prediction offset values are signalled using a bit-depth-dependent precision. The syntax element high_precision_offsets_enabled_flag being equal to 0 specifies that weighted prediction offset values are signalled with a precision equivalent to eight bit processing.

The variables WpOffsetBdShiftY, WpOffsetBdShiftC, WpOffsetHalfRangeY and WpOffsetHalfRangeC are derived as follows:
  WpOffsetBdShiftY=high_precision_offsets_enabled_flag?0:(BitDepthY−8)(7-31)
  WpOffsetBdShiftC=high_precision_offsets_enabled_flag?0:(BitDepthC−8)(7-32)
  WpOffsetHalfRangeY=1<<(high_precision_offsets_enabled_flag?(BitDepthY−1):7)(7-33)
  WpOffsetHalfRangeC=1<<(high_precision_offsets_enabled_flag?(BitDepthC−1):7)(7-34)

The syntax element persistent_rice_adaptation_enabled_flag being equal to 1 specifies that the Rice parameter derivation for the binarization of coeff_abs_level_remaining is initialized at the start of each sub-block using mode dependent statistics accumulated from previous sub-blocks. The syntax element persistent_rice_adaptation_enabled_flag being equal to 0 specifies that no previous sub-block state is used in Rice parameter derivation. When not present, the value of persistent_rice_adaptation_enabled_flag is inferred to be equal to 0.

The syntax element cabac_bypass_alignment_enabled_flag being equal to 1 specifies that a CABAC alignment process is used prior to bypass decoding of the syntax elements coeff_sign_flag[ ] and coeff_abs_level_remaining[ ]. The syntax element cabac_bypass_alignment_enabled_flag being equal to 0 specifies that no CABAC alignment process is used prior to bypass decoding. When not present, the value of cabac_bypass_alignment_enabled_flag is inferred to be equal to 0.

The syntax element curr_pic_as_ref_enabled_flag being equal to 1 specifies that a particular picture referring to the SPS may be included in a reference picture list of the particular picture itself. The syntax element curr_pic_as_ref_enabled_flag being equal to 0 specifies that a particular picture referring to the SPS is never included in any reference picture list of the particular picture itself. When not present, the value of curr_pic_as_ref_enabled_flag is inferred to be equal to 0. When curr_pic_as_ref_enabled_flag is equal to 1, there may be no I-slices in CVSs referring to the SPS.

The syntax element palette_mode_enabled_flag being equal to 1 specifies that the palette mode may be used for intra blocks. The syntax element palette_mode_enabled_flag being equal to 0 specifies that the palette mode is not applied. When not present, the value of palette_mode_enabled_flag is inferred to be equal to 0.

The syntax element residual_adaptive_colour_transform_enabled_flag being equal to 1 specifies that an adaptive colour transform may be applied to the residual in the decoding process. The syntax element residual_adaptive_colour_transform_enabled_flag being equal to 0 specifies that adaptive colour transform is not applied to the residual. When not present, the value of residual_adaptive_colour_transform_enabled_flag is inferred to be equal to 0.

A constrained_intra_pred_flag may be defined such that a constrained_intra_pred_flag equal to 0 specifies that intra prediction allows usage of residual data and decoded samples of neighbouring coding blocks coded either using or not using a reference picture that is not the current picture. constrained_intra_pred_flag equal to 1 specifies constrained intra prediction, in which case the general intra prediction process only uses residual data and decoded samples from neighbouring coding blocks coded without using a reference picture that is not the current picture.

A table may be used to define slice types, in accordance with the techniques described herein. An example of such a table is shown below.

| slice_type | Name of slice_type |
|---|---|
| 0 | B (B slice) |
| 1 | P (P slice) |
| 2 | I (I slice) |

When nal_unit_type has a value in the range of BLA_W_LP to RSV_IRAP_VCL23, inclusive, i.e. the picture is an IRAP picture, and curr_pic_as_ref_enabled_flag is equal to 0, slice_type shall be equal to 2. When sps_max_dec_pic_buffering_minus1[TemporalId] is equal to 0, slice_type shall be equal to 2.

A collocated_ref_idx to specify the reference index of the collocated picture used for temporal motion vector prediction. When slice_type is equal to P or when slice_type is equal to B and collocated_from_l0_flag is equal to 1, collocated_ref_idx refers to a picture in list 0, and the value of collocated_ref_idx shall be in the range of 0 to num_ref_idx_l0_active_minus1, inclusive. When slice_type is equal to B and collocated_from_l0_flag is equal to 0, collocated_ref_idx refers to a picture in list 1, and the value of collocated_ref_idx shall be in the range of 0 to num_ref_idx_l1_active_minus1, inclusive. It may be a requirement of bitstream conformance that the picture referred to by collocated_ref_idx shall be the same for all slices of a coded picture and shall not be the current picture itself.

The syntax element cu_skip_flag[x0][y0] being equal to 1 specifies that for the current coding unit, when decoding a P or B slice, no more syntax elements except the merging candidate index merge_idx[x0][y0] are parsed after cu_skip_flag[x0][y0]. The syntax element cu_skip_flag[x0][y0] being equal to 0 specifies that the coding unit is not skipped. The array indices x0, y0 specify the location (x0, y0) of the top-left luma sample of the considered coding block relative to the top-left luma sample of the picture. When cu_skip_flag[x0][y0] is not present, it is inferred to be equal to 0.

The syntax element pred_mode_flag being equal to 0 specifies that the current coding unit is coded in inter prediction mode. The syntax element pred_mode_flag being equal to 1 specifies that the current coding unit is coded in intra prediction mode. The variable CuPredMode[x][y] is derived as follows for x=x0.x0+nCbS−1 and y=y0.y0+nCbS−1: If pred_mode_flag is equal to 0, CuPredMode[x][y] is set equal to MODE_INTER. Otherwise (pred_mode_flag is equal to 1), CuPredMode[x][y] is set equal to MODE_INTRA.

The syntax element part_mode specifies partitioning mode of the current coding unit. The semantics of part_mode depend on CuPredMode[x0][y0]. The variables PartMode and IntraSplitFlag are derived from the value of part_mode. The value of part_mode is restricted as follows: If CuPredMode[x0][y0] is equal to MODE_INTRA, part_mode shall be equal to 0 or 1. Otherwise (CuPredMode[x0][y0] is equal to MODE_INTER), the following applies: If log 2CbSize is greater than MinCb Log 2SizeY and amp_enabled_flag is equal to 1, part_mode shall be in the range of 0 to 2, inclusive, or in the range of 4 to 7, inclusive. Otherwise, if log 2CbSize is greater than MinCb Log 2SizeY and amp_enabled_flag is equal to 0, or log 2CbSize is equal to 3 and curr_pic_as_ref_enabled_flag is equal to 0, part_mode shall be in the range of 0 to 2, inclusive. Otherwise (log 2CbSize is greater than 3 and less than or Equal to MinCb Log 2SizeY, or curr_pic_as_ref_enabled_flag is equal to 1), the value of part_mode shall be in the range of 0 to 3, inclusive.

When part_mode is not present, the variables PartMode and IntraSplitFlag are derived as follows: PartMode is set equal to PART_2N×2N. IntraSplitFlag is set equal to 0. When CuPredMode[x0][y0] is equal to MODE_INTER, PartMode is equal to PART_N×N, and log 2CbSize is equal to 3, it is a requirement of bitstream conformance that the reference indices of all the blocks in the current CU shall refer only to the current picture.

The syntax element ref_idx_l1[x0][y0] has the same semantics as ref_idx_l0, with l0 and list 0 replaced by l1 and list 1, respectively. The variable codeMvdFlag is derived as follows:
    codeMvdFlag=(DiffPicOrderCnt(RefPicList0[ref_idx_l0], currPic)!=0?1:0

The syntax element mvd_sign_flag[compIdx] specifies the sign of a motion vector component difference as follows: If mvd_sign_flag[compIdx] is equal to 0, the corresponding motion vector component difference has a positive value. Otherwise (mvd_sign_flag[compIdx] is equal to 1), the corresponding motion vector component difference has a negative value. When mvd_sign_flag[compIdx] is not present, it is inferred to be equal to 0. The motion vector difference lMvd[compIdx] for compIdx=0.1 is derived as follows:
    lMvd[compIdx]=abs_mvd_greater0_flag[compIdx]*(abs_mvd_minus2[compIdx]+2)*(1−2*mvd_sign_flag[compIdx]) (7-70)

The variable MvdLX[x0][y0][compIdx], with X being 0 or 1, specifies the difference between a list X vector component to be used and its prediction. The value of MvdLX[x0][y0][compIdx] shall be in the range of −215 to 215-1, inclusive. The array indices x0, y0 specify the location (x0, y0) of the top-left luma sample of the considered prediction block relative to the top-left luma sample of the picture. The horizontal motion vector component difference is assigned compIdx=0 and the vertical motion vector component is assigned compIdx=1. If refList is equal to 0, MvdL0[x0][y0][compIdx] is set equal to 1Mvd[compIdx] for compIdx=0.1. Otherwise(refList is equal to 1), MvdL1[x0][y0][compIdx] is set equal to 1Mvd[compIdx] for compIdx=0.1.

The following applies to the value of NumPicTotalCurr: When the current picture is a BLA or CRA picture, the value of NumPicTotalCurr shall be equal to curr_pic_ref_enabled_flag.

It may be a requirement of bitstream conformance that, when nal_unit_type has a value in the range of BLA_W_LP to RSV_IRAP_VCL23, inclusive, i.e. the picture is an IRAP picture, and curr_pic_as_ref_enabled_flag is equal to 1, RefPicList0 shall contain one or more entries that refer to the current picture only, and, when slice_type is equal to 1, RefPicList1 shall contain one or more entries that refer to the current picture only.

The syntax element CuPredMode[xNbY][yNbY] may not be equal to MODE_INTRA, at least one of the reference pictures of the block at the neighbouring luma location (xNbY, yNbY) is not the current picture, and constrained_intra_pred_flag is equal to 1.

For X being replaced by either 0 or 1 in the variables predFlagLX, mvLX, and refIdxLX, in PRED_LX, and in the syntax elements ref_idx_lX and MvdLX, the following applies:

1. The variables refIdxLX and predFlagLX are derived as follows:
   If inter_pred_idc[xPb][yPb] is equal to PRED_LX or PRED_BI,
   refIdxLX=ref_idx_lX[xPb][yPb]
   predFlagLX=1
   Otherwise, the variables refIdxLX and predFlagLX are specified by:
   refIdxLX=−1
   predFlagLX=0
2. The variable mvdLX is derived as follows:
   mvdLX[0]=MvdLX[xPb][yPb][0]
   mvdLX[1]=MvdLX[xPb][yPb][1]
3. When predFlagLX is equal to 1, the derivation process for luma motion vector prediction in subclause 8.5.3.2.6 is invoked with the luma coding block location (xCb, yCb), the coding block size nCbS, the luma prediction block location (xPb, yPb), the variables nPbW, nPbH, refIdxLX, and the partition index partIdx as inputs, and the output being mvpLX.
4. When predFlagLX is equal to 1 and the reference picture is not the current picture, the luma motion vector mvLX is derived as follows:
   uLX[0]=(mvpLX[0]+mvdLX[0]+$2^{16}$) % $2^{16}$
   mvLX[0]=(uLX[0]>=$2^{15}$)?(uLX[0]−$2^{16}$): uLX[0]
   uLX[1]=(mvpLX[1]+mvdLX[1]+$2^{16}$) % $2^{16}$
   mvLX[1]=(uLX[1]>=$2^{15}$)?(uLX[1]−$2^{16}$): uLX[1]
   NOTE—The resulting values of mvLX[0] and mvLX[1] as specified above will always be in the range of −$2^{15}$ to $2^{15}$−1, inclusive.
5. When predFlagLX is equal to 1 and the reference picture is the current picture, the luma motion vector mvLX is derived as follows:
   mvLX[0]=(mvpLX[0]>>2+mvdLX[0])<<2
   mvLX[1]=(mvpLX[0]>>2+mvdLX[0])<<2

It is a requirement of bitstream conformance that when the reference picture is the current picture, the luma motion vector mvLX shall obey the following constraints:

(a) When the derivation process for z-scan order block availability is invoked with (xCurr, yCurr) set equal to (xCb, yCb) and the neighbouring luma location (xNbY, yNbY) set equal to (xPb+(mvLX[0]>>2), (yPb+mvLX[1]>>2)) as inputs, the output shall be equal to TRUE.

(b) When the derivation process for z-scan order block availability is invoked with (xCurr, yCurr) set equal to (xCb, yCb) and the neighbouring luma location (xNbY, yNbY) set equal to (xPb+(mvLX[0]>>2)+nPbW−1, yPb+(mvLX[1]>>2)+nPbH−1) as inputs, the output shall be equal to TRUE.

(c) One or both the following conditions shall be true:
   The value of (mvLX[0]>>2)+nPbW+xB1 is less than or equal to 0.
   The value of (mvLX[1]>>2)+nPbH+yB1 is less than or equal to 0.

When ChromaArrayType is not equal to 0 and predFlagLX, with X being 0 or 1, is equal to 1, the derivation process for chroma motion vectors in subclause 8.5.3.2.10 is invoked with the luma coding block location (xCb, yCb), the luma prediction block location (xPb, yPb), and luma motion vectors mvLX as input, and the output being mvCLX.

The variables mvLXCol and availableFlagLXCol are derived as follows: If slice_temporal_mvp_enabled_flag is equal to 0, both components of mvLXCol are set equal to 0 and availableFlagLXCol is set equal to 0. Otherwise, if the reference picture is the current picture and constrained_intra_pred_flag is equal to 1, both components of mvLXCol are set equal to 0 and availableFlagLXCol is set equal to 0.

Further syntax tables include the following. Relevant portions of the HEVC standard updated by these tables will be provided in the header of each table.

Section 9.3.2.2

| Syntax structure | Syntax element | initType 0 | initType 1 | initType 2 |
|---|---|---|---|---|
| sao( ) | sao_merge_left_flag | 0 | 1 | 2 |
|  | sao_merge_up_flag |  |  |  |
|  | sao_type_idx_luma | 0 | 1 | 2 |
|  | sao_type_idx_chroma |  |  |  |
| coding_quadtree( ) | split_cu_flag[ ][ ] | 0 . . . 2 | 3 . . . 5 | 6 . . . 8 |
| coding unit( ) | cu_transquant_bypass_flag | 0 | 1 | 2 |
|  | cu_skip_flag |  | 0 . . . 2 | 3 . . . 5 |
|  | palette_mode_flag[ ][ ] | 0 | 1 | 2 |
|  | pred_mode_flag |  | 0 | 1 |
|  | part_mode | 0 | 1 . . . 4 | 5 . . . 8 |
|  | prev_intra_luma_pred_flag[ ][ ] | 0 | 1 | 2 |
|  | intra_chroma_pred_mode[ ][ ] | 0 | 1 | 2 |
|  | rqt_root_cbf |  | 0 | 1 |
|  | cu_residual_act_flag | 0 | 1 | 2 |

-continued

|                 |                                                      |         | initType |         |
|-----------------|------------------------------------------------------|---------|----------|---------|
| Syntax structure | Syntax element                                      | 0       | 1        | 2       |
| prediction_unit( ) | merge_flag[ ][ ]                                  |         | 0        | 1       |
|                 | merge_idx[ ][ ]                                      |         | 0        | 1       |
|                 | inter_pred_idc[ ][ ]                                 |         | 0 . . . 4 | 5 . . . 9 |
|                 | ref_idx_l0[ ][ ], ref_idx_l1[ ][ ]                   |         | 0 . . . 1 | 2 . . . 3 |
|                 | mvp_l0_flag[ ][ ],                                   |         | 0        | 1       |
|                 | mvp_l1_flag[ ][ ]                                    |         |          |         |
| transform_tree( ) | split_transform_flag[ ][ ][ ]                      | 0 . . . 2 | 3 . . . 5 | 6 . . . 8 |
|                 | cbf_luma[ ][ ][ ]                                    | 0 . . . 1 | 2 . . . 3 | 4 . . . 5 |
|                 | cbf_cb[ ][ ][ ], cbf_cr[ ][ ][ ]                     | 0 . . . 312 | 4 . . . 713 | 8 . . . 1114 |
| mvd_coding( )   | abs_mvd_greater0_flag[ ]                             |         | 0        | 2       |
|                 | abs_mvd_greater1_flag[ ]                             |         | 1        | 3       |
| transform_unit( ) | cu_qp_delta_abs                                    | 0 . . . 1 | 2 . . . 3 | 4 . . . 5 |
|                 | cu_chroma_qp_offset_flag                             | 0       | 1        | 2       |
|                 | cu_chroma_qp_offset_idx                              | 0       | 1        | 2       |
| cross_comp_pred( ) | log2_res_scale_abs_plus1[ ]                       | 0 . . . 7 | 8 . . . 15 | 16 . . . 23 |
|                 | res_scale_sign_flag[ ]                               | 0 . . . 1 | 2 . . . 3 | 4 . . . 5 |
| residual_coding( ) | transform_skip_flag[ ][ ][ 0 ]                    | 0       | 1        | 2       |
|                 | transform_skip_flag[ ][ ][ 1 ]                       | 3       | 4        | 5       |
|                 | transform_skip_flag[ ][ ][ 2 ]                       |         |          |         |
|                 | explicit_rdpcm_flag[ ][ ][ 0 ]                       |         | 0        | 1       |
|                 | explicit_rdpcm_flag[ ][ ][ 1 ]                       |         | 2        | 3       |
|                 | explicit_rdpcm_flag[ ][ ][ 2 ]                       |         |          |         |
|                 | explicit_rdpcm_dir_flag[ ][ ][ 0 ]                   |         | 0        | 1       |
|                 | explicit_rdpcm_dir_flag[ ][ ][ 1 ]                   |         | 2        | 3       |
|                 | explicit_rdpcm_dir_flag[ ][ ][ 2 ]                   |         |          |         |
|                 | last_sig_coeff_x_prefix                              | 0 . . . 17 | 18 . . . 35 | 36 . . . 53 |
|                 | last_sig_coeff_y_prefix                              | 0 . . . 17 | 18 . . . 35 | 36 . . . 53 |
|                 | coded_sub_block_flag[ ][ ]                           | 0 . . . 3 | 4 . . . 7 | 8 . . . 11 |
|                 | sig_coeff_flag[ ][ ]                                 | 0 . . . 41 | 42 . . . 83 | 84 . . . 125 |
|                 |                                                      | 126 . . . 127 | 128 . . . 129 | 130 . . . 131 |
|                 | coeff_abs_level_greater1_flag[ ]                     | 0 . . . 23 | 24 . . . 47 | 48 . . . 71 |
|                 | coeff_abs_level_greater2_flag[ ]                     | 0 . . . 5 | 6 . . . 11 | 12 . . . 17 |

Section 9.3.2.2

|                         | ctxIdx of mvp_l0_flag and mvp_l1_flag | |
|-------------------------|--------|--------|
| Initialization variable | 0      | 1      |
| initValue               | 168    | 168    |

Section 9.3.3.1

| Syntax structure | Syntax element | Binarization Input parameters |
|------------------|----------------|-------------------------------|
| slice_segment_data( ) | end_of_slice_segment_flag | cMax = 1 |
|                  | end_of_subset_one_bit | cMax = 1 |
| sao( )           | sao_merge_left_flag | cMax = 1 |
|                  | sao_merge_up_flag | cMax = 1 |
|                  | sao_type_idx_luma | cMax = 2, cRiceParam = 0 |
|                  | sao_type_idx_chroma | cMax = 2, cRiceParam = 0 |
|                  | sao_offset_abs[ ][ ][ ][ ] | cMax = ( 1 << ( Min( bitDepth, 10 ) − 5 ) ) − 1, cRiceParam = 0 |
|                  | sao_offset_sign[ ][ ][ ][ ] | cMax = 1 |
|                  | sao_band_position[ ][ ][ ] | cMax = 31 |
|                  | sao_eo_class_luma | cMax = 3 |
|                  | sao_eo_class_chroma | cMax = 3 |

-continued

| Syntax structure | Syntax element | Binarization Input parameters |
|---|---|---|
| coding_quadtree( ) | split_cu_flag[ ][ ] | cMax = 1 |
| coding_unit( ) | cu_transquant_bypass_flag | cMax = 1 |
| | cu_skip_flag | cMax = 1 |
| | palette_mode_flag | cMax = 1 |
| | pred_mode_flag | cMax = 1 |
| | part_mode | ( xCb, yCb ) = ( x0, y0), log2CbSize |
| | pcm_flag[ ][ ] | cMax = 1 |
| | prev_intra_luma_pred_flag[ ][ ] | cMax = 1 |
| | mpm_idx[ ][ ] | cMax = 2, cRiceParam = 0 |
| | rem_intra_luma_pred_mode[ ][ ] | cMax = 31 |
| | intra_chroma_pred_mode[ ][ ] | – |
| | rqt_root_cbf | cMax = 1 |
| | cu_residual_act_flag | cMax = 1 |
| palette_coding( ) | previous_palette_entry_flag[ ] | cMax = 1 |
| | palette_share_flag | cMax = 1 |
| | palette_num_signalled_entries | cMax = 31, cRiceParam = 0 |
| | palette_entries | cMax = cIdx = = 0 ? ( (1<<BitDepth$_Y$) − 1 ) : ( (1<<BitDepth$_C$) − 1 ) |
| | palette_transpose_flag | cMax = 1 |
| | palette_escape_val | cIdx, qP |
| | escape_val_present_flag | cMax = 1 |
| | palette_run_type_flag | cMax = 1 |
| | palette_index | cMax = adjustedIndexMax |
| | palette_run | – |
| | palette_all_zeros_in_group | cMax = 1 |
| | palette_last_group | cMax = 1 |
| prediction_unit( ) | merge_flag[ ][ ] | cMax = 1 |
| | merge_idx[ ][ ] | cMax = MaxNumMergeCand − 1, cRiceParam = 0 |
| | inter_pred_idc[ x0 ][ y0 ] | nPbW, nPbH |
| | ref_idx_l0[ ][ ] | cMax = num_ref_idx_l0_active_minus1, cRiceParam = 0 |
| | mvp_l0_flag[ ][ ] | cMax = 1 |
| | ref_idx_l1[ ][ ] | cMax = num_ref_idx_l1_active_minus1, cRiceParam = 0 |
| | mvp_l1_flag[ ][ ] | cMax = 1 |
| transform_tree( ) | split_transform_flag[ ][ ][ ] | cMax = 1 |
| | cbf_luma[ ][ ][ ] | cMax = 1 |
| | cbf_cb[ ][ ][ ] | cMax = 1 |
| | cbf_cr[ ][ ][ ] | cMax = 1 |
| bvd_coding ( ) | abs_bvd_greater0_flag[ ] | cMax = 1 |
| | abs_bvd_minus1 [ ] | – |
| | bvd_sign_flag [ ] | cMax = 1 |
| mvd_coding( ) | abs_mvd_greater0_flag[ ] | cMax = 1 |
| | abs_mvd_greater1_flag[ ] | cMax = 1 |
| | abs_mvd_minus2[ ] | – |
| | mvd_sign_flag[ ] | cMax = 1 |
| transform_unit( ) | cu_qp_delta_abs | – |
| | cu_qp_delta_sign_flag | cMax = 1 |
| | cu_chroma_qp_offset_flag | cMax = 1 |
| | cu_chroma_qp_offset_idx | cMax = chroma_qp_offset_list_len_minus1, cRiceParam = 0 |
| cross_comp_pred( ) | log2_res_scale_abs_plus1 | cMax = 4, cRiceParam = 0 |
| | res_scale_sign_flag | cMax = 1 |
| residual_coding ( ) | transform_skip_flag[ ][ ][ ] | cMax = 1 |
| | explicit_rdpcm_flag[ ][ ][ ] | cMax = 1 |
| | explicit_rdpcm_dir_flag[ ][ ][ ] | cMax = 1 |
| | last_sig_coeff_x_prefix | cMax = ( log2TrafoSize << 1 ) − 1, cRiceParam = 0 |
| | last_sig_coeff_y_prefix | cMax = ( log2TrafoSize << 1 ) − 1, cRiceParam = 0 |
| | last_sig_coeff_x_suffix | cMax = ( 1 << ( ( last_sig_coeff_x_prefix >> 1 ) − 1 ) − 1 ) |
| | last_sig_coeff_y_suffix | cMax = ( 1 << ( ( last_sig_coeff_y_prefix >> 1 ) − 1 ) − 1 ) |
| | coded_sub_block_flag[ ][ ] | cMax = 1 |
| | sig_coeff_flag[ ][ ] | cMax = 1 |
| | coeff_abs_level_greater1_flag[ ] | cMax = 1 |
| | coeff_abs_level_greater2_flag[ ] | cMax = 1 |
| | coeff_abs_level_remaining[ ] | current sub-block scan index i, baseLevel |
| | coeff_sign_flag[ ] | cMax = 1 |

Section 9.3.3.7

| | | | Bin string | | | |
|---|---|---|---|---|---|---|
| | | | | | log2CbSize == MinCbLog2SizeY | |
| CuPredMode | | | log2CbSize > MinCbLog2SizeY | | log2CbSize == 3 && !curr_pic_as_ref_ena- | log2CbSize > 3 \|\| curr_pic_as_ref_ena- |
| [ xCb ][ yCb ] | part_mode | PartMode | !amp_enabled_flag | amp_ena-bled_flag | bled_flag | bled_flag |
| MODE_INTRA | 0 | PART_2N×2N | — | — | 1 | 1 |
| | 1 | PART_N×N | — | — | 0 | 0 |
| MODE_INTER | 0 | PART_2N×2N | 1 | 1 | 1 | 1 |
| | 1 | PART_2N×N | 01 | 011 | 01 | 01 |
| | 2 | PART_N×2N | 00 | 001 | 00 | 001 |
| | 3 | PART_N×N | — | — | — | 000 |
| | 4 | PART_2N×nU | — | 0100 | — | — |
| | 5 | PART_2N×nD | — | 0101 | — | — |
| | 6 | PART_nL×2N | — | 0000 | — | — |
| | 7 | PART_nR×2N | — | 0001 | — | — |

Section 9.3.4.2.1

| Assignment of ctxInc to syntax elements with context coded bins | | | | | | |
|---|---|---|---|---|---|---|
| | binIdx | | | | | |
| Syntax element | 0 | 1 | 2 | 3 | 4 | >=5 |
| end_of_slice_segment_flag | terminate | na | na | na | na | na |
| end_of_subset_one_bit | terminate | na | na | na | na | na |
| sao_merge_left_flag | 0 | na | na | na | na | na |
| sao_merge_up_flag | 0 | na | na | na | na | na |
| sao_type_idx_luma | 0 | bypass | na | na | na | na |
| sao_type_idx_chroma | 0 | bypass | na | na | na | na |
| sao_offset_abs[ ][ ][ ][ ] | bypass | bypass | bypass | bypass | bypass | na |
| sao_offset_sign[ ][ ][ ][ ] | bypass | na | na | na | na | na |
| sao_band_position[ ][ ][ ] | bypass | bypass | bypass | bypass | bypass | bypass |
| sao_eo_class_luma | bypass | bypass | bypass | na | na | na |
| sao_eo_class_chroma | bypass | bypass | bypass | na | na | na |
| split_cu_flag[ ][ ] | 0, 1, 2 (subclause 9.3.4.2.2) | na | na | na | na | na |
| cu_transquant_bypass_flag | 0 | na | na | na | na | na |
| cu_skip_flag | 0, 1, 2 (subclause 9.3.4.2.2) | na | na | na | na | na |
| pred_mode_flag | 0 | na | na | na | na | na |
| palette_mode_flag | 0 | na | na | na | Na | Na |
| palette_share_flag | 0 | na | na | na | Na | na |
| previous_palette_entry_flag | bypass | na | na | na | na | Na |
| palette_num_signalled_entries | bypass | bypass | bypass | bypass | bypass | bypass |
| palette_entries | bypass | bypass | bypass | bypass | bypass | bypass |
| palette_transpose_flag | 0, 1 (subclause 9.3.4.2.2) | na | na | na | na | Na |
| palette_escape_val | bypass | bypass | bypass | bypass | bypass | bypass |
| escape_val_present_flag | bypass | na | na | na | na | na |
| palette_run_type_flag | 0, 1 (subclause 9.3.4.2.2) | na | Na | na | Na | Na |
| palette_index | bypass | bypass | bypass | bypass | bypass | bypass |
| palette_run | 0 | 1 | 2 | bypass | bypass | bypass |
| palette_all_zeros_in_group | bypass | na | na | na | na | na |
| palette_last_group | bypass | na | na | na | na | na |
| part_mode log2CbSize == MinCbLog2SizeY | 0 | 1 | 2 | bypass | na | na |
| part_mode log2CbSize > MinCbLog2SizeY | 0 | 1 | 3 | bypass | na | na |
| pcm_flag[ ][ ] | terminate | na | na | na | na | na |
| prev_intra_luma_pred_flag[ ][ ] | 0 | na | na | na | na | na |
| mpm_idx[ ][ ] | bypass | bypass | na | na | na | na |
| rem_intra_luma_pred_mode[ ][ ] | bypass | bypass | bypass | bypass | bypass | na |
| intra_chroma_pred_mode[ ][ ] | 0 | bypass | bypass | na | na | na |
| rqt_root_cbf | 0 | na | na | na | na | na |
| cu_residual_act_flag | 0 | na | na | na | na | na |
| merge_flag[ ][ ] | 0 | na | na | na | na | na |
| merge_idx[ ][ ] | 0 | bypass | bypass | bypass | na | na |

Assignment of ctxInc to syntax elements with context coded bins

| Syntax element | binIdx | | | | | |
|---|---|---|---|---|---|---|
| | 0 | 1 | 2 | 3 | 4 | >=5 |
| inter_pred_idc[ x0 ][ y0 ] | ( nPbW + nPbH ) != 12 ? CtDepth[ x0 ][ y0 ] : 4 | 4 | na | na | na | na |
| ref_idx_l0[ ][ ] | 0 | 1 | bypass | bypass | bypass | bypass |
| ref_idx_l1[ ][ ] | 0 | 1 | bypass | bypass | bypass | bypass |
| mvp_l0_flag[ ][ ] | 0 | na | na | na | na | na |
| mvp_l1_flag[ ][ ] | 0 | na | na | na | na | na |
| split_transform_flag[ ][ ][ ] | 5 − log2TrafoSize | na | na | na | na | na |
| cbf_cb[ ][ ][ ] | trafoDepth | na | na | na | na | na |
| cbf_cr[ ][ ][ ] | trafoDepth | na | na | na | na | na |
| cbf_luma[ ][ ][ ] | trafoDepth = = 0 ? 1 : 0 | na | na | na | na | na |
| abs_mvd_greater0_flag[ ] | 0 | na | na | na | na | na |
| abs_mvd_greater1_flag[ ] | 0 | na | na | na | na | na |
| abs_mvd_minus2[ ] | bypass | bypass | bypass | bypass | bypass | bypass |
| mvd_sign_flag[ ] | bypass | na | na | na | na | na |
| cu_qp_delta_abs | 0 | 1 | 1 | 1 | 1 | bypass |
| cu_qp_delta_sign_flag | bypass | na | na | na | na | na |
| cu_chroma_qp_offset_flag | 0 | na | na | na | na | na |
| cu_chroma_qp_offset_idx | 0 | 0 | 0 | 0 | 0 | na |
| log2_res_scale_abs_plus1[ c ] | 4 * c + 0 | 4 * c + 1 | 4 * c + 2 | 4 * c + 3 | na | na |
| res_scale_sign_flag[ c ] | c | na | na | na | na | na |
| transform_skip_flag[ ][ ][ ] | 0 | na | na | na | na | na |
| explicit_rdpcm_flag[ ][ ][ ] | 0 | na | na | na | na | na |
| explicit_rdpcm_dir_flag[ ][ ][ ] | 0 | na | na | na | na | na |
| last_sig_coeff_x_prefix | 0 . . . 17 (subclause 9.3.4.2.3) | | | | | |
| last_sig_coeff_y_prefix | 0 . . . 17 (subclause 9.3.4.2.3) | | | | | |
| last_sig_coeff_x_suffix | bypass | bypass | bypass | bypass | bypass | bypass |
| last_sig_coeff_y_suffix | bypass | bypass | bypass | bypass | bypass | bypass |
| coded_sub_block_flag[ ][ ] | 0 . . . 3 (subclause 9.3.4.2.4) | na | na | na | na | na |
| sig_coeff_flag[ ][ ] | 0 . . . 43 (subclause 9.3.4.2.5) | na | na | na | na | na |
| coeff_abs_level_greater1_flag[ ] | 0 . . . 23 (subclause 9.3.4.2.6) | na | na | na | na | na |
| coeff_abs_level_greater2_flag[ ] | 0 . . . 5 (subclause 9.3.4.2.7) | na | na | na | na | na |
| coeff_abs_level_remaining[ ] | bypass | bypass | bypass | bypass | bypass | bypass |
| coeff_sign_flag[ ] | bypass | na | na | na | na | na |

FIG. 6 shows examples of spatial neighboring motion vector candidates for deriving motion information merge and AMVP modes. According to the HEVC standard, when using intra- or intra-prediction, motion information may be available to video encoder 20 or video decoder 30. For each block, a set of motion information can be available. A set of motion information may contain motion information for forward and backward prediction directions. The terms forward and backward prediction directions are meant to indicate two prediction directions associated with a bi-directional prediction mode. The terms "forward" and "backward" do not necessarily have a geometric meaning Rather "forward" and "backward" correspond to reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, the motion information must contain a reference index and a motion vector. The reference index is an index to a particular picture in the picture list. In some cases, for simplicity, a video coder may assume that a motion has an associated reference index. A reference index is used to identify a reference picture in the current reference picture list (RefPicList0 or RefPicList1). A motion vector has a horizontal and a vertical component. When a CU is inter-coded, one set of motion information is present for each PU. A video coder uses the inter-prediction mode associated with the PU to derive the set of motion information for that PU.

In the HEVC standard, there are two inter-prediction modes, merge (which includes skip mode, a special case of merge mode) and advanced motion vector prediction (AMVP) modes respectively, for a prediction unit (PU). In either AMVP or merge mode, a video coder maintains a motion vector (MV) candidate list of multiple motion vector predictors. A video coder generates motion vector(s), as well as reference indices to be used when coding a PU using merge mode by selecting one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and corresponding reference indices. If a video coder identifies a merge candidate by a merge index, the video coder uses the identified reference pictures for the prediction of the current blocks. The video coder also determines the associated motion vectors for the current blocks. However, when coding a block using AMVP, for each potential prediction direction from either list 0 or list 1, a video coder must explicitly signal each reference index along with an MVP index. The MVP index is an index to the MV candidate list since the AMVP candidate contains only a motion vector. In AMVP mode, a video coder may further refine predicted motion vectors.

Thus, as described above, a video coder similarly derives candidates for both AMVP and merge modes based on the same spatial and temporal neighboring blocks. The two modes differ however in that a merge candidate corresponds to a full set of motion information while an AMVP candidate contains just one motion vector for a specific prediction direction and a reference index. The candidates for both modes are derived similarly from the same spatial and temporal neighboring blocks. FIG. 6 illustrates MV candidates for merge and AMVP modes.

Spatial MV candidates are derived from the neighboring blocks shown in FIG. 6, for a specific PU ($PU_0$), although the methods of generating the candidates from the blocks differ for merge and AMVP modes.

In merge mode, there are five possible spatial MV candidate positions: $\{a_0, a_1, b_0, b_1, b_2\}$, as illustrated in FIG. 6. The video coder determines for each MV candidate position, whether the MV candidate at that position is available. Candidates may not be available if a block at that location has not been decoded yet, as an example. The video coder checks the MV candidate available in the following the order: $\{a_1, b_1, b_0, a_0, b_2\}$.

In AVMP mode, the video coder (e.g., video encoder 20 or video decoder 30) divides neighboring blocks into two groups: a left group consisting of the block $a_0$ and $a_1$, and an above-neighboring group consisting of the blocks $b_0$, $b_1$, and $b_2$ as shown in FIG. 6. For the left-neighboring group, the video coder checks the availability of the blocks according to the order: $\{a_0, a_1\}$. For the above-neighboring group, the video coder checks the availability of the top-neighboring blocks according to the order: $\{b_0, b_1, b_2\}$. For each group, a potential candidate that refers to the same reference picture as the picture indicated by the signaled reference index has a highest priority to be chosen by the video coder to form a final candidate of the group. It is possible that no neighboring blocks contain a motion vector that points to the same reference picture. In this case, if the video coder cannot find a motion vector that points to the same reference picture as the pictured indicated by the signaled index, the video coder selects the first available candidate. The video coder scales the first available candidate to form a final candidate. Scaling the candidate motion vector compensates for temporal distance differences in this case.

The motion vector is derived for the luma component of a current PU/CU; before it is used for chroma motion compensation, the motion vector is scaled, based on the chroma sampling format.

A PU or CU may have a luma block of samples, as well as multiple corresponding chroma (color) blocks of samples. In some cases, there may be multiple luma samples that correspond to each chroma sample (referred to as chroma subsampling). When determining a motion vector, a video coder derives a luma motion vector component for a PU or CU first. The video coder may scale the luma motion vector to determine the chroma motion vector based on the chroma subsampling format.

Additionally, in HEVC, a video coder may divide an LCU into parallel motion estimation regions (MERs). When an LCU is part of a MER a video coder allows only neighboring PUs which belong to different MERs from the current PU to be included in the merge/skip MVP list construction process. The video coder codes a size of the MER in a picture parameter set. The syntax element that indicates the MER size is "log 2_parallel_merge_level_minus2."

In some cases, e.g., when a MER size is larger than N×N samples, and when a smallest possible CU size is set to 2N×2N samples, a MER may have effects on the availability of a spatially-neighboring block with respect to motion estimation. For example, in the aforementioned case, if a spatially-neighboring block is inside the same MER as a currently PU, a video coder considers the spatially-neighboring block to be unavailable.

The Intra Block Copy (BC) has been included in current screen content coding (SCC). An example of Intra BC is shown as in FIG. 5, wherein the current CU/PU is predicted from an already decoded block of the current picture/slice. Note that prediction signal is reconstructed but without in-loop filtering, including de-blocking and Sample Adaptive Offset (SAO).

For the luma component or the chroma components that are coded with Intra BC, the block compensation is done with integer block compensation; therefore no interpolation is needed.

In merge mode, after validating the spatial candidates, a video coder removes two kinds of redundancy. If the candidate position for the current PU would refer to the first PU within the same CU, the video coder excludes the position, as the same merge could be achieved by a CU without splitting into prediction partitions. Furthermore, a video coder excludes any redundant entries where candidates have exactly the same motion information. After checking the spatial neighboring candidates, video coder validates the temporal candidates. For the temporal candidate, the video coder uses the right bottom position just outside of the collocated PU of the reference picture if it is available. Otherwise, the video coder uses the center position. The manner in which the video coder chooses the collocated PU is similar to that of prior standards, but HEVC allows more flexibility by transmitting an index to specify which reference picture list is used for the collocated reference picture.

One issue related to the use of the temporal candidate is the amount of the memory required to store the motion information of the reference picture. This is addressed by restricting the granularity for storing the temporal motion candidates to the resolution of a 16×16 luma grid, even when smaller PB structures are used at the corresponding location in the reference picture. In addition, a PPS-level flag allows a video encoder to disable the use of the temporal candidate, which is useful for applications with error-prone transmission. A video encoder indicates a maximum number of merge candidates (C) by signaling C in the slice header. If the number of merge candidates found (including the temporal candidate) is larger than C, only the video coder retains only the first C−1 spatial candidates and the temporal candidate.

Otherwise, if the number of merge candidates identified is less than C, the video coder generates additional candidates until the number is equal to C. This simplifies the parsing and makes it more robust, as the ability to parse the coded data is not dependent on merge candidate availability.

For B slices, the video coder generates additional merge candidates by choosing two existing candidates according to a predefined order for reference picture list 0 and list 1. For example, the first generated candidate uses the first merge candidate for list 0 and the second merge candidate for list 1. HEVC specifies a total of 12 predefined pairs of two in the following order in the already constructed merge candidate list as (0, 1), (1, 0), (0, 2), (2, 0), (1, 2), (2, 1), (0, 3), (3, 0), (1, 3), (3, 1), (2, 3), and (3, 2). Among them, up to five candidates can be included after removing redundant entries. When the number of merge candidates is still less than C, default merge candidates, including default motion vectors and the corresponding reference indices, are used instead with zero motion vectors associated with reference indices from zero to the number of reference pictures minus one are used to fill any remaining entries in the merge candidate list.

In AMVP mode, HEVC only allows a much lower number of candidates to be used in the motion vector prediction process case because the video encoder can send a coded difference to change the motion vector. Furthermore, a video encoder needs to perform motion estimation, which is one of the most computationally expensive operations in the encoder, and complexity is reduced by allowing a small number of candidates. When the reference index of the neighboring PU is not equal to that of the current PU, a video coder uses a scaled version of the motion vector. The neighboring motion vector is scaled according to the temporal distances between the current picture and the reference pictures indicated by the reference indices of the neighboring PU and the current PU, respectively.

When two spatial candidates have the same motion vector components, one redundant spatial candidate is excluded. When the number of motion vector predictors is not equal to two and the use of temporal MV prediction is not explicitly disabled, the temporal MV prediction candidate is included. This means that the temporal candidate is not used at all when two spatial candidates are available. Finally, the default motion vector which is zero motion vector is included repeatedly until the number of motion vector prediction candidates is equal to two, which guarantees that the number of motion vector predictors is two. Thus, only a coded flag is necessary to identify which motion vector prediction is used in the case of AMVP mode.

A video coder derives the MV for the luma component of a current PU/CU during motion prediction, e.g. using AMVP or merge mode. Before the video coder may use the MV for chroma motion compensation, the video coder scales the MV based on the chroma sampling format of the PU/CU.

FIG. 7 is an illustration of a four-pixel long vertical block boundary formed by the adjacent blocks P and Q. When Bs is positive, the criteria to determine whether deblocking filter is enabled or not may be defined according to the following equation:

$$|P_{2,0}-2P_{1,0}+P_{0,0}|+|P_{2,3}-2P_{1,3}+P_{0,3}|+|Q_{2,0}-2Q_{1,0}+Q_{0,0}|+|Q_{2,3}-2Q_{1,3}+Q_{0,3}|<\beta \quad (1)$$

The criteria to determine normal and strong deblocking filter is (i=0, 3):

$$|P_{2,i}-2P_{1,i}+P_{0,i}|+|Q_{2,i}-2Q_{1,i}+Q_{0,i}|<\beta/8 \quad (2)$$

$$|P_{3,i}-P_{0,i}|+|Q_{3,i}-Q_{0,i}|<\beta 8 \quad (3)$$

$$|P_{0,i}-Q_{0,i}|<2.5T_C \quad (4)$$

Horizontal block boundary can be treated in a similar way.

Figure 8:
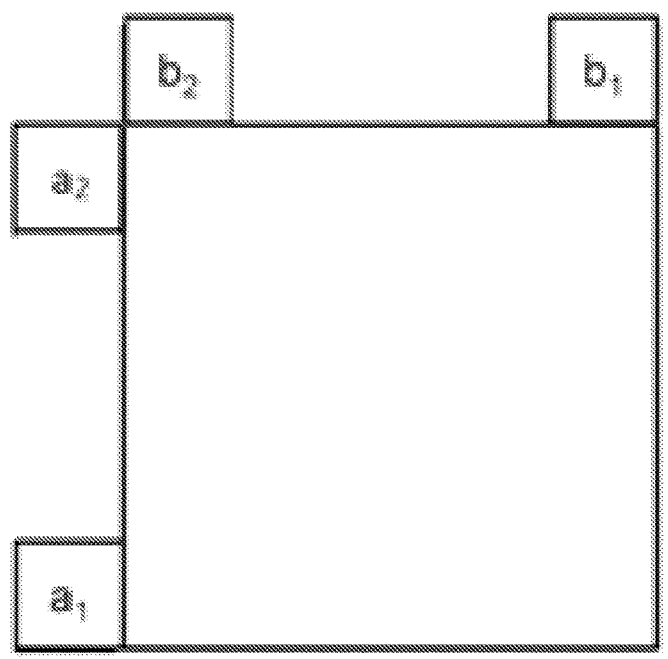
FIG. 8 is a conceptual diagram illustrating example spatial block vector candidates.

FIG. 8 is a conceptual diagram illustrating example spatial block vector candidates. Four spatial block vector predictor candidates as shown in FIG. 4 are divided into: the left group including $\{a_2, a_1\}$ and the above group including $\{b_2, b_1\}$. Two spatial block vector predictor candidates are chosen, with one from the left group according to availability checking order $\{a_2, a_1\}$, and the other one from the above group according to the availability checking order $\{b_2, b_1\}$. If one spatial block vector predictor candidates is unavailable, (−2w, 0) is used instead. If both spatial block vector predictor candidates are unavailable, (−2*w, 0) and (−w, 0) are used instead, where w is the CU width. It is noted that when the current block becomes a size of 4×4, $b_2$ and $b_1$ will be the same block and $a_2$ and $a_1$ will be the same block.

Figure 9:
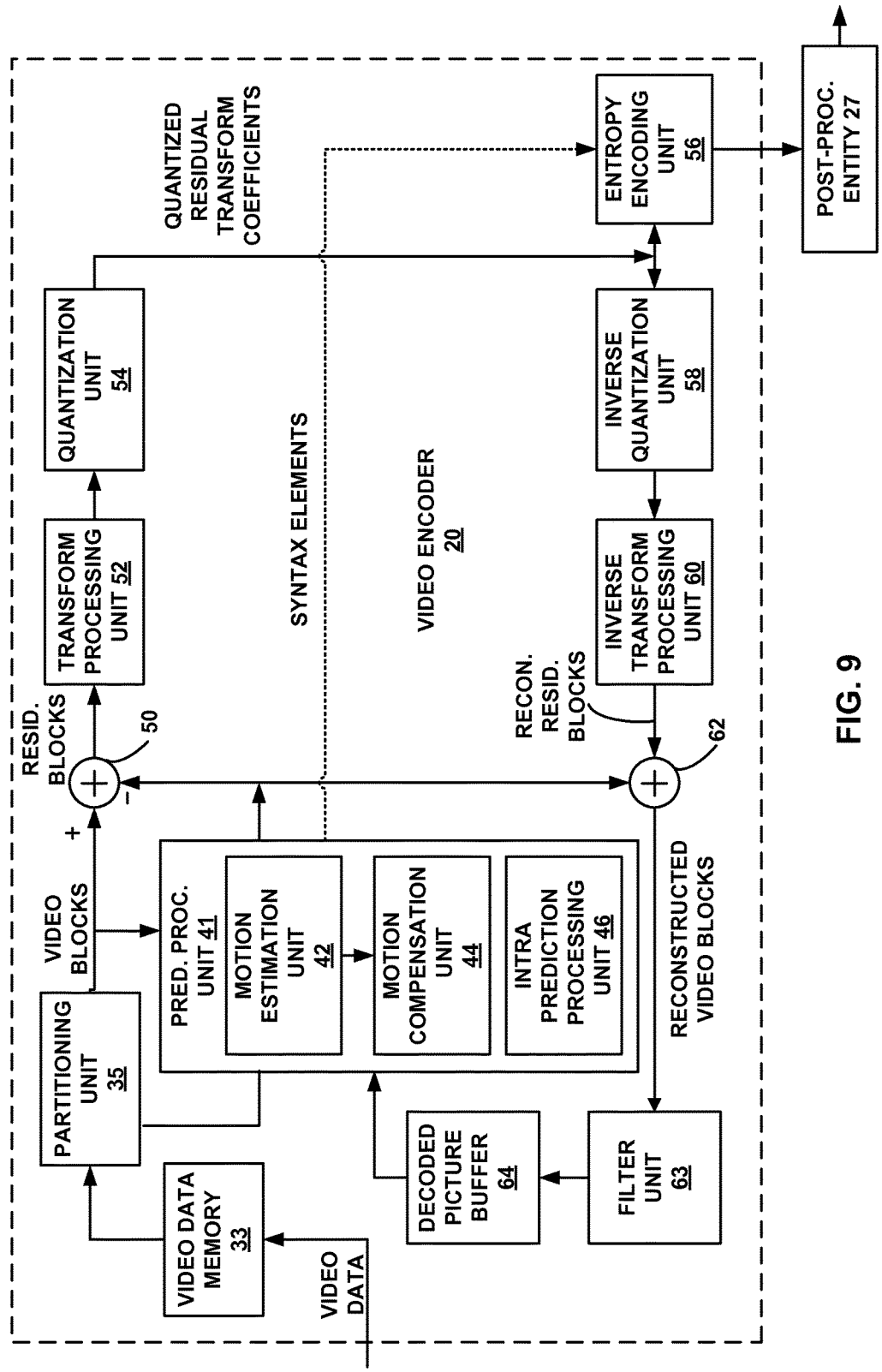
FIG. 9 is a block diagram illustrating an example video encoder that may implement the techniques described in this disclosure.

FIG. 9 is a block diagram illustrating an example video encoder 20 that may implement the techniques described in this disclosure. Video encoder 20 may be configured to output video to post-processing entity 27. Post-processing entity 27 is intended to represent an example of a video entity, such as a MANE or splicing/editing device, that may process encoded video data from video encoder 20. In some instances, post-processing entity 27 may be an example of a network entity. In some video encoding systems, post-processing entity 27 and video encoder 20 may be parts of separate devices, while in other instances, the functionality described with respect to post-processing entity 27 may be performed by the same device that comprises video encoder 20. In some example, post-processing entity 27 is an example of storage device 17 of FIG. 1

Video encoder 20 may perform intra-, inter-, and IMC coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes. IMC coding modes, as described above, may remove spatial redundancy from a frame of video data, but unlike tradition intra modes, IMC coding codes may be used to locate predictive blocks in a larger search area within the frame and refer to the predictive blocks with offset vectors, rather than relying on intra-prediction coding modes.

In the example of FIG. 9, video encoder 20 includes video data memory 33, partitioning unit 35, prediction processing unit 41, filter unit 63, decoded picture buffer 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter.

Video data memory 33 may store video data to be encoded by the components of video encoder 20. The video data stored in video data memory 33 may be obtained, for example, from video source 18. Decoded picture buffer 64 may be a reference picture memory that stores reference video data for use in encoding video data by video encoder 20, e.g., in intra-, inter-, or IMC coding modes. Video data memory 33 and decoded picture buffer 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and decoded picture buffer 64 may be provided by the same memory device or separate memory devices. In various examples, video data memory 33 may be on-chip with other components of video encoder 20, or off-chip relative to those components.

As shown in FIG. 7, video encoder 20 receives video data and stores the video data in video data memory 33. Partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes, one of a plurality of inter coding modes, or one of a plurality of IMC coding modes, for the current video block based on error results (e.g., coding rate and the level of distortion). Prediction processing unit 41 may provide the resulting intra-, inter-, or IMC coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 may perform inter-predictive coding of the current video block relative to one or more predictive blocks in one or more reference pictures to provide temporal compression. Motion estimation unit 42 and motion compensation unit 44 within prediction processing unit 41 may also perform IMC coding of the current video block relative to one or more predictive blocks in the same picture to provide spatial compression.

Motion estimation unit 42 may be configured to determine the inter-prediction mode or IMC mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture. In the case of IMC coding, a motion vector, which may be referred to as an offset vector in IMC, may indicate the displacement of a PU of a video block within a current video frame or picture relative to a predictive block within the current video frame.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

According to some techniques of this disclosure, when coding a video block using an IMC mode, motion estimation unit 42 may determine a motion vector, or offset vector, for a luma component of the video block, and determine an offset vector for a chroma component of the video block based on the offset vector for the luma component. In another example, when coding a video block using an IMC mode, motion estimation unit 42 may determine a motion vector, or offset vector, for a chroma component of the video block, and determine an offset vector for a luma component of the video block based on the offset vector for the chroma component. Thus, video encoder 20 may signal in the bitstream only one offset vector, from which offset vectors for both chroma and luma components of the video block may be determined.

Motion compensation, performed by motion compensation unit 44, may involve fetching or generating the predictive block based on the motion vector determined by motion estimation, possibly performing interpolations to sub-pixel precision. Interpolation filtering may generate additional pixel samples from known pixel samples, thus potentially increasing the number of candidate predictive blocks that may be used to code a video block. Upon receiving the motion vector for the PU of the current video block, motion compensation unit 44 may locate the predictive block to which the motion vector points in one of the reference picture lists, or in the case of the IMC coding, within the picture being coded. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction and IMC performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction, intra-prediction, or IMC, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Interpolation filtering may generate additional pixel samples from known pixel samples, thus potentially increasing the number of candidate predictive blocks that may be used to code a video block. Summer 62 adds the reconstructed residual block to the motion compensated prediction block produced by motion compensation unit 44 to produce a reference block for storage in decoded picture buffer 64. The reference block may be used by motion estimation unit 42 and motion compensation unit 44 as a reference block to inter-predict a block in a subsequent video frame or picture.

In accordance with the techniques of this disclosure, as described above, video encoder 20, may be configured to code a CU of video data using a unified Intra Block Copy mode, wherein coding the block using unified Intra Block copy comprises adding a current picture to a reference picture set, determine that a motion vector for the CU has integer-pixel precision, without coding a syntax element representative of precision for the motion vector, if the reference picture set includes only the current picture or if a reference picture for the block is the current picture, and code the CU based on the motion vector for the CU.

In another example in accordance with the techniques of this disclosure, video encoder 20 may be configured to code a syntax element that indicates whether a motion vector for a CU has integer-pixel precision or sub-integer pixel precision. When the syntax element indicates the motion vector has integer pixel precision: video encoder 20 may scale the motion vector of the CU to generate a scaled chroma motion vector for a block of chroma samples of the CU, round the scaled chroma motion vector up or down to an integer-pixel value if the scaled chroma motion vector does not have integer-pixel precision, and code the CU based on the rounded chroma motion vector.

In accordance with one or more techniques described herein, entropy encoding unit 56 of video encoder 20 may be configured to perform the techniques of this disclosure. For instance, entropy encoding unit 56 of video encoder 20 may be configured to determine a reference picture used for coding the current video block. Entropy encoding unit 56 of video encoder 20 may further determine a POC value for the reference picture. In response to the POC value for the reference picture being equal to a POC value for a current picture that includes the current video block, encoding unit 56 of video encoder 20 may set a value of a syntax element to indicate that a reference picture list includes the current picture. In some examples, the syntax element may be located in one of a PPS or an SPS. Conversely, in response to the POC value for the reference picture not being equal to the POC value for the current picture that includes the current video block, encoding unit 56 of video encoder 20 may set a value of the syntax element to indicate that the reference picture list does not include the current picture.

In some examples, the current picture is an intra random access picture (IRAP) comprising one of a P-slice or a B-slice. In such examples, the IRAP picture may further include a set of one or more different syntax elements that specify a non-empty reference picture set. In some examples, the current video block of the current picture includes a luma component and a chroma component. In such examples, only one of the luma or the chroma component may have integer-pel precision.

In some examples, the reference picture may further include decoded non-filtered samples of the current picture. In various instances, the reference picture may include a reference block that further includes motion prediction information. Entropy encoding unit 56 of video encoder 20 may use the motion information of the reference block for coding the current video block. Motion compensation unit 44 may, for example, encode a block that is coded in merge mode. If the picture of the current block is eligible to be in a reference picture list, then one or more of the merge candidates in a merge candidate list may include motion vectors (e.g. offset vectors) that point to a reference block in the same picture as the current block.

In some examples where the POC value for the reference picture is not equal to the POC value for the current picture, a CVS referring to an SPS for the current picture may include one or more I-slices.

In some examples, the current picture is one of a clean random access picture or a broken link access picture. In such examples, entropy encoding unit 56 of video encoder 20 may set a value of a second syntax element that indicates a number of pictures that may be used as a prediction reference for the current picture to 1.

In some examples where the POC value for the reference picture is equal to the POC value for the current picture, an MV for the current video block may have integer-pel precision. Further, entropy encoding unit 56 of video encoder 20 may convert each MV predictor candidate of a plurality of motion vector predictor candidates for the current picture to integer-pel precision either prior to being used in a candidate derivation process or after the candidate derivation process is completed. In other examples where the POC value for the reference picture is equal to the POC value for the current picture, each prediction sample of the current picture is contained within a picture boundary of the current picture. Further, if the reference picture list only includes the current picture, entropy encoding unit 56 of video encoder 20 may disable a TMVP.

Video decoder 30 may be configured to perform a generally reciprocal process in accordance with the techniques of this disclosure.

Figure 10:
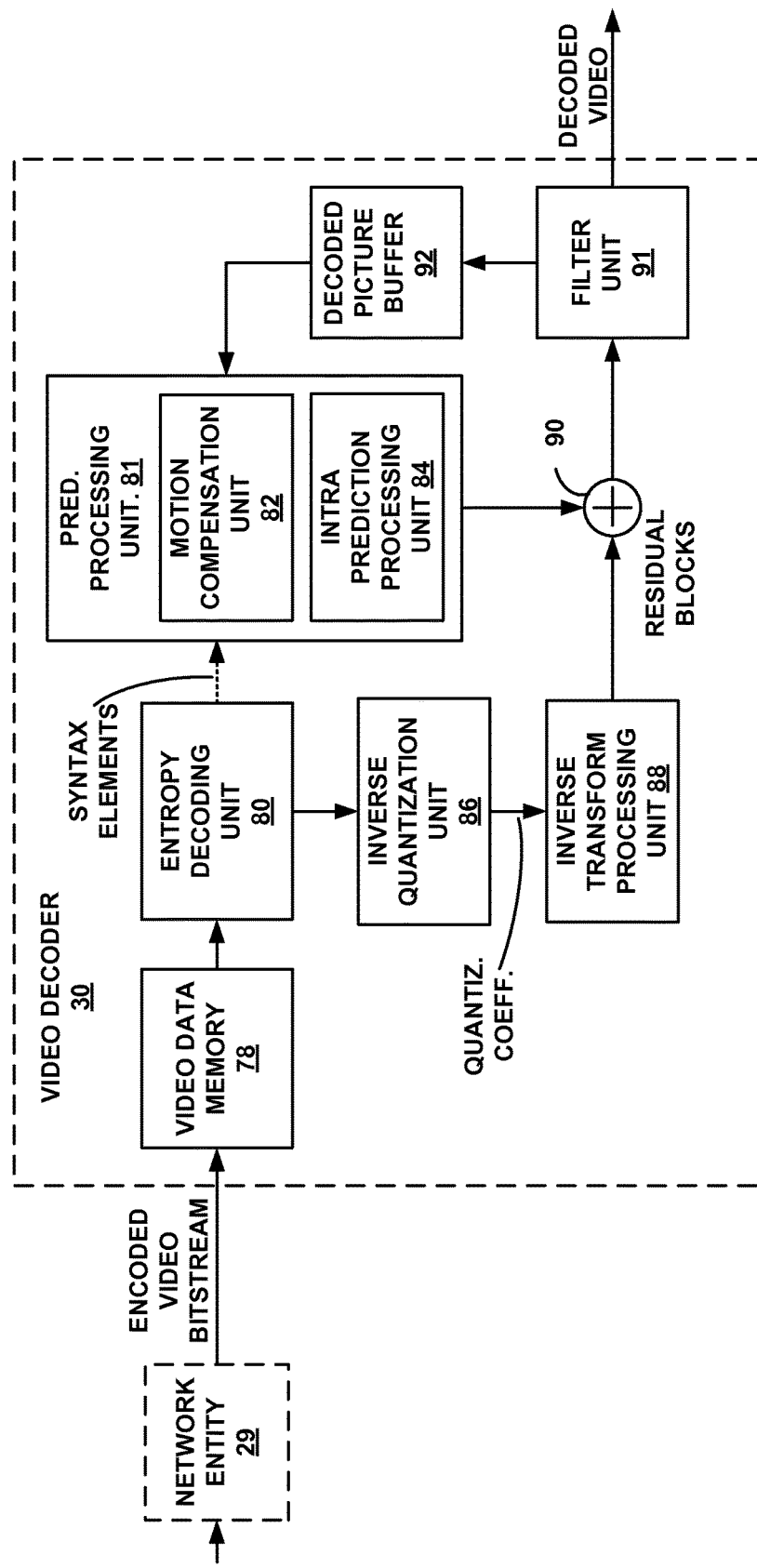
FIG. 10 is a block diagram illustrating an example video decoder that may implement the techniques described in this disclosure.

FIG. 10 is a block diagram illustrating an example video decoder that may implement the techniques described in this disclosure. In the example of FIG. 10, video decoder 30 includes a video data memory 78, entropy decoding unit 80, prediction processing unit 81, inverse quantization unit 86, inverse transform processing unit 88, summer 90, filter unit 91, and decoded picture buffer 92. Prediction processing unit 81 includes motion compensation unit 82 and intra-prediction processing unit 84. Video decoder 30 may, in some examples, perform a decoding pass generally reciprocal to the encoding pass described with respect to video encoder 20 from FIG. 9.

During the decoding process, video decoder 30 receives video data, e.g. an encoded video bitstream that represents video blocks of an encoded video slice and associated syntax elements, from video encoder 20. Video decoder 30 may receive the video data from network entity 29 and store the video data in video data memory 78. Video data memory 78 may store video data, such as an encoded video bitstream, to be decoded by the components of video decoder 30. The video data stored in video data memory 78 may be obtained, for example, from storage device 17, e.g., from a local video source, such as a camera, via wired or wireless network communication of video data, or by accessing physical data storage media. Video data memory 78 may form a coded picture buffer that stores encoded video data from an encoded video bitstream. Thus, although shown separately in FIG. 10, video data memory 78 and decoded picture buffer 92 may be provided by the same memory device or separate memory devices. Video data memory 78 and decoded picture buffer 92 may be formed by any of a variety of memory devices, such as dynamic random access memory (DRAM), including synchronous DRAM (SDRAM), magnetoresistive RAM (MRAM), resistive RAM (RRAM), or other types of memory devices. In various examples, video data memory 78 may be on-chip with other components of video decoder 30, or off-chip relative to those components.

Network entity 29 may, for example, be a server, a MANE, a video editor/splicer, or other such device configured to implement one or more of the techniques described above. Network entity 29 may or may not include a video encoder, such as video encoder 20. Some of the techniques described in this disclosure may be implemented by network entity 29 prior to network entity 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30. Network entity 29 may be an example of storage device 17 of FIG. 1 in some cases.

Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice or when a block is IMC coded, motion compensation unit 82 of prediction processing unit 81 produces predictive blocks for a video block of the current video slice based on the motion vectors and other syntax elements received from entropy decoding unit 80. For inter prediction, the predictive blocks may be produced from one of the reference pictures within one of the reference picture lists. Video decoder 30 may construct the reference frame lists, List 0 and List 1, using default construction techniques based on reference pictures stored in decoded picture buffer 92. For IMC coding, the predictive blocks may be produced from the same picture as the block being predicted.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

According to some techniques of this disclosure, when coding a video block using an IMC mode, motion compensation unit 82 may determine a motion vector, or offset vector, for a luma component of the video block, and determine a motion vector for a chroma component of the video block based on the motion vector for the luma component. In another example, when coding a video block using an IMC mode, motion compensation unit 82 may determine a motion vector, or offset vector, for a chroma component of the video block, and determine a motion vector for a luma component of the video block based on the motion vector for the chroma component. Thus, video decoder 30 may receive in the bitstream only one offset vector, from which offset vectors for both chroma and luma components of the video block may be determined.

When decoding a video block using IMC mode, motion compensation unit 82 may, for example, modify a motion vector, referred to as an offset vector for IMC mode, for a luma component to determine an offset vector for a chroma component. Motion compensation unit 82 may, for example, modify one or both of an x-component and y-component of the offset vector of the luma block based on a sampling format for the video block and based on a precision of a sub-pixel position to which the offset vector points. For example, if the video block is coded using the 4:2:2 sampling format, then motion compensation unit 82 may only modify the x-component, not the y-component, of the luma offset vector to determine the offset vector for the chroma component. As can be seen from FIG. 4, in the 4:2:2 sampling format, chroma blocks and luma blocks have the same number of samples in the vertical direction, thus making modification of the y-component potentially unneeded. Motion compensation unit 82 may only modify the luma offset vector, if when used for locating a chroma predictive block, the luma offset vector points to a position without a chroma sample (e.g., at a sub-pixel position in the chroma sample of the current picture that includes the current block). If the luma offset vector, when used to locate a chroma predictive block, points to a position where a chroma sample is present, then motion compensation unit 82 may not modify the luma offset vector.

In another example, if the video block is coded using the 4:2:0 sampling format, then motion compensation unit 82 may modify either or both of the x-component and the y-component of the luma offset vector to determine the offset vector for the chroma component. As can be seen from FIG. 3, in the 4:2:0 sampling format, chroma blocks and luma blocks have a different number of samples in both the vertical direction and the horizontal direction. Motion compensation unit 82 may only modify the luma offset vector, if when used for locating a chroma predictive block, the luma offset vector points to a position without a chroma sample (e.g., at a sub-pixel position in the chroma sample of the current picture that includes the current block). If the luma offset vector, when used to locate a chroma predictive block, points to a position where a chroma sample is present, then motion compensation unit 82 may not modify the luma offset vector.

Motion compensation unit 82 may modify a luma offset vector to generate a modified motion vector, also referred to as a modified offset vector. Motion compensation unit 82 may modify a luma offset vector that, when used to locate a chroma predictive block, points to a sub-pixel position such that the modified offset vector, used for the chroma block, points to a lower resolution sub-pixel position or to an integer pixel position. As one example, a luma offset vector that points to a ⅛ pixel position may be modified to point to a ¼ pixel position, a luma offset vector that points to a ¼ pixel position may be modified to point to a ½ pixel position, etc. In other examples, motion compensation unit 82 may modify the luma offset vector such that the modified offset vector always points to an integer pixel position for locating the chroma reference block. Modifying the luma offset vector to point to a lower resolution sub-pixel position or to an integer pixel position may eliminate the need for some interpolation filtering and/or reduce the complexity of any needed interpolation filtering.

Referring to FIGS. 3 and 4 and assuming the top left sample is located at position (0, 0), a video block has luma samples at both odd and even x positions and both odd and even y positions. In a 4:4:4 sampling format, a video block also has chroma samples at both odd and even x positions and both odd and even y positions. Thus, for a 4:4:4 sampling format, motion compensation unit may use the same offset vector for locating both a luma predictive block and a chroma predictive block. For a 4:2:2 sampling format, as shown in FIG. 4, a video block has chroma samples at both odd and even y positions but only at even x positions. Thus, for the 4:2:2 sampling format, if a luma offset vector points to an odd x position, motion compensation unit 82 may modify the x-component of the luma offset vector to generate a modified offset vector that points to an even x position so that the modified offset vector can be used for locating the reference chroma block for the chroma block of the current block without needing interpolation. Motion compensation unit 82 may modify the x-component, for example, by either rounding up or rounding down to the nearest even x position, i.e. changing the x-component such that it points to either the nearest left x position or nearest right x position. If the luma offset vector already points to an even x position, then no modification may be necessary.

For a 4:2:0 sampling format, as shown in FIG. 3, a video block has chroma samples only at even y positions and only at even x positions. Thus, for the 4:2:0 sampling format, if a luma offset vector points to an odd x position or odd y position, motion compensation unit 82 may modify the x-component or y-component of the luma offset vector to generate a modified offset vector that points to an even x position so that the modified offset vector can be used for locating the reference chroma block for the chroma block of the current block without needing interpolation. Motion compensation unit 82 may modify the x-component, for example, by either rounding up or rounding down to the nearest even x position, i.e. changing the x-component such that it points to either the nearest left x position or nearest right x position. Motion compensation unit 82 may modify the y-component, for example, by either rounding up or rounding down to the nearest even y position, i.e. changing the y-component such that it points to either the nearest above y position or nearest below y position. If the luma offset vector already points to an even x position and an even y position, then no modification may be necessary.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 10 as being an in loop filter, in other configurations, filter unit 91 may be implemented as a post loop filter. The decoded video blocks in a given frame or picture are then stored in decoded picture buffer 92, which stores reference pictures used for subsequent motion compensation. Decoded picture buffer 92 may be part of a memory that also stores decoded video for later presentation on a display device, such as display device 32 of FIG. 1, or may be separate from such a memory.

Video decoder 30 of FIG. 10 represents an example of a video decoder that may be configured to receive a syntax element (e.g. curr_pic_as_ref_enabled_flag described above) that indicates whether a current picture that includes a current video block of the video data is eligible to be in a reference picture list (e.g. one or both of list 0 or list 1). Video decoder 30 may determine a value of the syntax element (e.g. a 1 or a 0 for a 1-bit syntax element), and in response to the syntax element indicating that the current video block of the video data is eligible to be in the reference picture list, add the current picture to the reference picture list. In response to the syntax element indicating that the current video block of the video data is not eligible to be in the reference picture list, video decoder 30 may restrict the current picture from being placed in the reference picture list.

Entropy decoding unit 80 of video decoder 30 may receive the syntax element that indicates whether the current picture that includes a current video block of the video data is eligible to be in a reference picture list. Entropy decoding unit 80 of video decoder 30 may further determine a value of the syntax element. In response to the syntax element indicating that the current video block of the video data is eligible to be in the reference picture list, motion compensation unit 82 of video decoder 30 may add the current picture to a reference picture list. In response to the syntax element indicating that the current video block of the video data is not eligible to be in the reference picture list, motion compensation unit 82 of video decoder 30 may restrict the current picture from being placed in the reference picture list.

In some examples, the current picture is an intra random access picture (IRAP) comprising one of a P-slice or a B-slice. In such examples, the IRAP picture may further include a set of one or more different syntax elements that specify a non-empty reference picture set. In some examples, the current video block of the current picture includes a luma component and a chroma component. In such examples, only one of the luma or the chroma component may have integer-pel precision.

In some examples, the reference picture may further include decoded non-filtered samples of the current picture. In various instances, the reference picture may include a reference block that further includes motion prediction information. Motion compensation unit 82 of video decoder 30 may use the motion information of the reference block for coding the current video block. Motion compensation unit 82 may, for example, decode a block that is coded in merge mode. If the picture of the current block is eligible to be in a reference picture list, then one or more of the merge candidates in a merge candidate list may include motion vectors (e.g. offset vectors) that point to a reference block in the same picture as the current block.

In some examples where the POC value for the reference picture is not equal to the POC value for the current picture, a CVS referring to an SPS for the current picture may include one or more I-slices.

In some examples, the current picture is one of a clean random access picture or a broken link access picture. In such examples, entropy decoding unit 80 of video decoder 30 may receive a second syntax element indicating a number of pictures eligible to be used as a prediction reference for the current picture, wherein the second syntax element has a value of 1.

In some examples where the POC value for the reference picture is equal to the POC value for the current picture, an MV for the current video block may have integer-pel precision. Further, entropy decoding unit 80 of video decoder 30 may convert each MV predictor candidate of a plurality of motion vector predictor candidates for the current picture to integer-pel precision either prior to being used in a candidate derivation process or after the candidate derivation process is completed. In other examples where the POC value for the reference picture is equal to the POC value for the current picture, each prediction sample of the current picture is contained within a picture boundary of the current picture. Further, if the reference picture list only includes the current picture, entropy decoding unit 80 of video decoder 30 may disable a TMVP.

Figure 11:
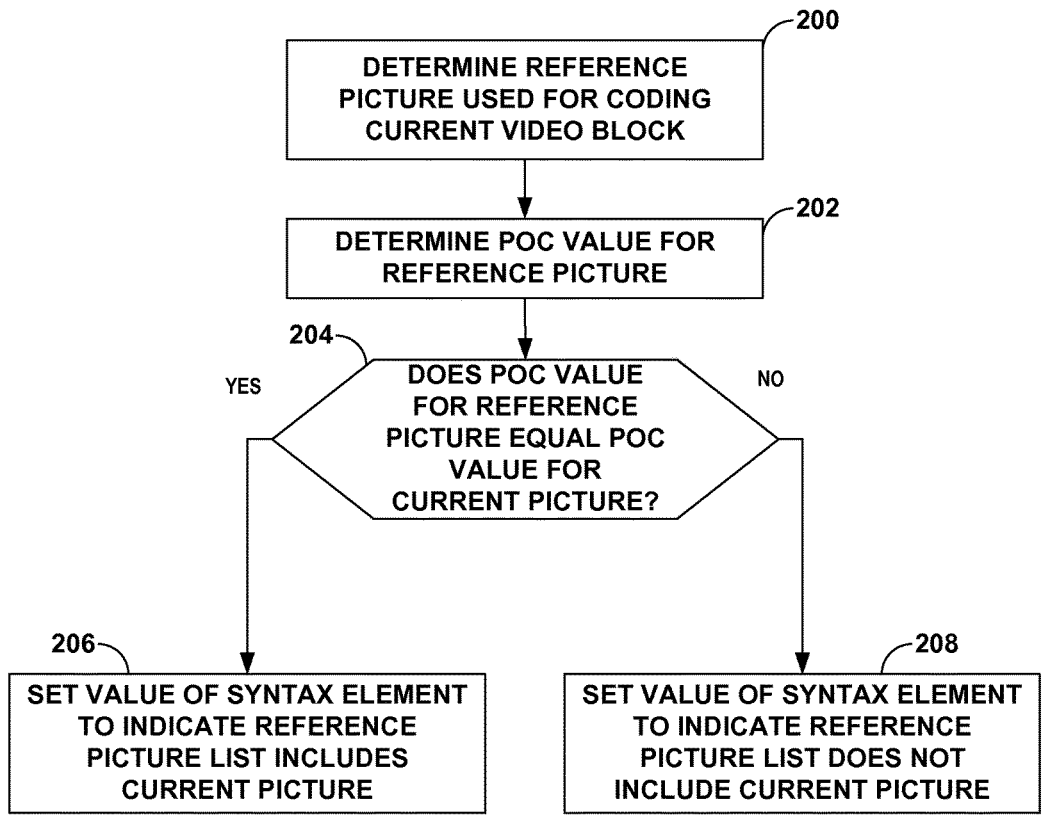
FIG. 11 is a flow diagram illustrating an example video encoding technique in accordance with one or more techniques described herein.

FIG. 11 is a flow diagram illustrating an example video encoding technique in accordance with one or more techniques described herein. For the purposes of describing this flow diagram, reference will be made to a video coding device. It should be recognized that a video coding device comprising a memory and one or more processors may include a video encoder, such as video encoder 20 of FIG. 1 and FIG. 9. Further, the video coding device may use the following techniques in encoding video blocks.

In accordance with one or more techniques described herein, a video coding device may be configured to perform the techniques of this disclosure. For instance, the video coding device may be configured to determine a reference picture used for coding the current video block (200). The video coding device may further determine a POC value for the reference picture (202). In response to the POC value for the reference picture being equal to a POC value for a current picture that includes the current video block (YES branch of 204), the video coding device may set a value of a syntax element to indicate that a reference picture list includes the current picture (206). In some examples, the syntax element may be located in one of a PPS or an SPS. Conversely, in response to the POC value for the reference picture not being equal to the POC value for the current picture that includes the current video block (NO branch of 204), the video coding device may set a value of the syntax element to indicate that the reference picture list does not include the current picture (208).

In some examples, the current picture is an intra random access picture (IRAP) comprising one of a P-slice or a B-slice. In such examples, the IRAP picture may further include a set of one or more different syntax elements that specify a non-empty reference picture set. In some examples, the current video block of the current picture includes a luma component and a chroma component. In such examples, only one of the luma or the chroma component may have integer-pel precision.

In some examples, the reference picture may further include decoded non-filtered samples of the current picture. In various instances, the reference picture may include a reference block that further includes motion prediction information. The video coding device may use the motion information of the reference block for coding the current video block.

In some examples where the POC value for the reference picture is not equal to the POC value for the current picture, a CVS referring to an SPS for the current picture may include one or more I-slices.

In some examples, the current picture is one of a clean random access picture or a broken link access picture. In such examples, the video coding device may set a value of a second syntax element that indicates a number of pictures that may be used as a prediction reference for the current picture to 1.

In some examples where the POC value for the reference picture is equal to the POC value for the current picture, an MV for the current video block may have integer-pel precision. Further, the video coding device may convert each MV predictor candidate of a plurality of motion vector predictor candidates for the current picture to integer-pel precision either prior to being used in a candidate derivation process or after the candidate derivation process is completed. In other examples where the POC value for the reference picture is equal to the POC value for the current picture, each prediction sample of the current picture is contained within a picture boundary of the current picture.

In some examples, if the reference picture list only includes the current picture, the video coding device may disable a TMVP. In other examples, a constraint may be placed on the video coding device such that the video coding device may determine a TMVP based at least in part on a picture that is different than the current picture.

In some examples, the video coding device may determine a neighboring picture of the current picture, wherein the neighboring block is either a spatially neighboring picture or a temporally neighboring picture. The video coding device may further determine a predictive block in the neighboring picture, wherein the predictive block includes a motion vector. The video coding device may use the motion vector to determine a reference block in the reference picture for the current block, wherein the reference block includes motion prediction information. The video coding device may then encode the current video block using the motion prediction information of the reference block and a residual.

Figure 12:
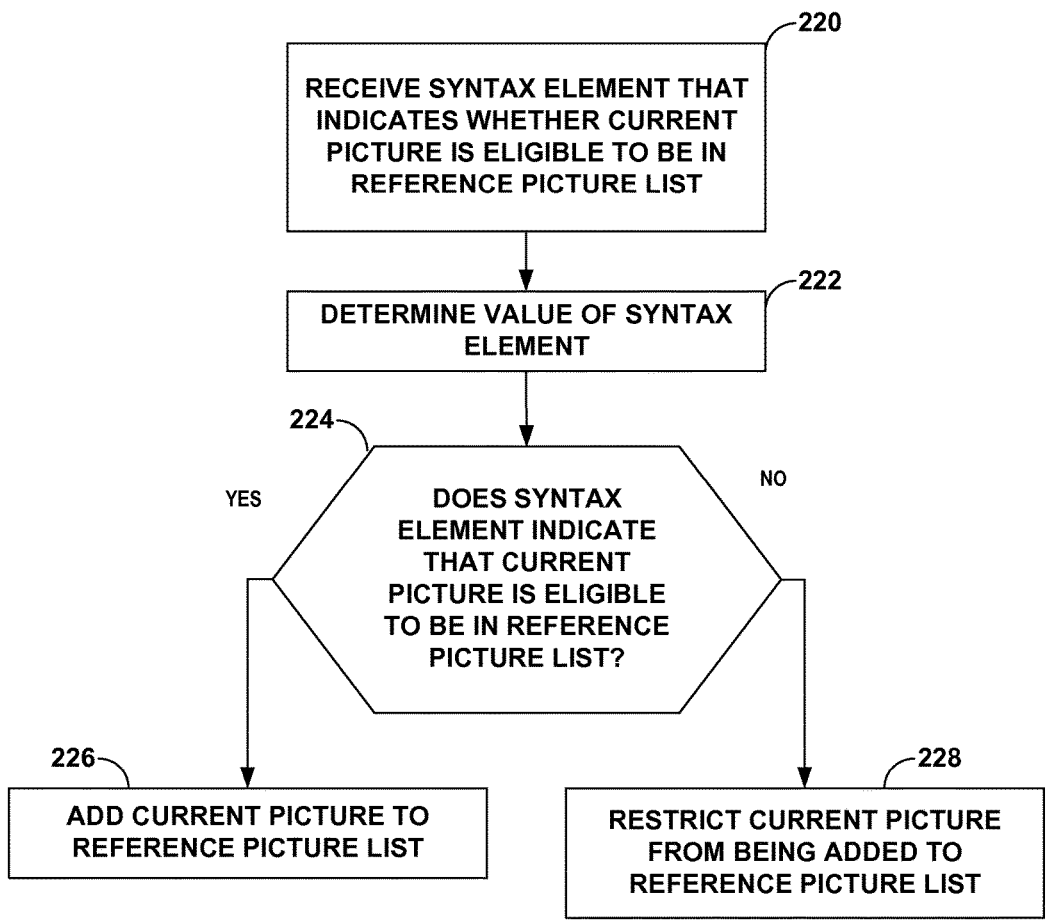
FIG. 12 is a flow diagram illustrating an example video decoding technique in accordance with one or more techniques described herein.

FIG. 12 is a flow diagram illustrating an example video encoding technique in accordance with one or more techniques described herein. For the purposes of describing this flow diagram, reference will be made to a video coding device. It should be recognized that a video coding device comprising a memory and one or more processors may include a video decoder, such as video decoder 30 of FIG. 1 and FIG. 10. Further, the video coding device may use the following techniques in decoding video blocks.

In accordance with one or more techniques described herein, a video coding device may receive a syntax element that indicates whether a current picture that includes a current video block of the video data is eligible to be in a reference picture list (220). The video coding device may further determine a value of the syntax element (222). In response to the syntax element indicating that the current video block of the video data is eligible to be in the reference picture list (YES branch of 224), the video coding device may add the current picture to a reference picture list (226). In response to the syntax element indicating that the current video block of the video data is not eligible to be in the reference picture list (NO branch of 224), the video coding device may restrict the current picture from being placed in the reference picture list (228).

In other examples, a video coding device may be configured to perform the techniques of this disclosure. For instance, the video coding device may receive a syntax element that indicates whether a POC value for a reference picture used for decoding a current video block of the video data is the same as a POC value for a current picture that includes the current video block. In some examples, the syntax element may be located in one of a PPS or an SPS. The video coding device may further determine a value of the syntax element. In response to the syntax element indicating that the POC value for the reference picture is equal to the POC value for the current picture, the video coding device may add the current picture to a reference picture list. In response to the syntax element indicating that the POC value for the reference picture is different than the POC value for the current picture, the video coding device may determine the POC value for the reference picture and add the reference picture to the reference picture list.

In some examples, the current picture is an intra random access picture (IRAP) comprising one of a P-slice or a B-slice. In such examples, the IRAP picture may further include a set of one or more different syntax elements that specify a non-empty reference picture set. In some examples, the current video block of the current picture includes a luma component and a chroma component. In such examples, only one of the luma or the chroma component may have integer-pel precision.

In some examples, the reference picture may further include decoded non-filtered samples of the current picture. In various instances, the reference picture may include a reference block that further includes motion prediction information. The video coding device may use the motion information of the reference block for coding the current video block.

In some examples where the POC value for the reference picture is not equal to the POC value for the current picture, a CVS referring to an SPS for the current picture may include one or more I-slices.

In some examples, the current picture is one of a clean random access picture or a broken link access picture. In such examples, the video coding device may receive a second syntax element indicating a number of pictures eligible to be used as a prediction reference for the current picture, wherein the second syntax element has a value of 1.

In some examples where the POC value for the reference picture is equal to the POC value for the current picture, an MV for the current video block may have integer-pel precision. Further, the video coding device may convert each MV predictor candidate of a plurality of motion vector predictor candidates for the current picture to integer-pel precision either prior to being used in a candidate derivation process or after the candidate derivation process is completed. In other examples where the POC value for the reference picture is equal to the POC value for the current picture, each prediction sample of the current picture is contained within a picture boundary of the current picture.

In some examples, if the reference picture list only includes the current picture, the video coding device may disable a TMVP. In other examples, a constraint may be placed on the video coding device such that the video coding device may determine a TMVP based at least in part on a picture that is different than the current picture.

In some examples, the video coding device may determine a neighboring picture of the current picture, wherein the neighboring block is either a spatially neighboring picture or a temporally neighboring picture. The video coding device may further determine a predictive block in the neighboring picture, wherein the predictive block includes a motion vector. The video coding device may use the motion vector to determine a reference block in the reference picture for the current block, wherein the reference block includes motion prediction information. The video coding device may then decode the current video block using the motion prediction information of the reference block and a residual.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method for decoding video data, the method comprising:
   receiving a first syntax element that indicates whether a first picture that includes a first video block of the video data is eligible to be in a reference picture list;
   determining a value of the first syntax element;
   in response to the first syntax element indicating that the first picture is eligible to be in the reference picture list:
      adding the first picture to the reference picture list;
      determining that a motion vector for the first video block has integer-pel precision; and
      converting each motion vector predictor candidate of a plurality of motion vector predictor candidates for the first picture to integer-pel precision either prior to being used in a candidate derivation process or after the candidate derivation process is completed;
   decoding the first video block using a block of a picture from the reference picture list and a first residual;
   receiving a second syntax element that indicates whether a second picture that includes a second video block of the video data is eligible to be in a reference picture list;
   determining a value of the second syntax element;
   in response to the second syntax element indicating that the second picture is not eligible to be in the reference picture list, restricting the second picture from being placed in the reference picture list; and
   decoding the second video block using a block of a picture from the reference picture list and a second residual.

2. The method of claim 1, wherein the first picture is an intra random access picture comprising one of a P-slice or a B-slice.

3. The method of claim 2, wherein the intra random access picture further comprises a set of one or more different syntax elements that specify a non-empty reference picture set.

4. The method of claim 1, wherein a reference picture used for decoding the first picture includes decoded non-filtered samples of the first picture.

5. The method of claim 1, wherein the first syntax element is located in one of a picture parameter set or a sequence parameter set.

6. The method of claim 1, further comprising:
determining a temporal motion vector predictor based at least in part on a picture that is different than the first picture.

7. The method of claim 1, wherein the first picture is one of a clean random access picture or a broken link access picture, and wherein the method further comprises:
receiving a third syntax element indicating a number of pictures eligible to be used as a prediction reference for the first picture, wherein the third syntax element has a value of 1.

8. The method of claim 1, further comprising:
disabling a temporal motion vector predictor when the reference picture list only includes the first picture.

9. The method of claim 1, wherein the first video block comprises a luma component and a chroma component, and wherein only one of the luma component or the chroma component has integer-pel precision.

10. The method of claim 1, wherein the first picture is eligible to be added to the reference picture list, wherein each prediction sample of the first picture is contained within a picture boundary of the current picture.

11. The method of claim 1, further comprising:
determining a neighboring picture of the first picture, wherein the neighboring block is either a spatially neighboring picture or a temporally neighboring picture;
determining a predictive block in the neighboring picture, wherein the predictive block includes a motion vector;
using the motion vector to determine a reference block in a reference picture for the first block, wherein the reference block includes the motion prediction information; and
decoding the first video block using the motion prediction information of the reference block and the first residual.

12. A method of encoding video data, the method comprising:
determining a first reference picture used for encoding a first video block of the video data;
determining a picture order count (POC) value for the first reference picture;
in response to the POC value for the first reference picture being equal to a POC value for a first picture that includes the first video block:
setting a value of a syntax element to indicate that a reference picture list includes the first picture;
determining that a motion vector for the current video block has integer-pel precision; and
converting each motion vector predictor candidate of a plurality of motion vector predictor candidates for the current picture to integer-pel precision either prior to being used in a candidate derivation process or after the candidate derivation process is completed;
encoding the first video block using a block of a picture from the reference picture list and a first residual
determining a second reference picture used for encoding a second video block of the video data;
determining a POC value for the second reference picture;
in response to the POC value for the second reference picture being different than the POC value for the second picture, setting the value of the syntax element to indicate that the reference picture list does not include the second picture; and
encoding the second video block using a block of a picture from the reference picture list and a second residual.

13. The method of claim 12, wherein the first picture is an intra random access picture comprising one of a P-slice or a B-slice.

14. The method of claim 13, wherein the intra random access picture further comprises a set of one or more different syntax elements that specify a non-empty reference picture set.

15. The method of claim 12, wherein the reference picture includes decoded non-filtered samples of the first picture.

16. The method of claim 12, wherein the first syntax element is located in one of a picture parameter set or a sequence parameter set.

17. The method of claim 12, further comprising:
determining a temporal motion vector predictor based at least in part on a picture that is different than the first picture.

18. The method of claim 12, wherein the first picture is one of a clean random access picture or a broken link access picture, and wherein the method further comprises:
setting a value of a third syntax element indicating a number of pictures eligible to be used as a prediction reference for the first picture to 1.

19. The method of claim 12, further comprising:
disabling a temporal motion vector predictor when the reference picture list only includes the first picture.

20. The method of claim 12, wherein the first video block comprises a luma component and a chroma component, and wherein only one of the luma component or the chroma component has integer-pel precision.

21. The method of claim 12, wherein the POC value for the reference picture is equal to the POC value for the first picture, wherein each prediction sample of the first picture is contained within a picture boundary of the first picture.

22. The method of claim 12, further comprising:
determining a neighboring picture of the first picture, wherein the neighboring block is either a spatially neighboring picture or a temporally neighboring picture;
determining a predictive block in the neighboring picture, wherein the predictive block includes a motion vector;
using the motion vector to determine a reference block in the reference picture for the first block, wherein the reference block includes the motion prediction information; and
encoding the first video block using the motion prediction information of the reference block and the first residual.

23. A video decoding device comprising:
a memory configured to store video data; and
one or more processors configured to:
receive a syntax element that indicates whether a current picture that includes a current video block of the video data is eligible to be in a reference picture list;
determine a value of the syntax element;
in response to the syntax element indicating that the first picture is eligible to be in the reference picture list:
add the current picture to the reference picture list;
determine that a motion vector for the current video block has integer-pel precision; and
convert each motion vector predictor candidate of a plurality of motion vector predictor candidates for the current picture to integer-pel precision either prior to being used in a candidate derivation process or after the candidate derivation process is completed;

in response to the syntax element indicating that the second picture is not eligible to be in the reference picture list, restrict the current picture from being placed in the reference picture list; and decode the current video block using a block of a picture from the reference picture list and a residual.

24. The video decoding device of claim 23, wherein the one or more processors are further configured to:

disable a temporal motion vector predictor when the reference picture list only includes the current picture.

25. The video decoding device of claim 23, wherein the current video block comprises a luma component and a chroma component, and wherein only one of the luma component or the chroma component has integer-pel precision.

26. The video decoding device of claim 23, wherein the one or more processors are further configured to:

determine a neighboring picture of the current picture, wherein the neighboring block is either a spatially neighboring picture or a temporally neighboring picture;

determine a predictive block in the neighboring picture, wherein the predictive block includes a motion vector;

use the motion vector to determine a reference block in a reference picture for the current block, wherein the reference block includes the motion prediction information; and decode the current video block using the motion prediction information of the reference block and the residual.

27. A non-transitory computer-readable storage medium storing instructions that when executed by one or more processors cause the one or more processors to:

receive a syntax element that indicates whether a current picture that includes a current video block of the video data is eligible to be in a reference picture list;

determine a value of the syntax element;

in response to the syntax element indicating that the first picture is eligible to be in the reference picture list:

add the current picture to the reference picture list;

determine that a motion vector for the current video block has integer-pel precision; and convert each motion vector predictor candidate of a plurality of motion vector predictor candidates for the current picture to integer-pel precision either prior to being used in a candidate derivation process or after the candidate derivation process is completed;

in response to the syntax element indicating that second picture is not eligible to be in the reference picture list, restrict the current picture from being placed in the reference picture list; and decode the current video block using a block of a picture from the reference picture list and a residual.

* * * * *